United States Patent
Ito et al.

(10) Patent No.: US 6,525,836 B2
(45) Date of Patent: Feb. 25, 2003

(54) APPARATUS FOR AND METHOD OF SYNTHESIZING IMAGE

(75) Inventors: Takeyoshi Ito, Asaka (JP); Norihisa Haneda, Asaka (JP); Atsushi Ito, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/796,438

(22) Filed: Mar. 2, 2001

(65) Prior Publication Data

US 2001/0028476 A1 Oct. 11, 2001

Related U.S. Application Data

(62) Division of application No. 08/736,727, filed on Oct. 25, 1996, now Pat. No. 6,222,637.

(30) Foreign Application Priority Data

Jan. 31, 1996 (JP) .............................................. 8-35781
Jul. 31, 1996 (JP) ............................................ 8-216985

(51) Int. Cl.$^7$ .......................... G06K 15/00; G06T 3/00; H04N 1/387; H04N 1/04
(52) U.S. Cl. ...................... 358/1.18; 358/450; 358/487; 382/283; 382/284; 382/294
(58) Field of Search ................................ 358/1.18, 1.6, 358/1.9, 450, 487, 474, 505, 527, 1.2, 451; 348/96; 382/282, 283, 284, 294–296, 299; 345/625, 626, 634, 635; 361/683, 686, 724, 725, 727, 752

(56) References Cited

U.S. PATENT DOCUMENTS

| | | | |
|---|---|---|---|
| 4,231,069 A | 10/1980 | Wellendorf et al. | 358/450 |
| 5,142,616 A | 8/1992 | Kellas et al. | |
| 5,179,642 A | 1/1993 | Komatsu | |
| 5,309,242 A * | 5/1994 | Asami et al. | 348/97 |
| 5,379,129 A | 1/1995 | Othmer et al. | 358/450 |
| 5,438,433 A | 8/1995 | Reifman et al. | 358/468 |
| 5,459,586 A | 10/1995 | Negasato et al. | 358/450 |
| 5,541,644 A * | 7/1996 | Nanba | 348/96 |
| 5,592,305 A | 1/1997 | Iwadate et al. | 358/450 |
| 5,594,850 A | 1/1997 | Noyama et al. | |
| 5,623,303 A * | 4/1997 | Inoue et al. | 348/96 |
| 5,663,812 A * | 9/1997 | Pan | 358/474 |
| 5,703,701 A * | 12/1997 | Yamamoto et al. | 358/487 |
| 5,754,314 A * | 5/1998 | Araki et al. | 348/96 |
| 5,850,296 A * | 12/1998 | Wang et al. | 358/474 |
| 6,049,375 A * | 4/2000 | Tazawa et al. | 348/96 |
| 6,078,409 A * | 6/2000 | Kunishige | 348/96 |
| 6,195,182 B1 * | 2/2001 | Kunishige | 358/487 |

* cited by examiner

Primary Examiner—Scott Rogers
(74) Attorney, Agent, or Firm—Birch, Stewart, Kolasch & Birch, LLP

(57) ABSTRACT

A desired template image is selected, and a subject image is synthesized at a predetermined position on the selected template image. Template image data, mask image data corresponding to the template image data, and image information are pre-stored in an image synthesizer. When a user selects a desired template image by the screen of a display, mask image data representing a mask image corresponding to the selected template image and synthesis information are obtained. A subject image which a user has also selected on the screen is then synthesized at a predetermined position on the template image using the template image data, the mask image data and the synthesis information, and a resultant composite image is displayed and printed.

16 Claims, 59 Drawing Sheets

Fig. 2

| SS | VER | ID | LNG | DATA | LCR | ES |

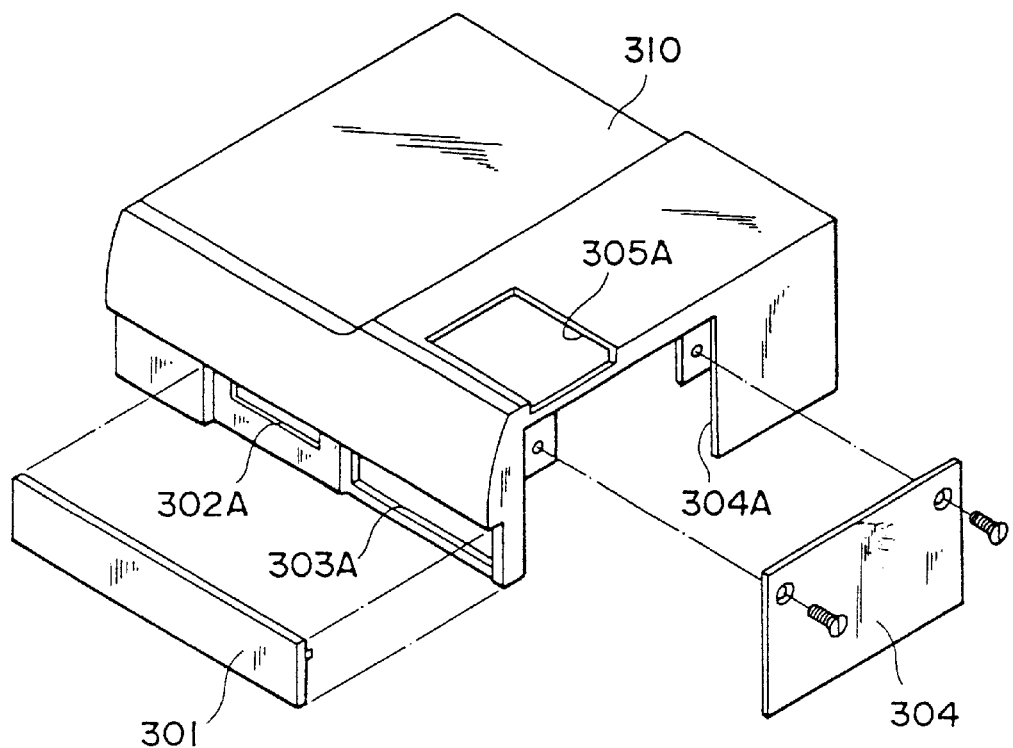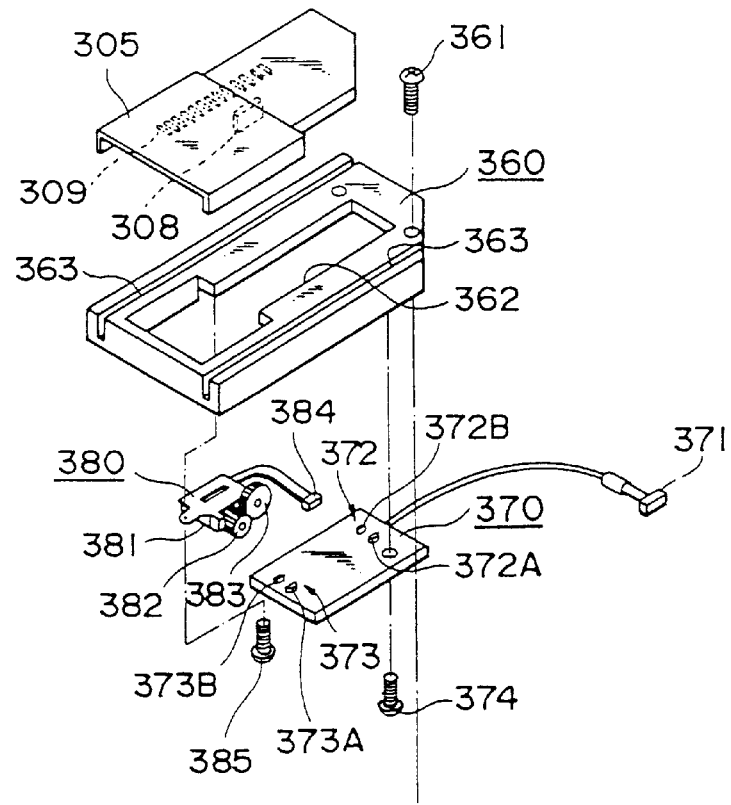
Fig. 9

Fig.19a

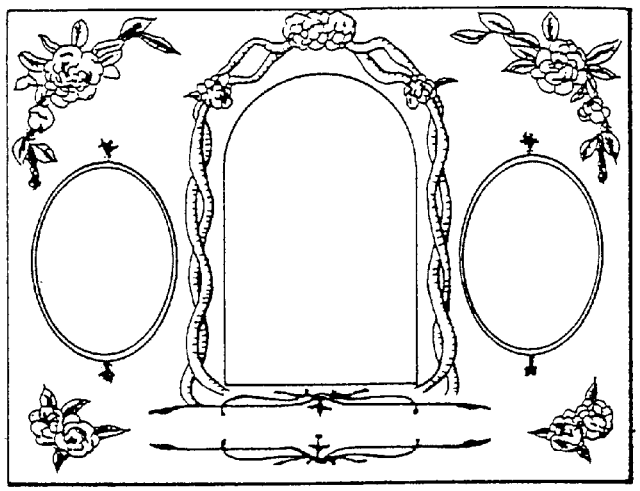

Fig.19b

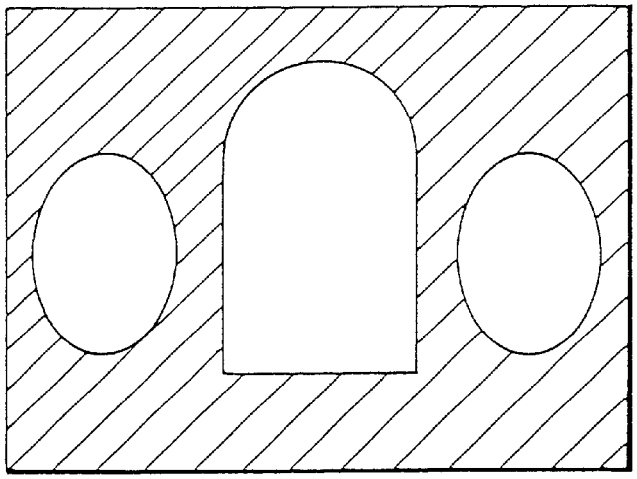

Fig.19c

| | |
|---|---|
| PICTURE NUMBER = 3; | NUMBER OF SYNTHESIZED IMAGES |
| PICTURE1 ADDRESS = 105.857.703.934; | ⎫ POSITIONAL INFORMATION |
| PICTURE2 ADDRESS = 979.261.1035.1694; | ⎬ OF SYNTHESIS |
| PICTURE3 ADDRESS = 2187.857.703.934; | ⎭ DEFINITION RANGE |
| TITLE NUMBER = 1; | NUMBER OF TITLES |
| TITLE1 ADDRESS = 828.2155.1344.84; | TITLE SYNTHESIS POSITION |
| TITLE1 FONT TYPE = "MS GOTHIC"; | TYPEFACE NAME OF TITLE FONT |
| TITLE1 FONT SIZE = 84; | TITLE FONT SIZE |
| TITLE1 FONT COLOR = 0.0.0; | TITLE FONT COLOR |
| TITLE1 FONT FORMAT = 1; | TITLE LAYOUT |

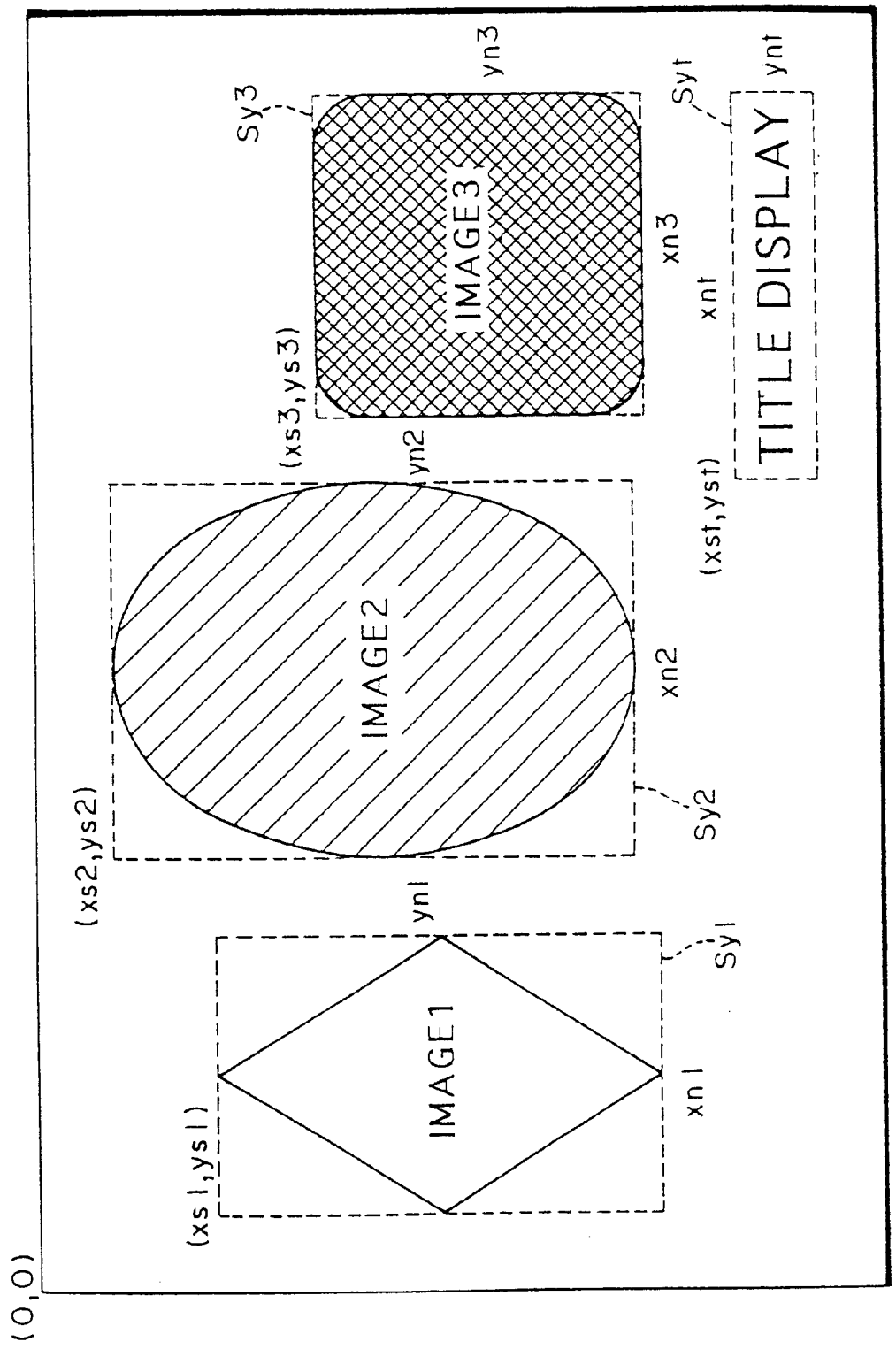

Fig. 45

DECORATION | PLEASE SELECT ONE DECORATION TYPE

A60 → TRAVEL ABROAD | MOUNTAIN CAMPING | SEA | SKI | FREE

WEDDING CEREMONY | HONEY-MOON | BABY BIRTH | ENTRANCE CEREMONY | GRADU-ATION

FORMAL | FAMILY | CASUAL | POP | COUPLE

FIX — A13

PRECEDING SCREEN — A10

APPARATUS FOR AND METHOD OF SYNTHESIZING IMAGE

This application is a divisional of application Ser. No. 08/736,727, filed on Oct. 25, 1996, now U.S. Pat. No. 6,222,637, the entire contents of which are hereby incorporated by reference and for which priority is claimed under 35 U.S.C. § 120; and this application claims priority of Application No. 8-35781 and 8-216985 filed in Japan on Jan. 31, 1996 and Jul. 31, 1996, respectively under 35 U.S.C. § 119.

BACKGROUND OF THE INVENTION

1. Field of the Invention

The present invention relates to an apparatus for and a method of synthesizing a subject image on a template image, to produce a composite image.

2. Background Art

As a digital image technique has been developed, it has been possible to read a picture taken by a user through a scanner to accept and retain the picture as digital image data in a personal computer. It is also possible to accept a plurality of images in the personal computer and synthesize the images within the personal computer.

However, operations for such image synthesis are still difficult for an unexperienced person and a beginner of the personal computer. Therefore, a technique capable of achieving image synthesis relatively simply has been desired.

SUMMARY OF THE INVENTION

An object of the present invention is to perform operations for image synthesis relatively simply.

An image synthesizer according to the present invention is characterized by comprising a template image data storage (means) previously storing template image data representing a template image which is a background image of a subject image to be synthesized, a mask image data storage (means) storing mask image data representing a mask image corresponding to the template image for defining a synthesis position and the size of a synthesis area of the subject image to be synthesized on the template image, and an image synthesis processor or means for putting the subject image represented by fed subject image data in the synthesis position and the synthesis area, which are defined by the mask image data stored in the mask image data storage, on the template image stored in the template image data storage, to produce a composite image.

The present invention also provides an image synthesizing method. Specifically, the image synthesizing method according to the present invention is characterized by comprising the steps of previously storing template image data representing a template image which is a background image of a subject image to be synthesized and mask image data representing a mask image corresponding to the template image for defining a synthesis position and the size of a synthesis area of the subject image to be synthesized on the template image, and putting the subject image represented by fed subject image data in the synthesis position and the synthesis area, which are defined by the mask image data, on the template image previously stored, to produce a composite image.

According to the present invention, the template image data and the mask image data are previously stored. When the subject image data representing the subject image to be synthesized is fed, the subject image represented by the subject image data is positioned in the synthesis position defined by the mask image, to obtain the composite image. The subject image to be synthesized is merely positioned in the synthesis position, whereby the composite image can be produced relatively simply even by a user who is unaccustomed to operating a personal computer.

Data representing the produced composite image may be stored in a storage medium. The composite image can be displayed or printed by reading out the data representing the composite image stored in the storage medium.

Template image data for image display and template image data for printing having higher resolution than the resolution of the template image data for image display may be previously stored, and mask image data for image display and mask image data for printing having higher resolution than the resolution of the mask image data for image display may be previously stored. At this time, the image synthesis processor produces a composite image for image display based on the stored template image data for image display, the stored mask image data for image display, and the fed subject image data when image synthesis for image display is achieved, while producing a composite image for printing based on the stored template image data for printing, the stored mask image data for printing, and the fed subject image data when image synthesis for printing is achieved.

In this case, the composite image for image display will be displayed on a display device, and the composite image for printing will be printed.

When high-quality printing of the composite image is done, image data having high resolution is required. On the other hand, sufficiently high resolution to be required for printing is not generally required for display. If only image data having high resolution exists, thinning processing of the image data is required for display. Consequently, image display cannot be quickly made. If image data conforming to the resolution of the display device is used, quick display is made possible, while high-quality image printing cannot be expected.

Since the template image data for image display and the template image data for printing as well as the mask image data for image display and the mask image data for printing are previously stored, to perform image synthesis processing using various data for image display when the image display is made, while using various data for printing when the printing is done, quick image display and high-quality printing can be realized.

In this case, it is preferable that the subject image is positioned in order to produce the composite image for printing using positioning information used for positioning the subject image in order to produce the composite image for image display, to produce the composite image for printing.

Consequently, the composite image for printing can be quickly produced.

When there is subject image data representing a plurality of subject images, and there are a plurality of synthesis positions of the subject image which are defined by the mask image represented by the stored mask image data, the subject image selected out of the plurality of subject images represented by the fed subject image data may be positioned in the synthesis position selected out of the plurality of synthesis positions, to perform image synthesis processing.

In a case where the template image data previously stored represents a plurality of kinds of template images, the mask image data also represents a plurality of kinds of mask images in correspondence to the plurality of kinds of template images, the subject image represented by the fed subject image data is put at a position, which is defined by the mask image corresponding to the template image selected out of the plurality of kinds of template images, on the template image, to produce a composite image.

Consequently, the composite image can be produced upon positioning the plurality of subject images on one template image.

Character image data representing a character may be inputted, and the inputted character may be further synthesized on the composite image.

Synthesis information including the size of the subject image which can be synthesized on the template image may be previously stored in correspondence to the template image data, and it may be judged whether or not the subject image represented by the fed subject image data is not of the size which can be synthesized, to notify, when it is judged that the subject image is not of the size which can be synthesized, the judgment.

When the size of the subject image to be synthesized on the template image is smaller than the size of the synthesis area defined by the mask image, a white edge or a black edge is formed on the composite image. When the synthesis information is previously stored, and it is judged that the subject image is not of the size which can be synthesized, the judgment is notified. Even when the size of the subject image to be synthesized on the template image is smaller than the size of the synthesis area defined by the mask image, therefore, a white edge or a black edge can be prevented from being formed on the composite image.

The image synthesizer can be provided with an image medium reader for reading a subject image recorded on a visible image medium and outputting an image signal representing the subject image. In this case, image synthesis processing will be performed using image data generated from the subject image signal outputted from the image medium reader. The visible image medium means a medium on which an image capable of being seen is displayed, for example, a picture, a film (including both a negative film and a positive film) or a poster.

Since the image synthesizer is provided with the image medium reader, the user can synthesize, using as a subject image a desired image on the visible image medium, the image.

The image synthesizer may be provided with a digital medium reader for reading from a digital medium the subject image data and outputting the read subject image data. In this case, image synthesis processing will be performed using the subject image data outputted from the digital medium reader. The digital medium means a medium on which digital data representing an image is recorded, for example, a magnetic disk, an optical disk, or a memory card.

Since the image synthesizer is provided with the digital medium reader, the user can synthesize, using as a subject image a desired image stored in the digital medium, the image.

The image synthesizer may be provided with an image memory, and the subject image signal outputted from the image medium reader may be DMA (Direct Memory Access)-transferred to the image memory at a transfer speed which is higher than the output speed of the subject image signal outputted from the image medium reader. The subject image data stored in the image memory is fed to the image synthesis processor.

Since the image medium reader need not be provided with a buffer memory for transferring the subject image signal, the cost can be reduced. The subject image signal outputted from the image medium reader can be directly transferred to the image memory in the image synthesizer, whereby the high-speed transfer of the subject image signal can be realized.

The image medium reader can be constructed using a line sensor for reading the image from the visible image medium and outputting the subject image signal, and a conveying device for relatively conveying the visible image medium and the line sensor. When the image medium reader is thus constructed, the image synthesizer is provided with a line sensor driver for controlling the output of the subject image signal from the line sensor, and a controller or control means for controlling the conveying device and the line sensor driver so that the transfer speed of the subject image signal outputted from the line sensor is maintained lower than the write speed of the subject image signal to the image memory.

The conveyance speed in a case where the visible image medium and the imaging device are relatively conveyed may be relatively low. The conveying device can be constructed using a relatively low-cost motor, whereby the cost can be reduced.

An advanced new photographic film comprising a long narrow strip-shaped information recording portion composed of a transparent magnetic material has been proposed. Various information (film information, frame information, etc.) can be magnetically recorded in addition to images on the photographic film. Further, optical information (for example, information representing the size of an image by bar codes or the presence or absence of points) can be also recorded on the photographic film. The image medium reader for reading an image appearing on the photographic film will be a film scanner for reading from the photographic film with the information recording portion at least one of magnetically recorded information and optically recorded information and an image appearing on the film. Consequently, image synthesis using an image recorded on the advanced photographic film having the information recording portion is also made possible.

Furthermore, the advanced photographic film having the information recording portion is accommodated in a cartridge so as to be capable of being drawn out even after development in consideration of handling.

When the photographic film after the development is accommodated in the cartridge so as to be capable of being drawn out, the image medium reader comprises a cartridge container for containing the cartridge, a cover formed on the cartridge container, a containment detector for detecting that the cartridge is contained in the cartridge container, cover a closing controller or control means for closing the cover in response to the detection by the containment detector, and a film drawing device for drawing the film out of the cartridge in response to the closing of the cover by the cover closing controller.

The image for each frame and the information are read from the film drawn out by the film drawing device.

When the cartridge in which the photographic film is accommodated is contained in the cartridge container, the cover is closed upon detection of the containment. When the cover is closed, the photographic film is drawn out of the cartridge, whereby the image recorded on the photographic film is read.

When the cartridge is contained, the cover is closed. Even if the photographic film is drawn out of the cartridge, therefore, the photographic film can be protected from dust, dirt, or the like. It may be detected on the basis of a command from the user that the cartridge in which the photographic film is accommodated is contained in the cartridge container.

In another mode of the present invention, the image synthesizer is further provided with an image reader for reading a subject image recorded on a visible image medium and outputting an image signal representing the subject image in order to generate subject image data to be fed to the image synthesis processor. The template image data storage, the mask image data storage, the image synthesis processor and the image reader are contained in one housing.

Since a lot of components of the image synthesizer including the image reader are contained in one housing, it is sufficient to handle the housing only. Therefore, the installation of the image synthesizer and the other handling are easy. The image synthesizer is suitably installed in various stores.

In still another mode, the image reader is contained in a case and is formed as a unit. The case is provided with a first connector. On the other hand, a recess for containing the case of the image reader is formed in the housing, and the recess is provided with a second connector. The case of the image reader is contained in the recess of the housing so as to be attachable and detachable, whereby the first connector and the second connecter are connected to each other so as to be attachable and detachable.

Since the image reader is formed as a unit, and is contained in the housing so as to be attachable and detachable, the maintenance of the image reader (for example, the replacement of a light source and other members, and the cleaning of a magnetic head and other members) becomes easy. Further, when the image reader develops a fault, the fault can be quickly coped with by replacing the whole unit.

Preferably, a cover for closing the recess of the housing is attached to the housing so as to be attachable and detachable.

One example of the image reader is film scanner for reading from an advanced photographic film with an information recording portion at least one of magnetically recorded information and optically recorded information and an image appearing on the film.

In a further mode, the image reader is a film scanner for reading from an advanced photographic film accommodated in a cartridge so as to be capable of being drawn out an image appearing on the photographic film and outputting an image signal representing the image. The image synthesizer is provided with a display device for displaying the image represented by the image signal outputted from the film scanner. The film scanner is provided with a containing recess for containing the cartridge, and is provided with a first cover for closing an opening of the containing recess. An indication that the first cover should be closed upon containing the cartridge in the containing recess is given on the display device.

Consequently, the user can know the handling of the image synthesizer by seeing the display device for image display, whereby it is not necessary to separately guide and instruct the user.

When there is provided a housing for containing the film scanner, an opening is provided at a position corresponding to the containing recess of the housing, and a second cover for closing the opening is provided. An indication relating to the opening or closing of the second cover is given on the display device.

More preferably, there are further provided a device for opening or closing the second cover, and a device for entering a command relating to the opening or closing of the second cover. The opening or closing device opens or closes the second cover in response to the entry of the command from the entering device after giving the indication on the display device. Consequently, the opening or closing of the cover can be automated, whereby the user may merely enter an opening or closing command.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates a format of data recorded on the information recording portion;

FIGS. 7 to 9 are perspective exploded views of the image synthesizer;

FIG. 19a illustrates an example of a template image, FIG. 19b illustrates an example of a mask image, and FIG. 19c illustrates an example of synthesis information;

FIG. 20 illustrates the relationship between the position of a synthesis definition range as well as a title synthesis position and a template image;

FIGS. 30 to 57 illustrate examples of display screens appearing on the screen of a display device connected to the image synthesizer;

FIGS. 59a, 59b and 59c show how image synthesis processing is performed in printing processing.

DETAILED DESCRIPTION OF THE PREFERRED EMBODIMENTS (1) Photographic film with information recording portion A photographic film of a conventional type (a so-called 35 mm film) is a 12-exposure, 24-exposure or 36-exposure roll of film. This photographic film is cut to a length for six frames after development, and is generally housed in a sheath to be stored. Merely an image of a photographed subject and its frame number are recorded on the photographic film of a conventional type. Information relating to the image of the subject (for example, information briefly expressing the image, date of photographing, and shutter speed) other than the frame number are not recorded. Therefore, the information relating to the subject image other than the frame number must be written into the sheath, or noted on another paper. A photographic film of a new type has been developed. Information relating to a subject image, for example, information briefly expressing the image, date of photographing and shutter speed which cannot be recorded on the conventional photographic film can be recorded on the new type (advanced) photographic film. In the present embodiment, description is made of a case where the new type photographic film is used. It goes without saying that the photographic film of a conventional type, a picture and the like can be used in an image synthesizer.

Figure 1:
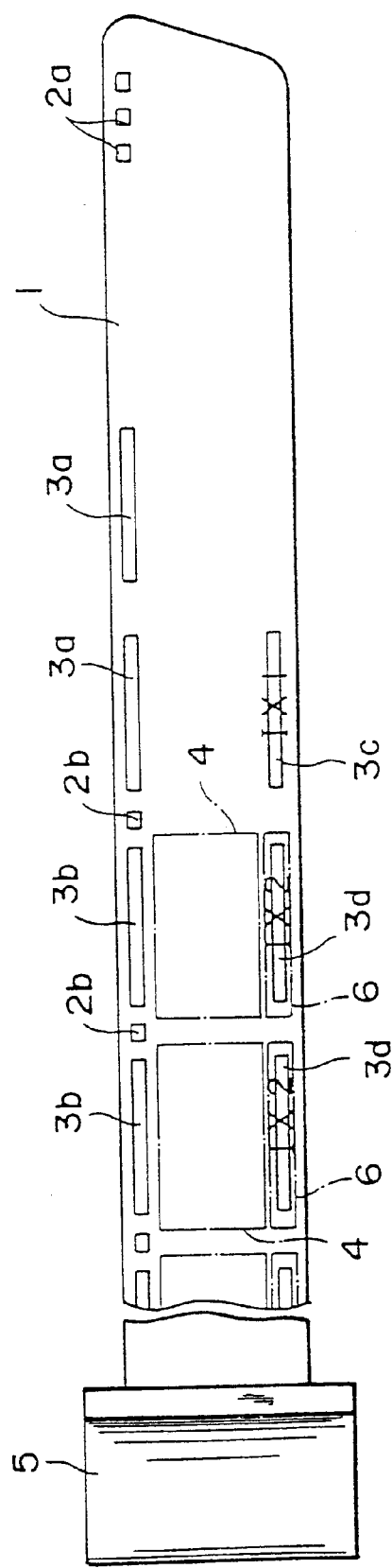
FIG. 1 illustrates an advanced new photographic film with an information recording portion.

FIG. 1 illustrates a photographic film of a new type, that is, an advanced photographic film with an information recording portion.

An advanced new photographic film 1 has its terminal fixed to a spool rotatably provided in a cartridge (Patrone) 5. FIG. 1 illustrates a state where the photographic film 1 is drawn out of the cartridge 5.

Some perforations 2a (or one or a plurality of notches) for engaging the photographic film 1 with a part of a photographic film winding shaft of a camera are formed in the end of the photographic film 1.

There are areas 4 on which an image is recorded on the whole of the photographic film 1 excluding the end having a suitable length (this area is formed by photographing, which is indicated by a one-dot and dash line for convenience of illustration in FIG. 1). Further, an optical information recording area 6 in a long narrow strip shape is provided below each of the image recording areas 4 (this area 6 is formed by exposure, which is also indicated by a one-dot and dash line for convenience of illustration in FIG. 1).

Information recording portions 3b and 3d in a long narrow strip shape are provided on both (upper and lower) sides of each of the image recording areas 4. The one information recording portion 3d is overlapped with the optical information recording area 6. One perforation (or two or more perforations) 2b is formed in correspondence to each of the image recording areas 4 between the other information recording portions 3b. The perforation 2b is used for mainly putting the image recording area 4 at an image formation position in the camera.

Information recording portions 3a and 3c are also provided in the end of the photographic film 1 on both sides thereof.

The information recording portions 3a, 3b, 3c and 3d are magnetic recording layers generally formed by applying a transparent magnetic material on a film. The information recording portions 3a and 3b provided on one side of the photographic film 1 are generally used in a laboratory. The information recording portions 3c and 3d provided on the other side of the photographic film 1 are generally used for recording information (data) in response to entry by a user or automatically by the camera. The optical information recording areas 6 are generally used in order for a manufacturer to record information.

The information recording portions (reader information recording portions) 3a and 3c in the end are used for recording information (film information) relating to one roll of film 1. The information recording portions (frame information recording portions) 3b and 3d provided in correspondence to each of the image recording areas 4 are used for recording information (frame information) relating to an image recorded on the area 4. The optical information recording areas 6 are for recording information such as a manufacturer code.

As an example, comprehensive information relating to the whole of an image picked up using the photographic film is recorded on the reader information recording portion 3c. This information is referred to as IX1.

Examples of the information recorded on the frame information recording portion 3d which is utilized by the user include title information entered into the camera by the user (a title is one for briefly expressing an image, for example, "picture of flower", "picture of animal", "picture of children, or "travel"), and information automatically recorded by the camera (for example, shutter speed used when an image for its frame is picked up). The information are referred to as information IX2. Only the information entered by the user may be taken as IX2.

Figure 2:
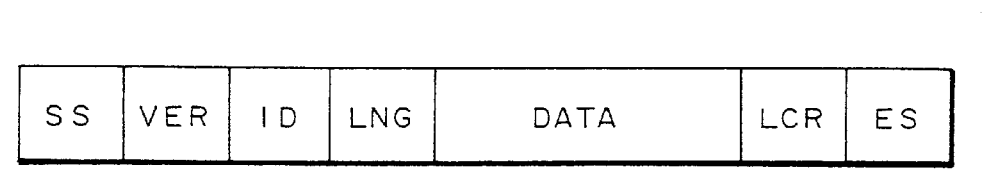

FIG. 2 illustrates a data arrangement (a data format) in the information recording portions 3a, 3b, 3c and 3d of the photographic film. The data format is applied to both the information IX1 and IX2, and includes SS, VER, ID, LNG, DATA, LCR and ES.

SS is an abbreviation for "Start Sentinal", and is a code representing the start of a data string. VER represents the version of a recording format (a standard). ID represents the type of information to be recorded (IX1, IX2, etc.). LNG represents the length of succeeding data (DATA). DATA is data representing information which desires to be recorded or should be recorded. LCR is a CRC check code. ES is an abbreviation for "End Sentinal", and is a code representing the end of the data string.

One or a plurality of data strings of such a format are provided in each of the information recording portions 3a, 3b, 3c and 3d. For example, a data string representing data entered by the user and a data string representing data written by the camera are recorded on the frame information recording portion 3d. A plurality of identical data strings are recorded in parallel on the information recording portion as required in order to increase reliability.

(2) Camera for photographic film with information recording portion

Figure 3:
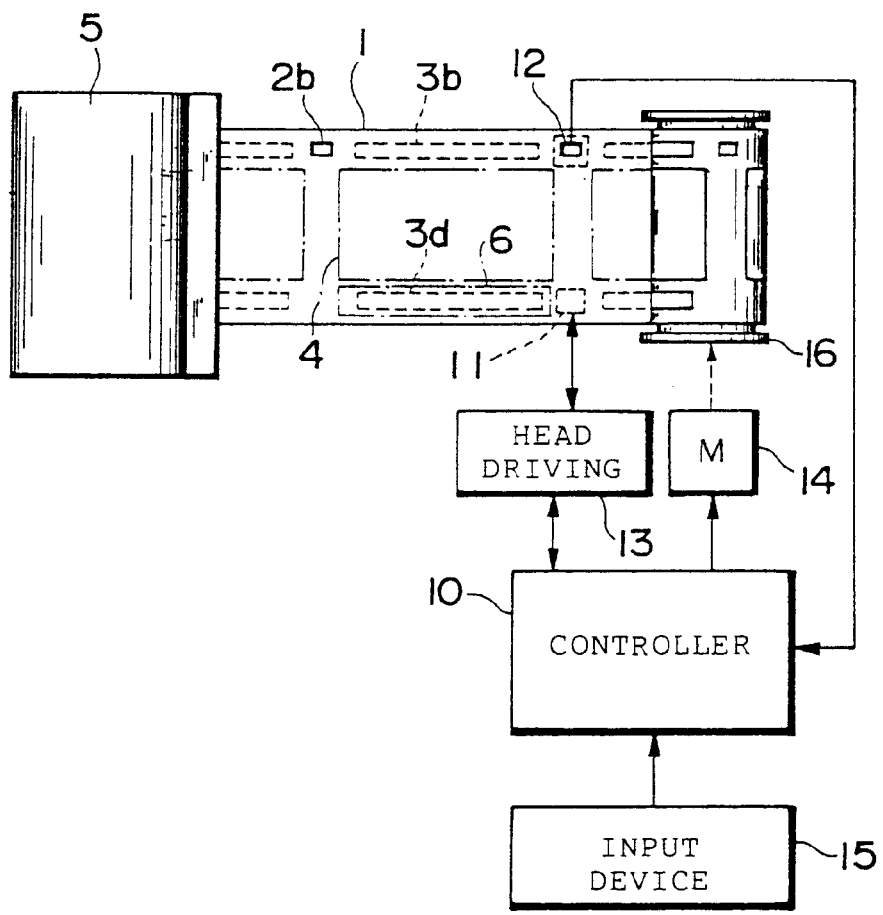
FIG. 3 illustrates a part of a camera capable of handling the advanced new photographic film with an information recording portion.

A part of the construction of a camera capable of handling such a photographic film with an information recording portion is illustrated in FIG. 3. In FIG. 3, the construction relating to recording on the information recording portions 3a, 3b, 3c and 3d of the photographic film is mainly illustrated, and the construction of an imaging optical system or the like is omitted.

The cartridge 5 is rotatably supported on a fork in the camera. The end of the photographic film 1 drawn out of the cartridge 5 is wound around a photographic film winding shaft 16. A photoelectric sensor 12 for sensing the perforation 2b is provided, and its sensing signal is fed to a controller 10. The controller 10 drives a motor 14 to rotate the winding shaft 16 so that the photographic film 1 is successively wound up, and positions the photographic film 1 for each photographing so that the image recording area 4 is in the image formation position on the basis of the sensing signal of the photoelectric sensor 12.

A magnetic head 11 for recording information on the magnetic information recording portions 3c and 3d for the user is provided on a travel path of the magnetic information recording portions 3c and 3d. In the process of winding (traveling) of the photographic film 1, information entered from an input device 15 or information produced by the controller 10 are magnetically recorded on the magnetic recording portions 3c and 3d by the magnetic head 11 through a head driving circuit 13 under the control of the controller 10.

The input device 15 is for entering numerals and characters. For example, the input device 15 includes numeric keys, alphabet keys, and the like. The input device 15 includes a display device as required, and keyed information is displayed on the display device. In order to decrease the number of keys, the input device 15 can be also so constructed that a character displayed every time one key is pressed is changed, and the user can select displayed characters.

(3) Image synthesizing system

① Entire construction of image synthesizing system

Figure 4:
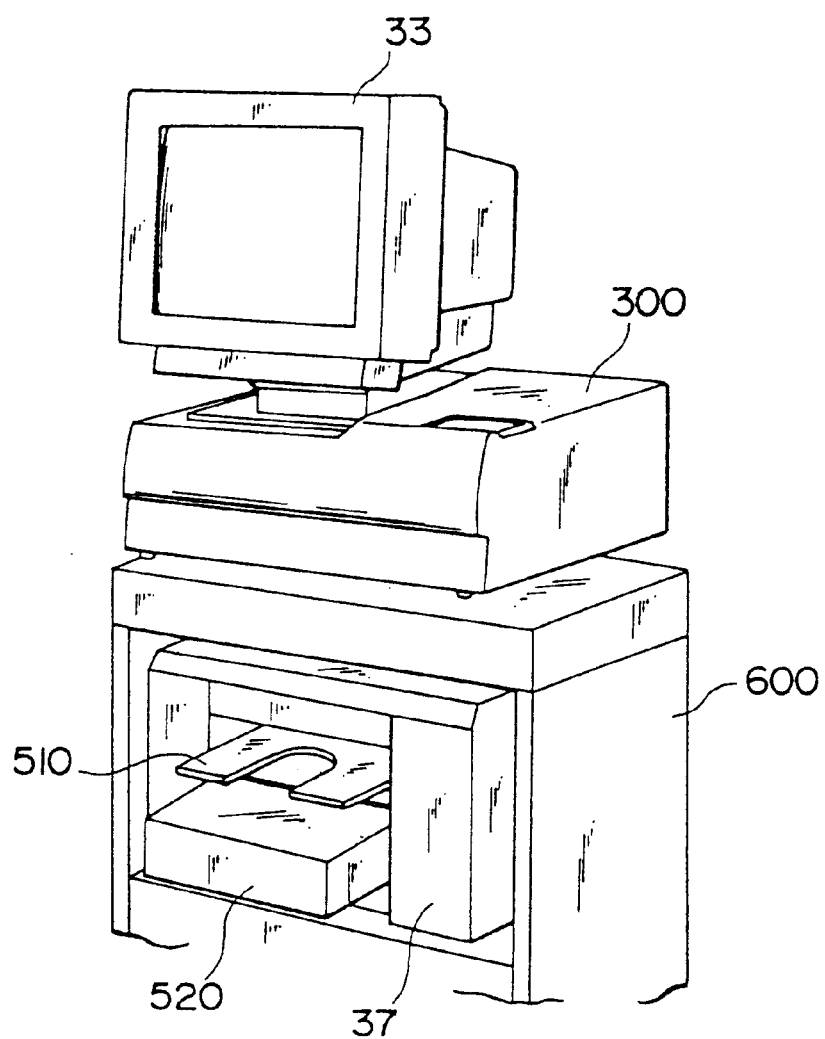
FIG. 4 is a perspective view showing the whole of an image synthesizer and a display device and a printer which are connected to the image synthesizer.

FIG. 4 is a perspective view showing the whole of an image synthesizing system.

The image synthesizing system is installed in various places. Examples include stores such as a film processing laboratory (store), a photograph shop, a department store, a convenience store and other shops or stores. The image synthesizing system is generally operated by a customer (a user). In the place where an operator is normally stationed, for example, the film processing laboratory, the image synthesizing system may be operated by the operator.

Input media which can be handled by the image synthesizing system are mainly classified into two kinds. One of the kinds is one on which an image is visually expressed. Examples are photographic films (a photographic film of a conventional type and a photographic film with an information recording portion), pictures printed on photographic printing paper, and prints (pictures on a poster, a calendar, etc.). They are referred to as visible image media. The other kind is one on which digital data representing an image is recorded (stored). Examples are an optical disk, a magneto-optic disk, a magnetic disk, and a memory card. They are referred to as digital media.

An image appearing on the photographic film with an information recording portion 1 is read by a film scanner 42 as described later (see FIGS. 7, 8, 10, 15, etc.). Examples of the magnetic disk include an ordinary floppy disk and a large-capacity (high density recording) floppy disk. Disk drivers 39 and 41 (see FIG. 15) are provided in order to read image data recorded on these two kinds of magnetic disks.

Figure 15:
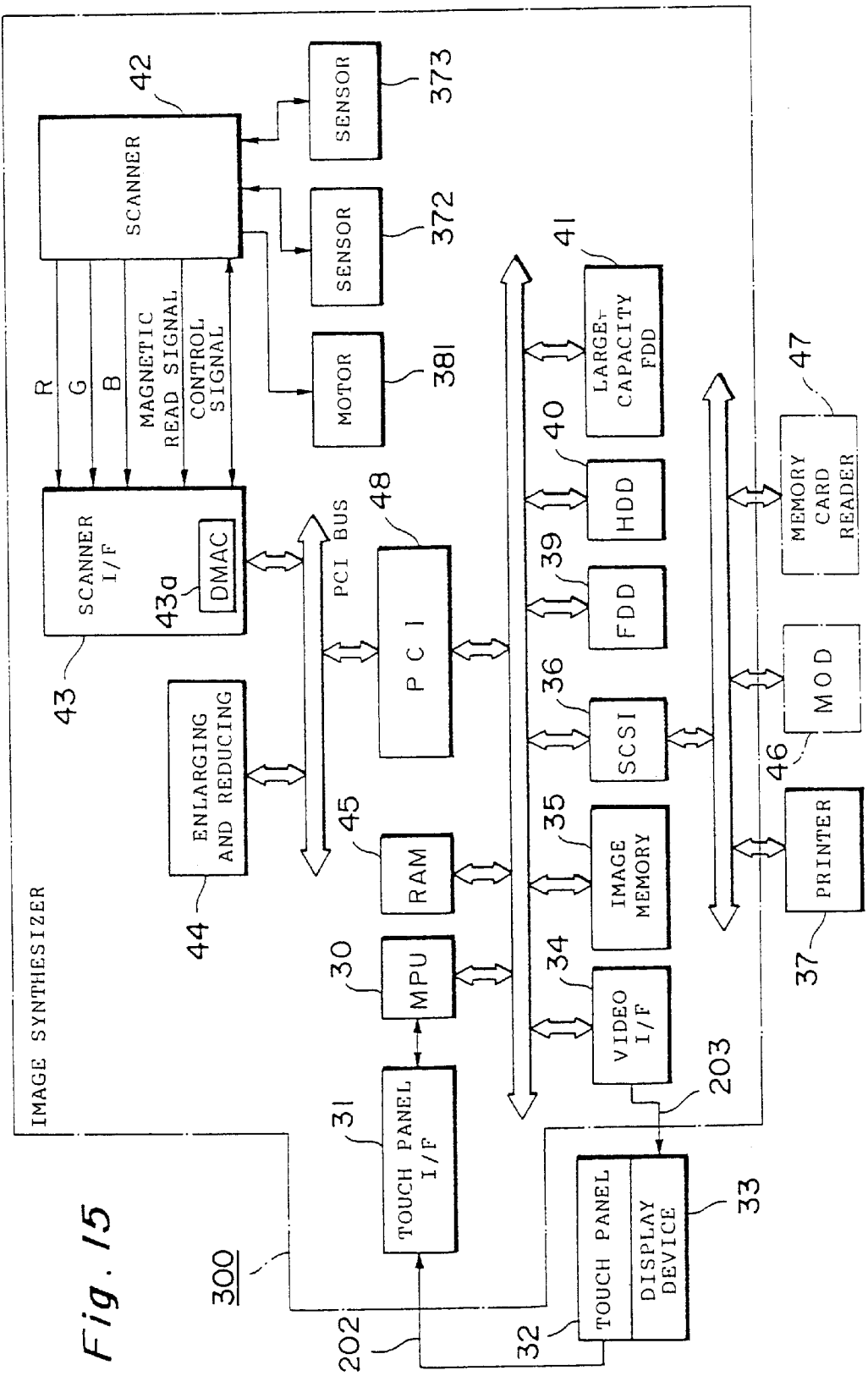
FIG. 15 is a block diagram showing the electrical construction of the image synthesizer.

An image on the photographic film of a conventional type is read by a film scanner. The pictures printed on photographic printing paper and the prints are read by a flat-bed scanner. Image data recorded on the optical disk is read by an optical disk driver. Image data recorded on the magneto-optic disk is read by a magneto-optic disk driver. Image data recorded on a semiconductor memory in the memory card is read by a memory card reader. The scanner for the photographic film of a conventional type, the optical disk driver, the magneto-optic disk driver and the memory card reader can be connected to an image synthesizer 300 as described below so as to be attachable and detachable (an magneto-optic disk driver 46 and a memory card reader 47 are illustrated in FIG. 15).

Output media of the image synthesizing system are basically paper on which a composite image is printed. Therefore, a printer 37 is provided. Data representing a composite image can be also recorded on the magnetic disk by the disk driver 39 or 41. In this case, the output media include a magnetic disk (an ordinary floppy disk or a large-capacity floppy disk).

The image synthesizing system comprises an image synthesizer 300, a monitor display device 33, and a printer 37. The image synthesizer 300 is placed on a rack 600, and the monitor display device 33 is placed on the image synthesizer 300. In the image synthesizer 300, a composite image is produced, as described in detail later. The composite image is displayed on the monitor display device 33. The printer 37 is accommodated in the rack 600. The printer 37 is provided with a paper feeding tray 520 and a discharged paper receiving plate 510. The composite image produced in the image synthesizer 300 is printed by the printer 37 on paper contained in the paper feeding tray 520. The paper on which the composite image is printed is discharged from the discharged paper receiving plate 510.

Figure 5:
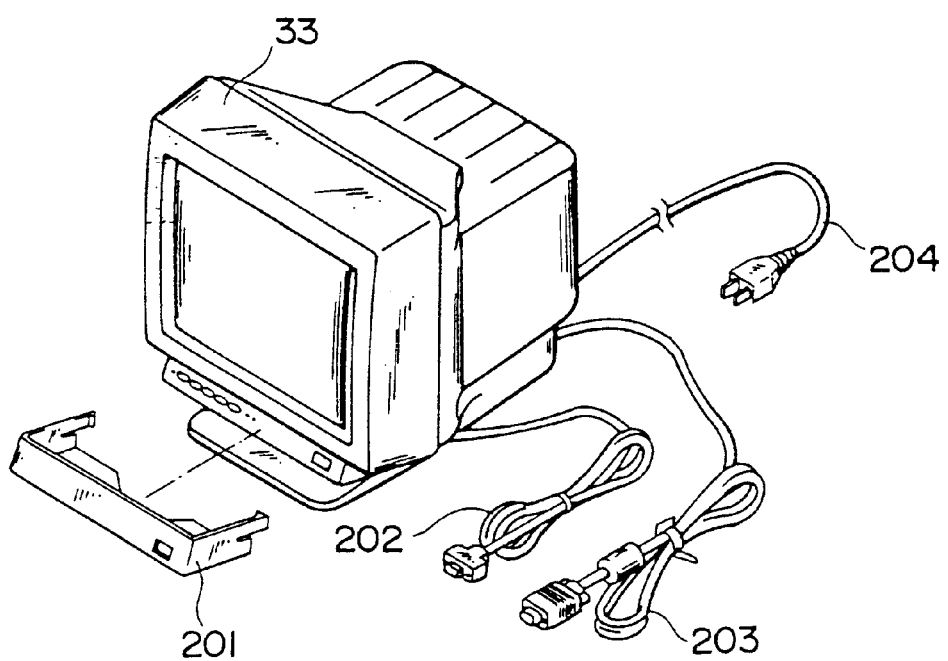
FIG. 5 is a perspective view of the display device.

FIG. 5 is a perspective view of the monitor display device 33.

A touch panel 32 (see FIG. 15) is provided on a display screen of the monitor display device 33. One or a plurality of sections to be touched by a user, an operator or a maintenance man are displayed, as described in detail later, on the display screen of the monitor display device 33. The user, the operator, or the maintenance man touches any one of the sections, to enter a desired command. A signal representing the command given from the touch panel 32 is outputted through a signal cable 202, and is fed to the image synthesizer 300.

A signal cable 203 for inputting composite image data and the other data fed from the image synthesizer 300 is connected to the monitor display device 33. An image represented by the image data fed through the signal capable 203 is displayed on the display screen of the monitor display device 33.

A power code 204 for supplying power is connected to the monitor display device 33.

Furthermore, a bezel cover 201 for protecting a brightness adjusting button and other buttons is provided in the lower part of the monitor display device 33 so as to be attachable and detachable.

② Mechanical construction of image synthesizer

Figure 6:
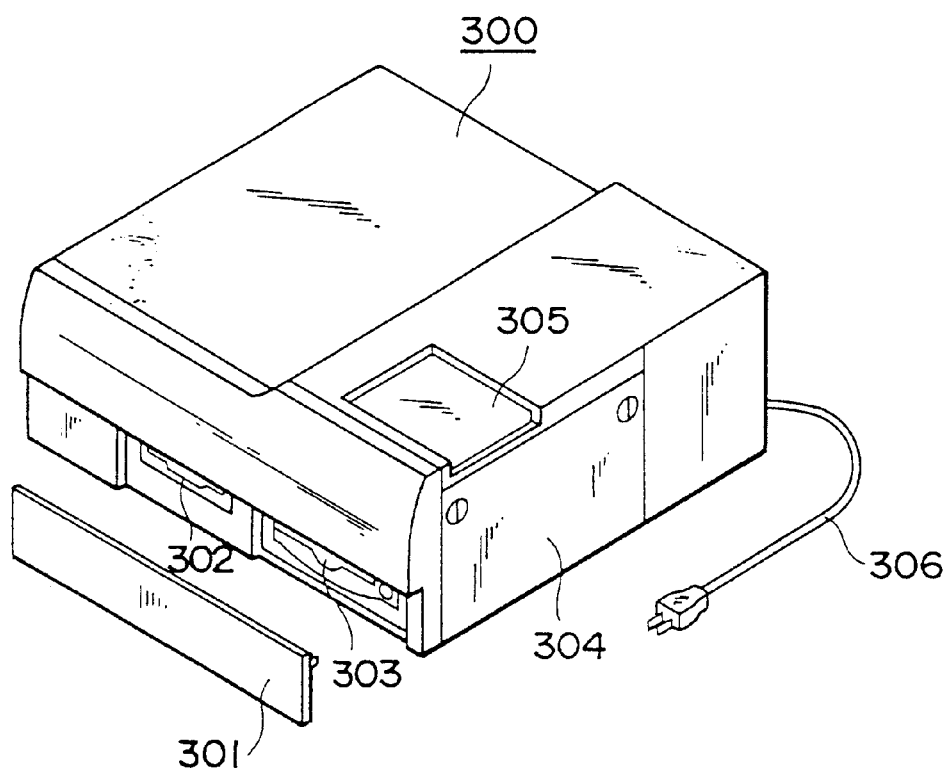
FIG. 6 is a perspective view of the image synthesizer.

FIG. 6 is a perspective view of the image synthesizer 300.

An insertion port 302 of a floppy disk (which constitutes a part of the disk driver 39) and an insertion port 303 of a large-capacity floppy disk (which constitutes a part of the disk driver 41) are respectively provided on the front surface of a housing of the image synthesizer 300. A front panel cover 301 for protecting the insertion ports 302 and 303 is provided in the housing of the image synthesizer 300 so as to be attachable and detachable.

The film scanner 42 is contained in the housing of the image synthesizer 300 so as to be attachable and detachable. In order to take out the film scanner 42 from the housing of the image synthesizer 300, a part of the right side surface of the housing of the image synthesizer 300 is provided with an opening. The opening is closed by screwing a side plate 304 on the housing of the image synthesizer 300.

An opening is provided in one side part on the upper surface of the housing of the image synthesizer 300, and the opening is covered with a slide cover (an outer cover) 305. The slide cover 305 is capable of being freely opened or closed by a motor, as described later. The film scanner 42 contained in the housing of the image synthesizer 300 is exposed by opening the slide cover 305.

A power code 306 for supplying power is connected to the image synthesizer 300.

Figure 7:
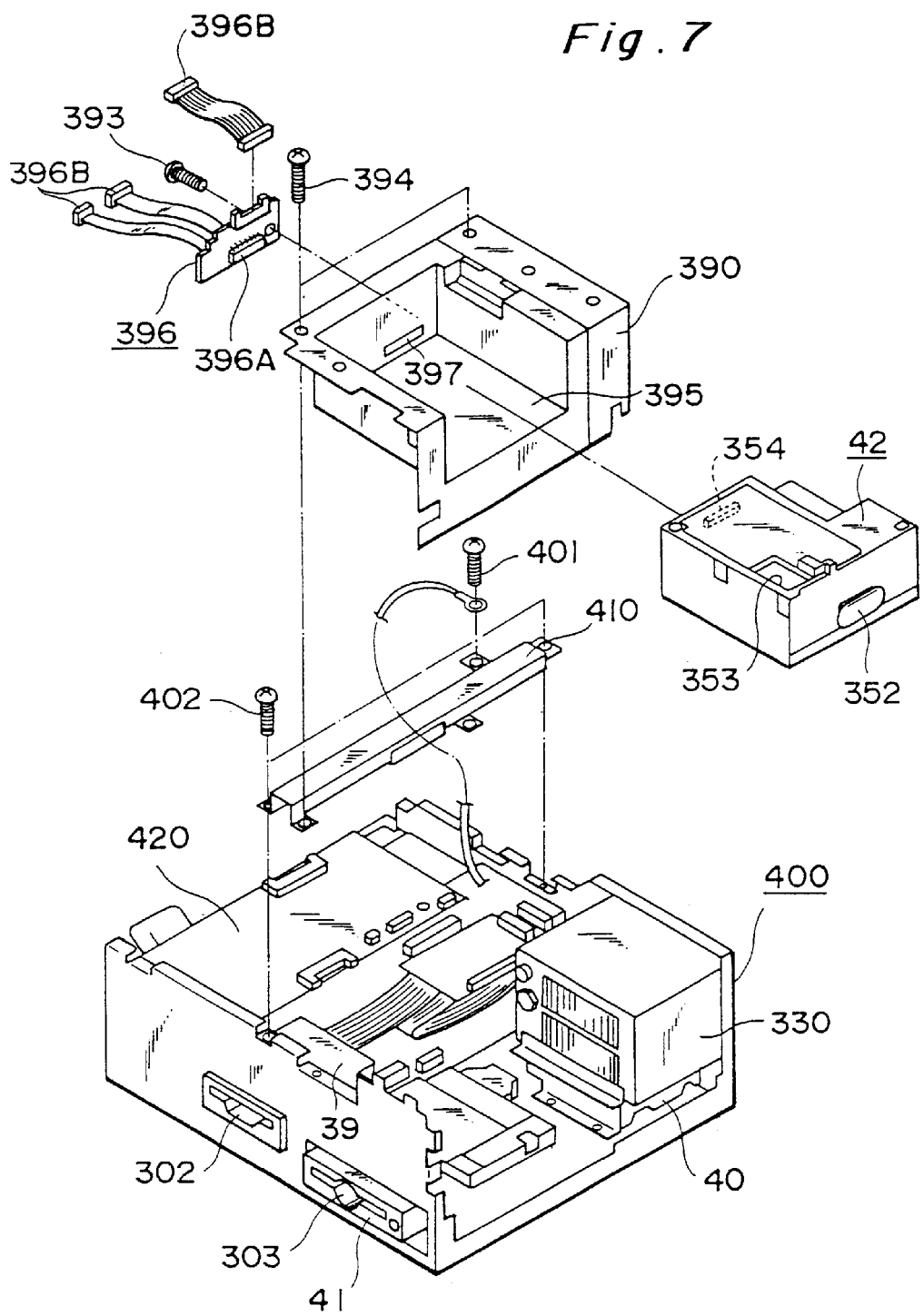
Figure 8:
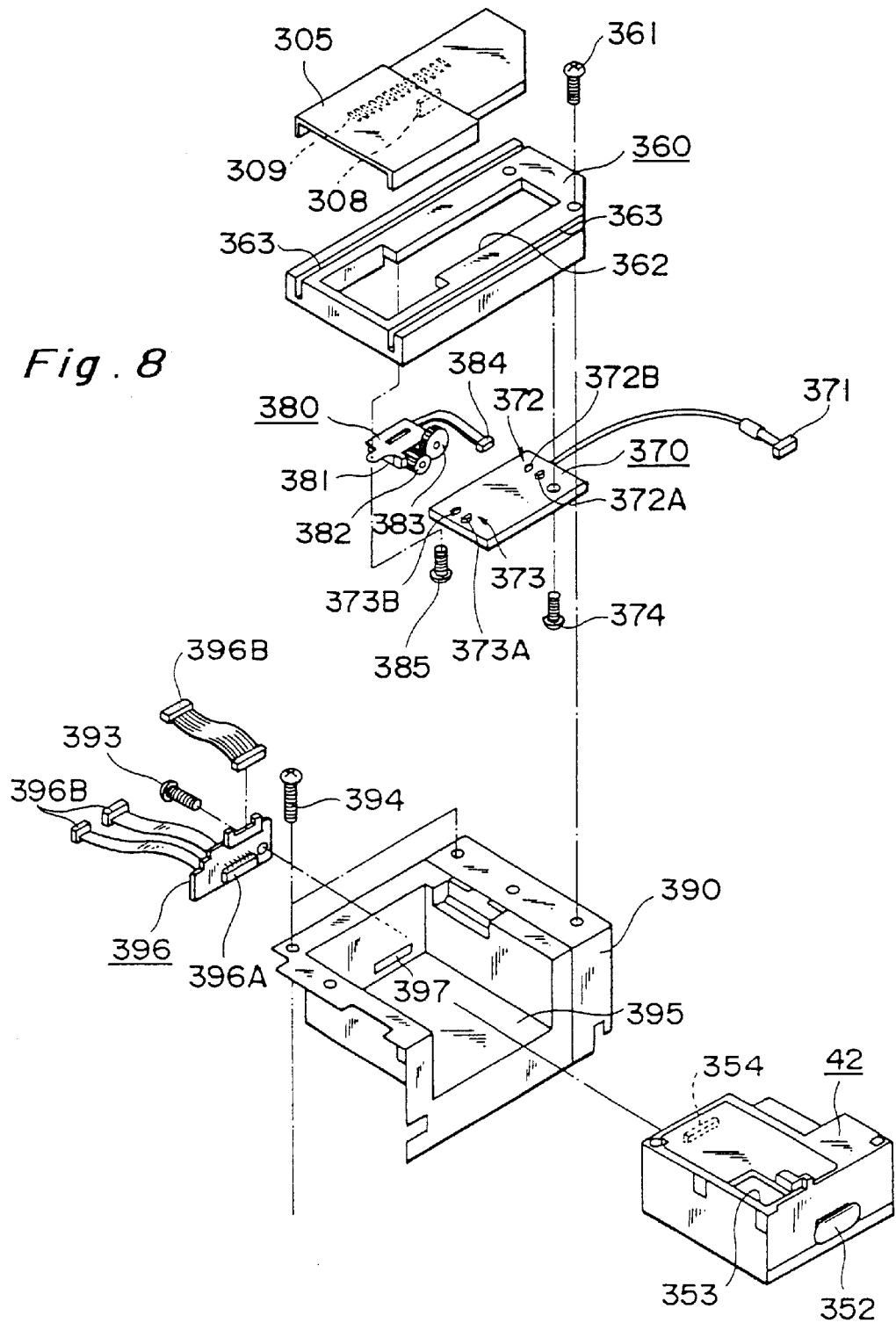

FIGS. 7 to 9 are perspective exploded views of the image synthesizer 300.

Referring to FIG. 7, the floppy disk driver 39, the large-capacity floppy disk driver 41, a power supply circuit 330, a hard disk driver 40, and a main circuit board 420 on which an MPU 30, a PCI 48 (see FIG. 15) and other circuits are arranged are fixed to a frame 400. A beam 410 is mounted on an approximately central portion of the frame 400 by screws 401 and 402.

A scanner containing frame 390 is formed with a recess 395 for containing the film scanner 42. A mounting port 397 is formed in the innermost part of the containing recess 395.

The scanner containing frame 390 is fixed to the beam 410 by screws 394. Further, a connector unit 396 is fixed to the scanner containing frame 390 by a screw 393. The connector unit 396 is provided with a connector 396A, and the connector 396A is projected toward the inside of the scanner containing frame 390 through the mounting port 397. The connector unit 396 is provided with other connectors 396B which are electrically connected to the connector 396A, and the connector 396B is connected to connectors provided on the circuit board 420.

The film scanner 42 is formed as a unit in its case. A handle 352 for drawing and pressing the film scanner 42 out of and into the containing recess 395 of the scanner containing frame 390 is provided on the front surface of the case of the film scanner 42. A connector 354 is provided on the rear surface of the case of the film scanner 42. When the film scanner 42 is contained in the containing recess 395 of the scanner containing frame 390, the connector 354 is connected to the connector 396A of the connector unit 396. Transmission of data and other signals between the film scanner 42 and circuits in the circuit board 420 are made possible. Preferably, the size of the scanner containing recess 395 is made approximately the same as or slightly larger than the size of the case of the film scanner 42. Therefore, the film scanner 42 is hardly moved in the recess 395 even if vibration, for example, is applied thereto.

Referring to FIG. 8, a cover holder 360 is fixed to the scanner containing frame 390 by screws 361. Two guide grooves 363 are formed on both sides of the cover holder 360. A slide cover 305 has portions folded downward provided on both sides thereof. The folded portions of the slide cover 305 enter the guide grooves 363 of the cover holder 360. The slide cover 305 slides along the guide grooves 363. A shielding member 308 is so provided as to be projected downward on the inner surface of the slide cover 305.

A gear unit 380 is fixed to the lower surface of the cover holder 360 by a screw 385. The gear unit 380 includes a driving motor 381 for opening or closing the slide cover 305. The driving motor 381 is driven by power and controlled by a control signal, the power and the control signal being fed through a cable including a connector 384. A pinion 383 is engaged with a gear 382 mounted on the rotational axis of the driving motor 381. On the other hand, a rack 309 is fixed to the lower surface of the slide cover 305. The pinion 383 is engaged with the rack 309 through an opening 362 of the cover holder 360. The slide cover 305 is moved by rotating the driving motor 381 in the forward or reverse direction, to open or close an opening 305A provided in a cover frame 310.

A sensor unit 370 is further fixed to the lower surface of the cover holder 360 by screws 374. The sensor unit 370 is for sensing whether the slide cover 305 is opened or closed. The sensor unit 370 includes two photoelectric sensors 372 and 373, and faces the opening 362. The photoelectric sensor 372 is constituted by a light emitting device 372A and a light receiving device 372B for receiving light emitted from the light emitting device 372A. The photoelectric sensor 373 is also constituted by a light emitting device 373A and a light receiving device 373B for receiving light emitted from the light emitting device 373A. When the slide cover 305 closes the opening 305A, the shielding member 308 enters a space between the light emitting device 373A and the light receiving device 373B to block its optical path, whereby a sensing signal indicating that the slide cover 305 is closed is outputted from the photoelectric sensor 373. When the opening 305A is opened, the shielding member 308 enters a space between the light emitting device 372A and the light receiving device 372B, whereby a sensing signal indicating that the slide cover 305 is opened is outputted from the photoelectric sensor 372. The opened or closed state of the slide cover 305 is sensed by the two photoelectric sensors 372 and 373. The sensing signals from the photoelectric sensors 372 and 373 are outputted through a cable having a connector 371.

The cable of the gear unit 380 and the cable of the sensor unit 370 are connected to the main circuit board 420 by the connectors 384 and 371, and are connected to a CPU 20 (see FIG. 14) of the film scanner 42 from the circuit board 420 through the connector 396B and the connector 396A of the connector unit 396, and the connector 354 of the film scanner 42 (also see FIG. 15).

Referring to FIG. 9, the image synthesizer 300 is provided with the cover frame 310. An opening 304A for getting the film scanner 42 to and out of the image synthesizer 300 as described above is formed on the right side surface of the cover frame 310. The opening 304A is covered with a side plate 304 to be screwed. The opening 305A is provided in a side portion of the upper surface of the cover frame 310. The slide cover 305 opens or closes the opening 305A as described above.

Openings 302A and 303A are provided on the front surface of the cover frame 310. The one opening 302A is for exposing an insertion port 302 of the floppy disk driver 39, and the other opening 303A is for exposing an insertion port 303 of the large-capacity floppy disk driver 41.

③ Film scanner

Figure 10:
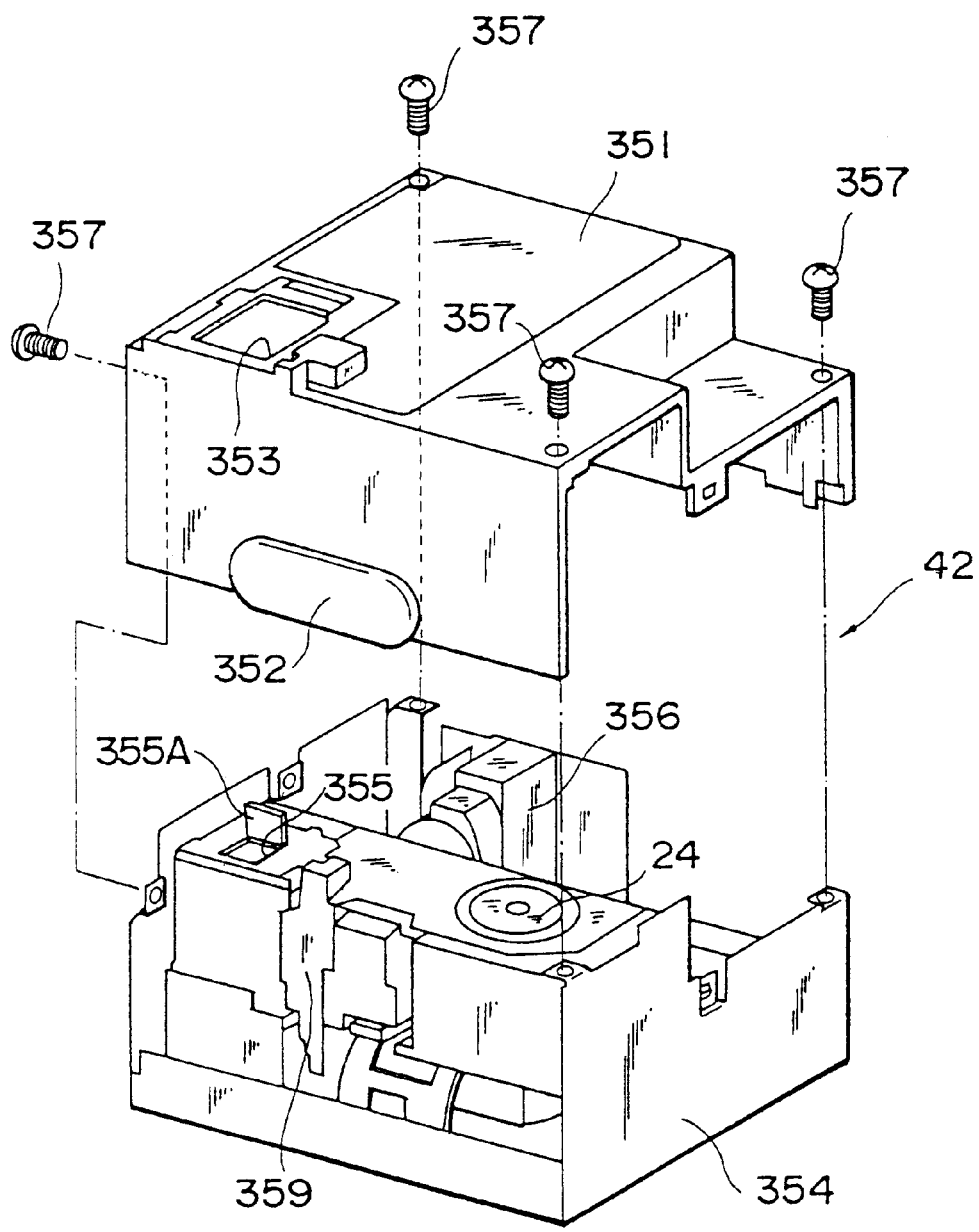
FIG. 10 is a perspective exploded view of a film scanner.

FIG. 10 is a perspective exploded view of the film scanner 42.

A cover 351 of the film scanner 42 is secured to the case 354 by screws 357. An opening 353 for inserting the cartridge 5 of the photographic film with an information recording portion and taking out the cartridge 5 is formed at a forward position on the upper surface of the cover 351. When the film scanner 42 is contained in the containing recess 395 of the scanner containing frame 390, the opening 353 coincides with the opening 305A of the cover frame 310 in the image synthesizer 300.

A cartridge container 355 for containing the cartridge of the photographic film with an information recording portion is formed at a position, which corresponds to the opening 353, of the case 354, i.e., on the left and front side of the case 354. An inner cover 355A which can be opened or closed by hand is provided at an opening of the cartridge container 355. A take-up reel 24 of the photographic film is arranged on the right and front side of the case 354.

A film conveying path is provided between the cartridge container 355 and the reel 24. An optical path of light for reading a film image is provided in an arrangement perpendicular to the conveying path. That is, a light source assembly 359 and a reading optical system 356 are respectively arranged ahead of and behind the film conveying path.

Figure 11:
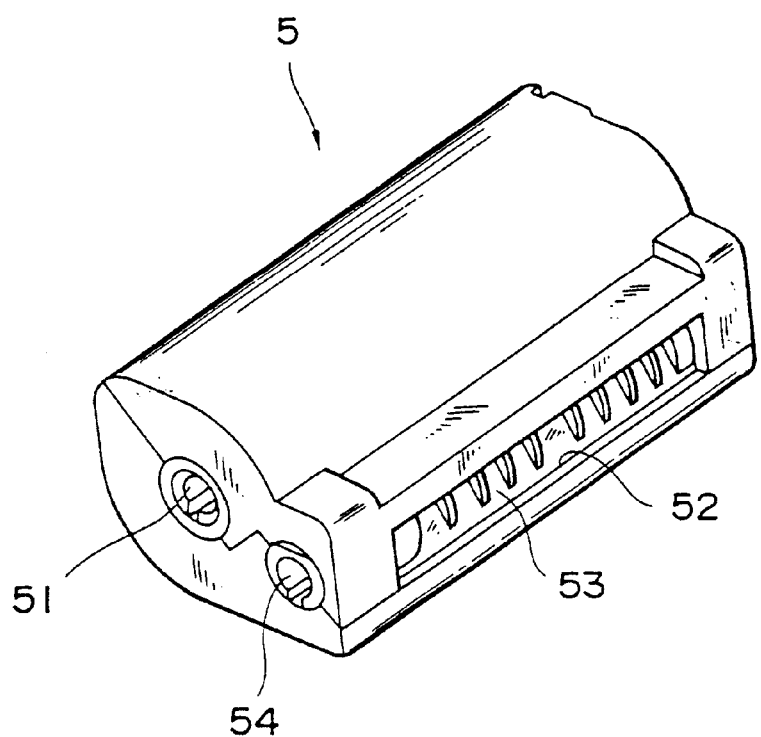
FIG. 11 is a perspective view of the advanced new photographic film with an information recording portion.

FIG. 11 illustrates the construction of the cartridge 5 of the photographic film with an information recording portion. A spool 51 is rotatably supported on the center of the cartridge 5. Further, one side portion of the cartridge 5 is slightly projected, and a film drawing port 52 is formed in this portion. A shielding cover 53 is provided in the drawing port 52. Both ends of a shaft 54 for opening or closing the shielding cover 53 is exposed to both ends of the cartridge 5.

Figure 12:
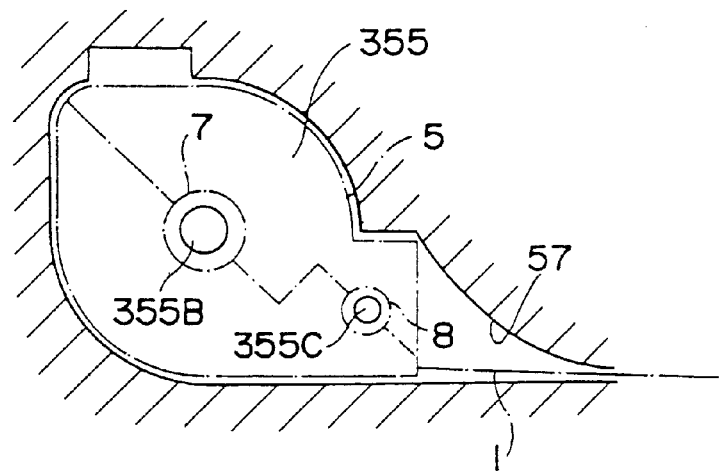
FIG. 12 is a horizontal sectional view showing a cartridge container of the photographic film.
Figure 13:
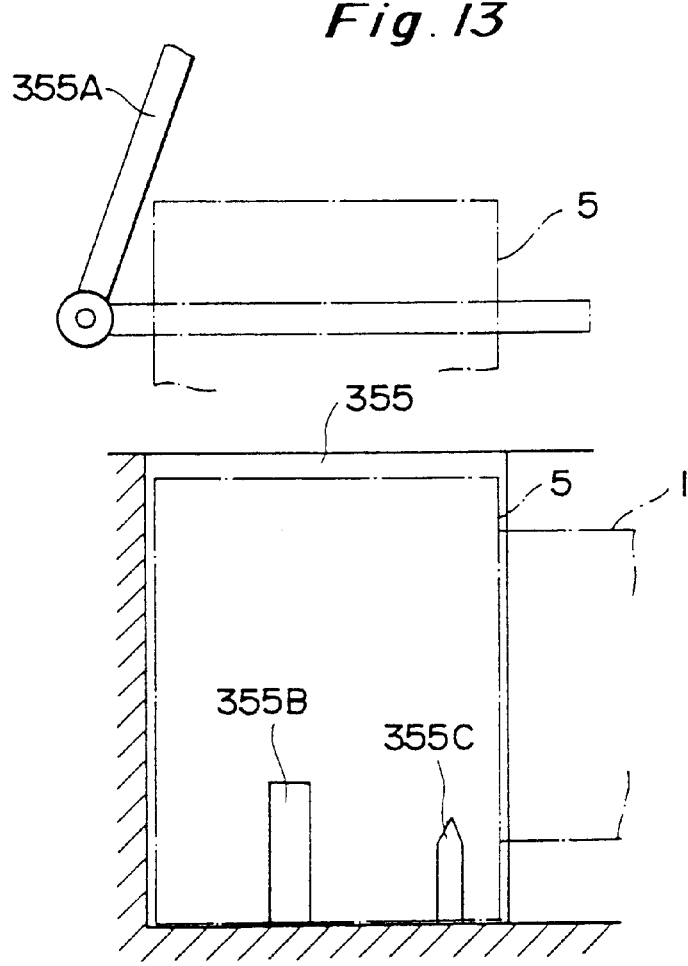
FIG. 13 is a vertical sectional view showing the cartridge container of the photographic film.

FIGS. 12 and 13 illustrate the cartridge container 355 provided in the case 354 of the film scanner 42. The cartridge container 355 is a recess which has approximately the same shape as the outer shape of the cartridge 5 and the cartridge 5 loosely enters.

A pop-up mechanism and a mechanism for locking the inner cover 355A and the pop-up mechanism (both mechanism are not illustrated) are provided in the cartridge container 355. The pop-up mechanism is for quietly projecting the cartridge 5 from the cartridge container 355, and includes a spring for urging the cartridge 5 upward. When the cartridge 5 is pressed into the cartridge container 355 against the force of the spring, the pop-up mechanism is locked at a predetermined position. When the inner cover 355A is closed by hand in this state, the pop-up mechanism falls by one step, and is locked at the final position. The cartridge 5 is put at this position.

The inner cover 355A is always held in its opened state by a spring (not shown). When the inner cover 355A is closed by the fingers of the user against the force of the spring, the inner cover 355A is locked at its closed position by the locking mechanism. It is sensed by a closed inner cover sensor 28 (see FIG. 14) that the inner cover 355A is closed.

The inner cover 355A and the pop-up mechanism are unlocked by driving an inner cover opening motor 29 (see FIG. 14), so that the inner cover 355A is opened, and the cartridge 5 is raised upward by the pop-up mechanism. Consequently, the user can take out the cartridge 5 through the openings 305A and 353. The pop-up mechanism and the locking mechanism have been already known. The details of one example are disclosed in the patent application (Japanese Patent Application No. 8-33632) filed by the same applicant.

A spindle 355B for drawing out and winding up a film and a pin 355C for opening a shielding cover are provided at the bottom of the cartridge container 355. When the cartridge 5 is put at the final position in the cartridge container 355, the spindle 355B is engaged with a hole of the spool 51, and the pin 355C is engaged with a hole of the shaft 54. By driving a film drawing and containing motor 55 (see FIG. 14), the pin 355C is rotated at a predetermined angle through a cam mechanism (not shown), to open the shielding cover 53 of the cartridge 5. The spool 51 is then rotated by the rotation of the spindle 355B, whereby the film 1 in the cartridge 5 is pushed outward through the opened drawing port 52, starting at its end. An introduction guide 57 for introducing the end of the film pushed outward into a film conveying guide 56 (see FIG. 14) is formed in a film in-and-outlet of the cartridge container 355.

If the film drawing and containing motor 55 is rotated in the reverse direction, the spool 51 is also rotated in the reverse direction, so that the film 1 pulled outward is contained in the cartridge 5. The pin 355C is rotated in the reverse direction at a predetermined angle by a cam mechanism (not shown), to close the shielding cover 53.

Figure 14:
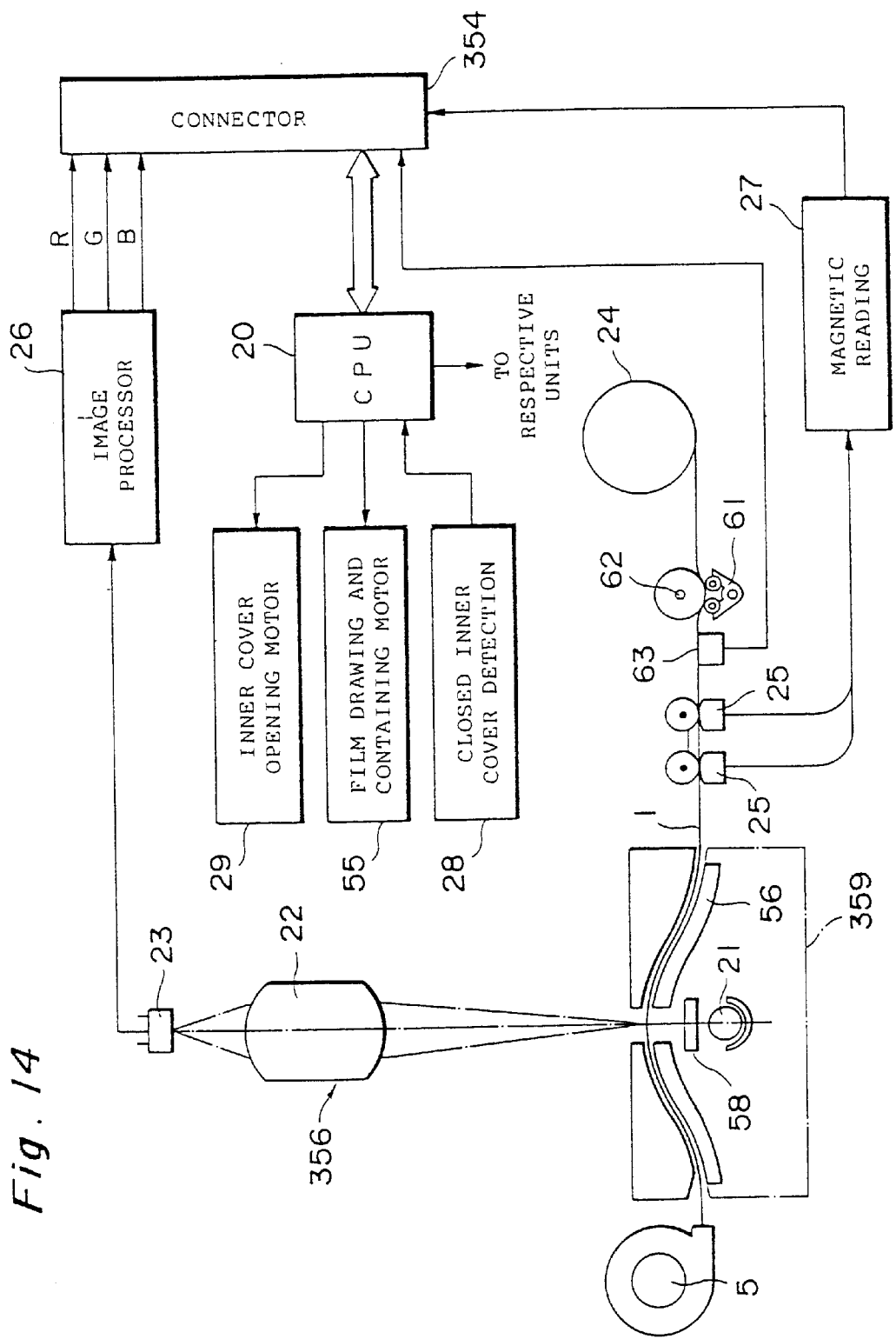
FIG. 14 illustrates the construction of the film scanner.

FIG. 14 illustrates the internal construction of the film scanner 42. A conveying path of the film 1 is arranged between the position of the cartridge container 355 containing the cartridge 5 and the position of the take-up reel 24. The conveying path is provided with a conveying guide 56. The conveying guide 56 is curved in an arc shape for correcting the bending of the film 1 contained in the cartridge 5.

A light source assembly 359 and a reading optical system 356 are so arranged as to be opposite to each other with the conveying guide 56 interposed therebetween. The light source assembly 359 comprises a light source 21 and an infrared ray cut filter 58. The reading optical system 356 comprises a lens 22 and a CCD (Charge Coupled Device) line sensor 23.

Magnetic heads 25 opposite to rollers, an optical information reading sensor 63, and a capstan 62 and pinch rollers 61 opposite to each other are further arranged on the conveying path of the film 1. The spindle 355B, the film drawing and containing motor 55, the pitch rollers 61, the capstan 62, and the like constitute a film feeding mechanism.

The photographic film 1 is drawn out of the cartridge 5 as described above, and is wound around the reel 24 through the conveying path. The photographic film 1 is conveyed at a predetermined speed by the film feeding mechanism.

Light from the light source 21 is irradiated onto the film 1 being conveyed. Light representing an image of the image recording area of the film 1 is formed on the CCD line sensor 23 by the lens 22. The CCD line sensor 23 includes a lot of (for example, 2048) photoelectric converting elements arranged in a direction perpendicular to the longitudinal direction of the photographic film 1. Image signals corresponding to one line are fed to an image processor 26 from the CCD line sensor 23 in the process of feeding of the film 1. When the film 1 has been fed by the length of one image recording area, image data for one frame is obtained (for example, when the film 1 is fed at the smallest pitch, image data having resolution of 2048×3584 pixels is obtained with respect to one image recording area 4).

The image processor 26 is constituted by a signal processing circuit (including required ones of a white balance circuit, a gamma correcting circuit, a negative/positive inverting circuit, etc.) for processing an image signal (or digital image data after analog-to-digital conversion) obtained from the CCD line sensor 23, an analog-to-digital converting circuit, and the like. Digital image data obtained when the photographic film 1 is sent at the smallest (finest) pitch is referred to as original digital image data. The original image data is fed to an image memory 35 as described later through a connector 354.

The feed speed of the film 1 and the driving of the CCD line sensor 23 are so controlled that the transfer speed of the image signal outputted from the CCD line sensor 23 is maintained at not more than the speed at which the image data is written into the image memory 35.

The original image data is for printing. The original image data is reduced to one-half in length by one-half in breadth, to obtain image data for HDTV (high definition television). The image data for HDTV is further reduced to one-half in length by one-half in breadth, to obtain standard image data. The standard image data is further reduced to one-eighth in length by one-eighth in breadth, to obtain reduced image data. The reduction processing of the image data is performed by performing thinning processing or averaging processing for a plurality of adjacent pixels. The reduction processing is performed by an enlarging and reducing circuit 44 as described later. Image data having different resolution can be also obtained by changing the feeding pitch of the film 1 in the film scanner.

In the process of feeding of the film 1, information magnetically recorded on the information recording portions 3c and 3d are read by the magnetic heads 25. The read signal is fed to a magnetic reading circuit 27. The magnetic reading circuit 27 subjects the read signal to required processing (demodulation, encoding, etc.), and applies the read signal to the MPU 30 as described later through the connector 354. Further, information recorded on the optical information recording area 6 (this information is recorded on the film 1 by exposure in the form of the presence or absence of points, bar codes, etc.) is read by the optical information reading sensor 63. The read signal is fed to the MPU 30 through the connector 354.

The CPU 20 included in the film scanner 42 controls the inner cover opening motor 29, the film drawing and containing motor 55, the film feeding mechanism and others under the control of the MPU 30. Further, a sense signal of the closed inner cover sensor 28 is fed to the MPU 30 through the CPU 20.

④ Electrical construction of image synthesizer

FIG. 15 is a block diagram showing the electrical construction of the image synthesizer.

The image synthesizer has mainly two functions: a photo-joy print service (image synthesis processing) and a digital output service (image conversion processing).

In the photo-joy print service, both a visible image medium and a digital medium are used as an input medium. A print, a memory card, a magneto-optic disk, or a magnetic disk is used as an output medium. In the photo-joy print service, an image recorded on the input medium brought by a user is synthesized on a template image previously stored in the image synthesizer, to output a composite image.

In the digital output service, a visible image medium is used as an input medium. A digital medium is used as an output medium. In the digital output service, an image expressed on the visible image medium is read, is converted into digital image data representing the read image, and is recorded on the digital medium.

In the present embodiment, description is mainly made of the photo-joy print service.

The operations of the whole of the image synthesizer are supervised by the MPU 30.

The image synthesizer comprises the floppy disk driver 39, the hard disk driver 40, the large-capacity floppy disk driver 41 and the scanner 42 as described above, and an interface (a video interface) 34 of the display device 33, a touch panel interface 31, an image memory 35 temporarily storing image data, an SCSI (Small Computer System Interface) 36, a scanner interface 43, an enlarging and reducing circuit 44 for enlarging and reducing an image represented by the image data, a PCI (Peripheral Component Interconnect) 48 and a RAM 45 for temporarily storing data.

The user performs operations of the image synthesis processing in accordance with indications on the display device 33. Specifically, a touch panel 32 is formed on a display screen of the display device 33. The touch panel 32 is connected to the MPU 30 through the interface 31. A guidance (comprising illustrations, sentences, etc.) for guiding the operations and one or a plurality of sections to be touched are displayed on the display screen of the display device 33. The function of a key (including numerical values) is displayed in each of the sections. Consequently, function keys and numeric keys are realized. An input signal representing the position of the section which the operator or the user touches by his or her finger is fed to the MPU 30.

The user selects the type of processing (service) (the photo-joy print service or the digital output service), designates the input medium, and designates a frame to be recorded or printed on the output medium and performs other entry utilizing the touch panel.

The scanner interface 43 includes a DMAC (Direct Memory Access Controller) 43a, and the transfer of image data outputted from the scanner 42 is controlled by the DMAC 43a.

The enlarging and reducing circuit 44 is a circuit for enlarging and reducing an image represented by image data and for executing data compression/expansion processing of image data.

The scanner interface 43, the enlarging and reducing circuit 44, and the PCI 48 are connected to each other by a PCI bus. The high-speed transfer of the image data is possible through the PCI bus by the DMAC 43a. Consequently, the image data outputted from the scanner 42 can be directly stored in the image memory 35 without providing a memory in the scanner 42. The image memory need not be contained in the scanner 42, whereby the cost of the scanner 42 can be kept low.

The RAM 45 temporarily stores data. The image memory 35 stores image data read out from the scanner 42 and the disk drivers 39 and 40.

The hard disk driver 40 writes data to a hard disk and reads out data stored in the hard disk.

The floppy disk driver 39 and the large-capacity floppy disk driver 41 respectively write data including image data to the magnetic disk and the large-capacity magnetic disk serving as input and output media or read out the data from the magnetic disk and the large-capacity magnetic disk, and rewrites the data.

The printer 37 prints an image represented by fed image data.

As described in the foregoing, a film scanner will be provided in order that a conventional photographic film can be used as an input medium, and a flat-bed scanner will be provided in order to utilize the other visible image medium.

A scanner for the conventional photographic film includes a light source, an imaging optical system, a line sensor (or a two-dimensional imaging device), a transport mechanism of the film or the line sensor, a signal processing circuit, an analog-to-digital converting circuit, and the like. The flat-bed scanner for a reflective original comprises a flat bed, and the reflective original to be read is placed on the flat bed. Light from the light source is projected onto the reflective original, and light reflected from the reflective original is inputted to the line sensor or the two-dimensional imaging device. An image signal outputted from the line sensor or the imaging device is stored in the image memory 35 as digital image data after predetermined processing.

Furthermore, as described in the foregoing, the magneto-optic disk driver 46, the memory card reader 47, and the like can be also provided in the image synthesizer 300, as required.

(4) File structure of hard disk

Figure 16:
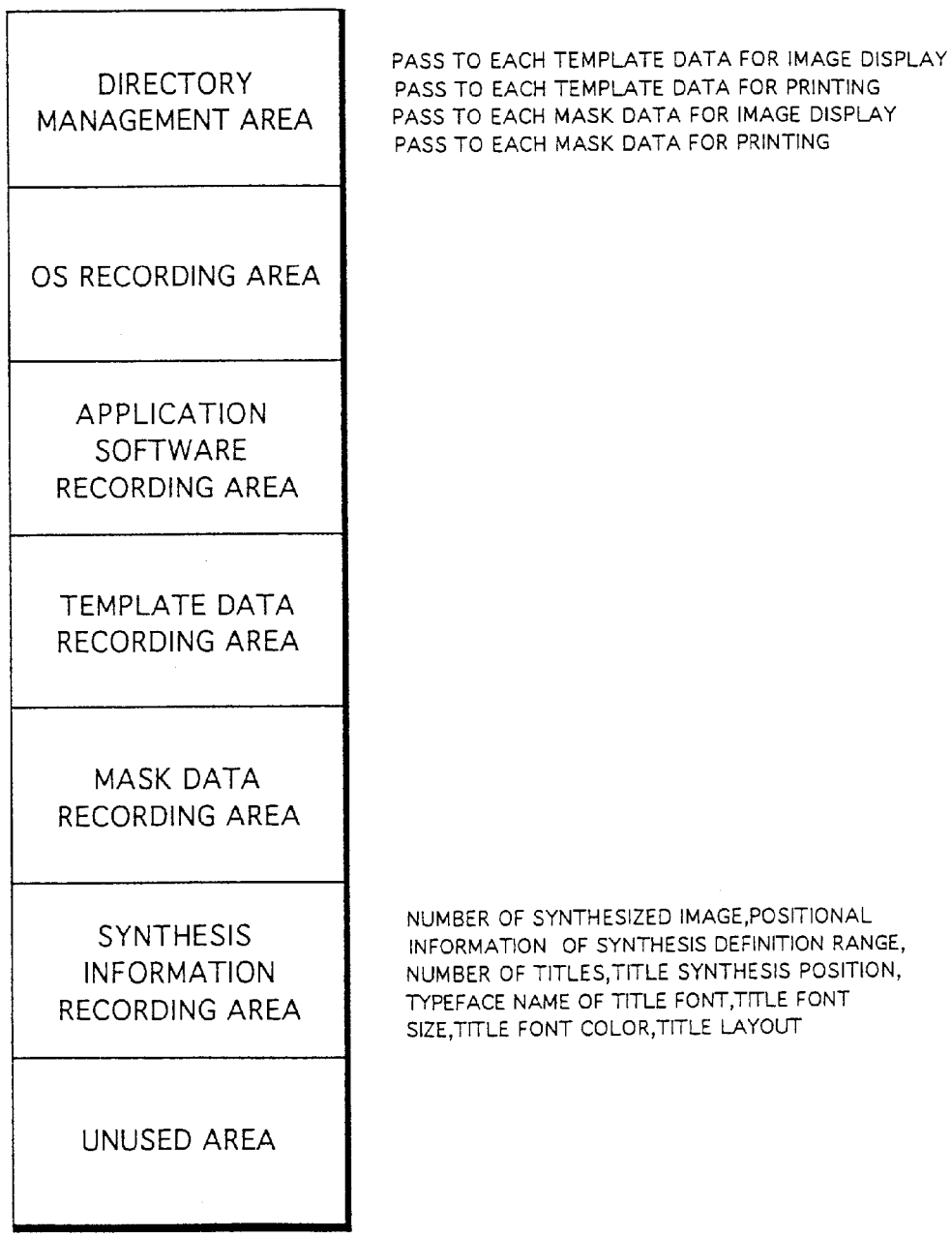
FIG. 16 illustrates the file structure of a hard disk included in the image synthesizer.
Figure 17:
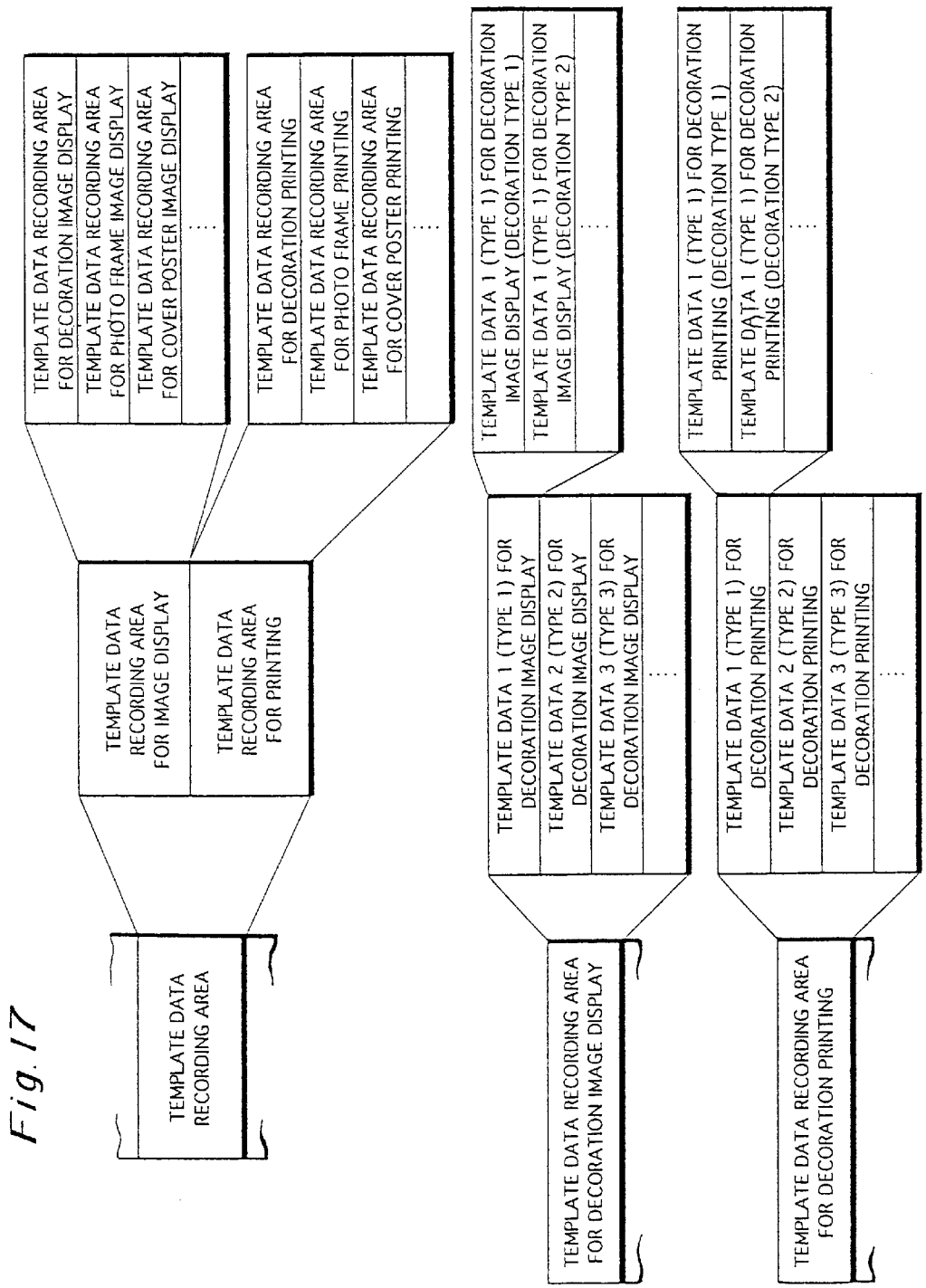
FIG. 17 illustrates the contents of a template image data storage area.
Figure 18:
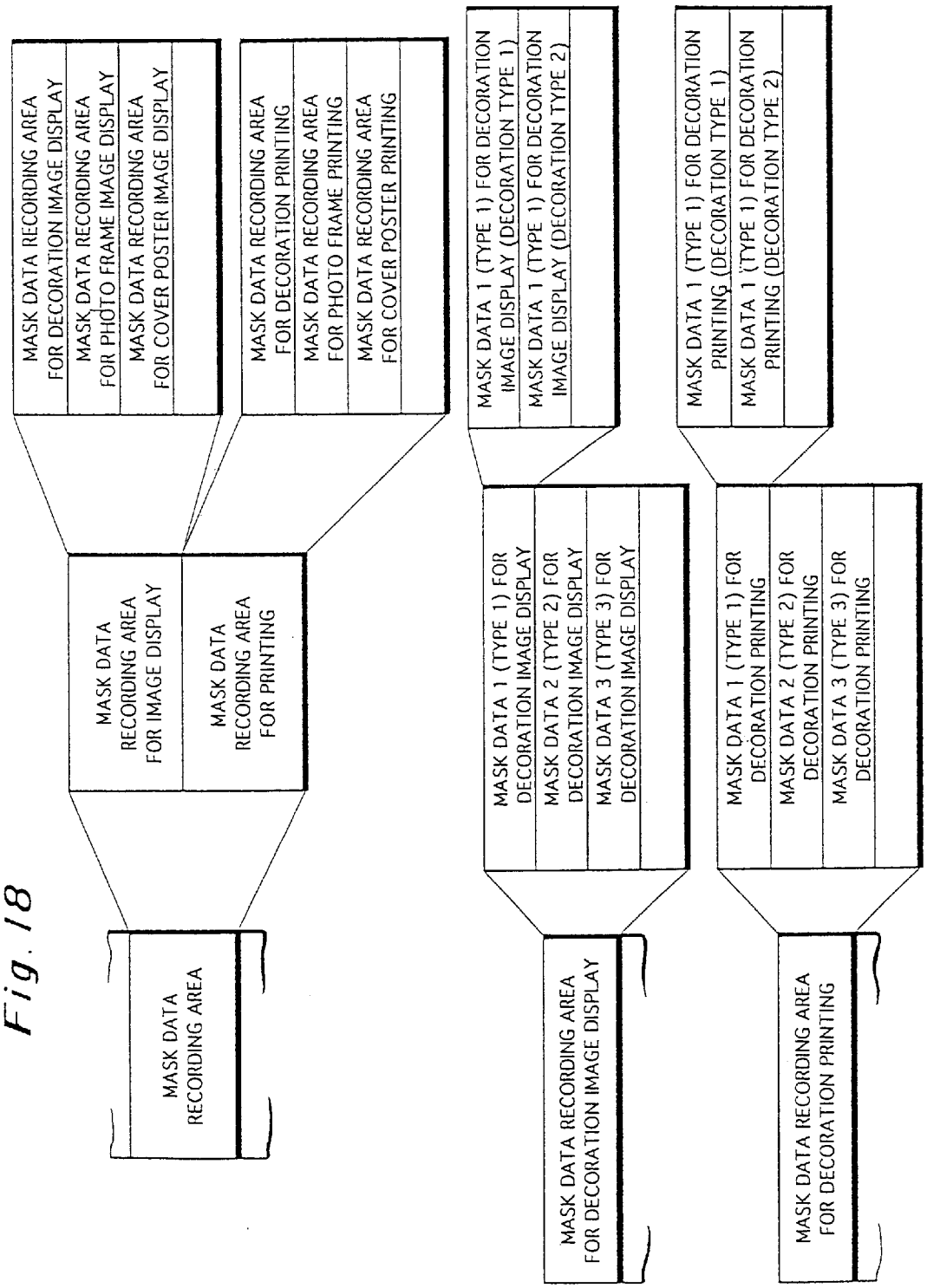
FIG. 18 illustrates the contents of a mask image data storage area.

FIGS. 16 to 18 illustrate a file structure (a data structure) of a hard disk included in the image synthesizer. This illustrates not the physical structure but the logical file structure. Various data shown in FIGS. 16 and 18 may be not a continuous gathered state but a dispersed state. When there are a plurality of hard disks on the image synthesizer, all data shown in FIGS. 16 to 18 need not exist on one hard disk. The data may be recorded in a dispersed manner on the plurality of hard disks.

The hard disk includes a directory management area where all the data stored in the hard disk are managed, an OS recording area on which an OS (Operating System) is recorded, an application software recording area on which software for a photo-joy print service and a digital output service is recorded, a template data recording area on which template image data representing a template image which is a background image of a subject image to be synthesized is recorded, a mask data recording area on which mask image data representing a mask image for defining a synthesis position and a synthesis area of the subject image to be synthesized on the template image is recorded, a synthesis information recording area storing synthesis information utilized for image synthesis, and an unused area.

FIG. 17 illustrates the details of the template data recording area.

Template image data includes template image data for image display used when a composite image displayed on the display screen of the display device 33 is produced, and template image data for printing used when the composite image is printed using the printer 37 and having higher resolution than that of the template image data for image display. The template data recording area includes a template image data recording area for image display and a template image data recording area for printing. The template image data for image display and the template image data for printing are respectively stored in the template image data recording area for image display and the template image data recording area for printing.

Each of the template image data recording area for image display and the template image data recording area for printing is further divided into recording areas depending on the kind of template image (a template image data recording area for decoration image display, a template image data recording area for photo frame image display, etc.). Template image data corresponding to the kind of template is stored in each of the areas.

Furthermore, the same kind of template includes a plurality of types of templates. For example, a decoration template includes types depending on the number of subject images and whether the subject images are displayed longitudinally or laterally (type 1, type 2, etc.). Template image data is stored for each type.

The same type of template further includes a plurality of different decoration types. For example, when the type of template is a decoration template, and subject images of three frames are laterally arranged, there are different decoration types (for example, a decoration for a wedding ceremony, a decoration for an entrance ceremony, etc.). Template image data is stored for each decoration type.

Consequently, the templates are hierarchically classified into kinds, types and decoration types, and all of them must be determined. One kind of template image is selected upon determination of all the kind, the type and the decoration type. A subject image is synthesized on the selected template image.

The template image data for printing is also stored in the template image data recording area for printing in the hard disk in correspondence to the number of template image data for image display for each kind, type and decoration type, similarly to the template image data for image display.

FIG. 18 illustrates the details of the mask data recording area.

The mask image data are classified into kinds, types and decoration types respectively corresponding to the kinds, the types and the decoration types of the template image data, and there are provided areas on which the respective data are to be recorded.

The template image data and the mask image data are respectively recorded on the template data recording area and the mask data recording area in the form of bit map data upon being compressed.

Referring to FIG. 16 again, the directory management area stores a pass to each of the template image data for image display (a pass is information required for a computer to access a storage location storing each data), a pass to each of the template image data for printing, a pass to each of the mask image data for image display, a pass to each of the mask image data for printing, and the other data. The respective image data can be accessed by referring to the passes stored in the directory management area.

The synthesis information recording area stores information utilized for image synthesis. Examples of the synthesis information include the number of synthesized images, positional information of a synthesis definition range (a position and a range where a subject image to be synthesized is to be arranged on the template), the number of titles, a title synthesis position, the typeface name of a title font, the title font size, the title font color, and the title layout.

The number of synthesized images represents the number of subject images to be synthesized on a template image. The positional information of the synthesis definition range represents the position and the size of the synthesis definition range which define the size required for the subject image to be synthesized on the template image (as described in detail later). The number of titles represents, when titles are added to the template image as described later, the number of the titles. The title synthesis position represents, when a title is added to the template image, the position where the title is started (as described in detail later). The typeface name of a title font indicates whether the title is Roman, Gothic, italics or the like. The title font size represents the size of a font used for the title (the size, the point number, etc.). The title font color represents a color of the title. The title layout indicates whether the title is put to the left side, centered or put to the right side.

Such synthesis information is stored as code data on the synthesis information recording area in correspondence to the template image data stored in the template data recording area (the template image data corresponding to all combinations of kinds, types and decoration types).

FIG. 19a illustrates an example of a template image. FIG. 19b illustrates an example of a mask image. FIG. 19c illustrates an example of synthesis information. Template image data representing such template image as illustrated is stored in the template data recording area, mask image data representing the mask image is stored in the mask data recording area, and data representing the synthesis information is stored in the synthesis information recording area.

Figure 21:
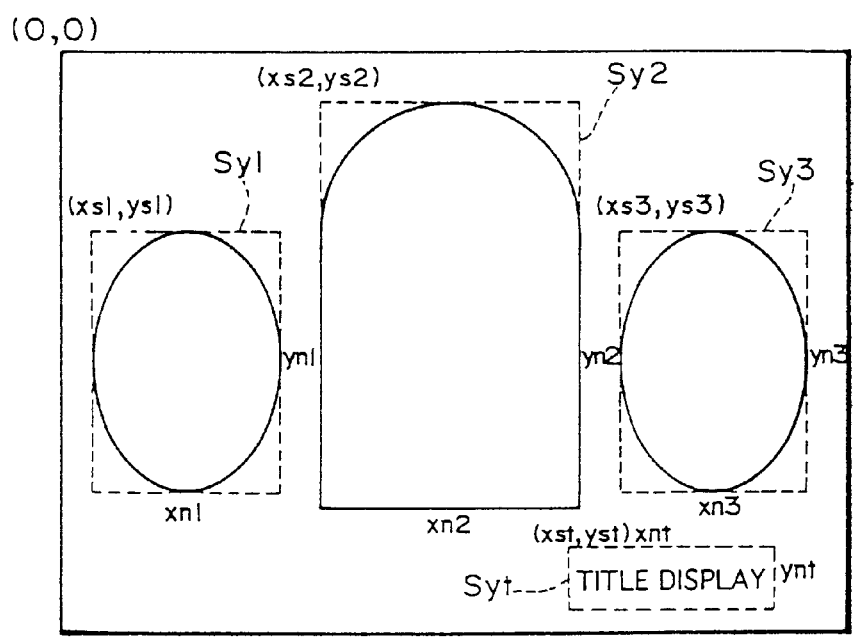
FIG. 21 illustrates the relationship between the position of a synthesis definition range as well as a title synthesis position and a template image.

FIGS. 20 and 21 are diagrams for explaining the positional information of the synthesis definition range and the information of the title synthesis position which are included in the synthesis information. A synthesis definition range $S_{yn}$ (n denotes the number of the synthesis definition range, 1 to 3 in an example shown in FIGS. 20 and 21) is determined by the start position and the size. The start position is indicated by coordinates (xsf, ysf) (f also denotes the number of the synthesis definition range, 1 to 3 in the example shown in FIGS. 20 and 21) at the upper left corner of the synthesis definition range $S_{yn}$ in a case where the upper left corner of the template image is taken as the origin (0, 0). Further, the size of the synthesis definition range is indicated by the number of dots, where the length in the horizontal direction is represented by xnf, and the length in the vertical direction is represented by ynf (f denotes the number of the synthesis definition range).

If the size of a subject image to be synthesized on the template image is smaller than the size of the corresponding synthesis definition range, a white edge or a black edge appears on a composite image. When the size of the subject image is smaller than the size of the synthesis definition range, therefore, the fact is notified. Therefore, a white edge or a black edge can be prevented from being formed on the composite image when the size of the subject image to be synthesized on the template image is smaller than the size of the synthesis definition range.

The title synthesis position and the size thereof are also defined by the start position (xst, yst), and the length in the horizontal direction xnt and the length in the vertical direction ynt (represented by the number of dots).

(5) Image synthesis

Figure 22:
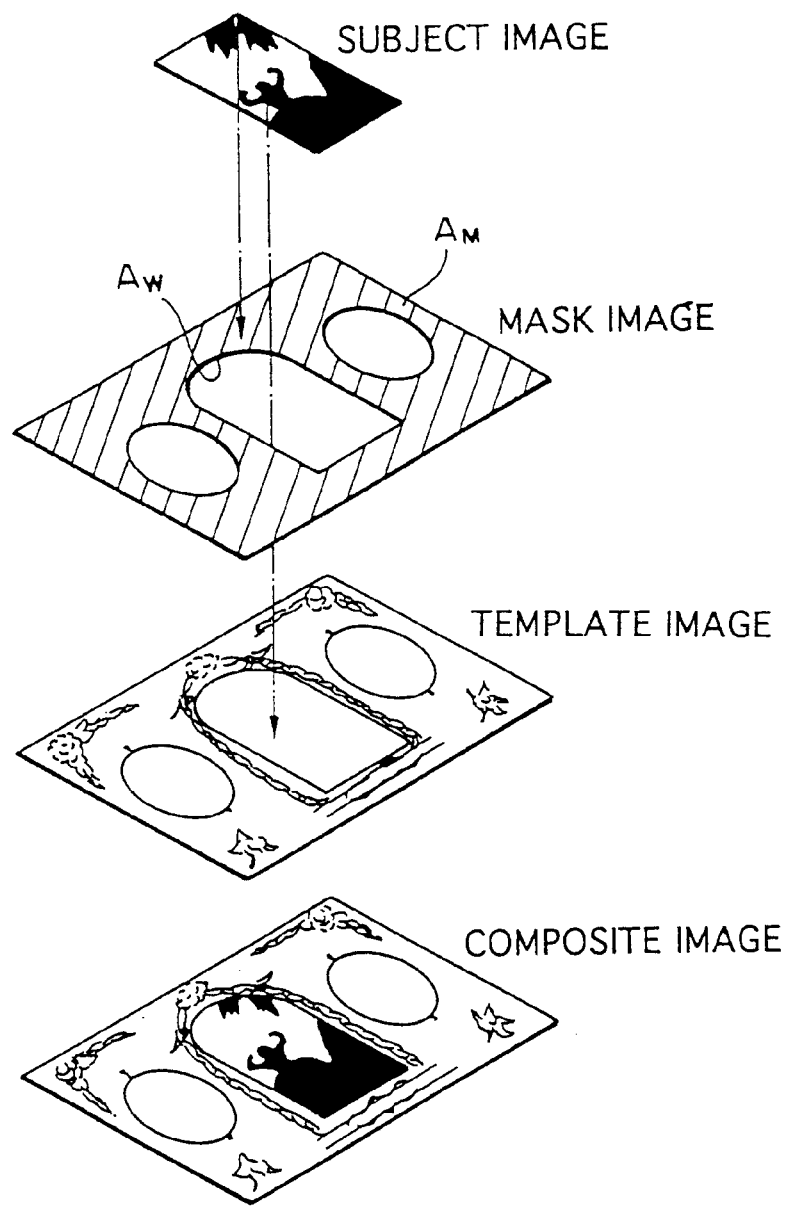
FIG. 22 is a perspective view for explaining image synthesis.
Figure 23:
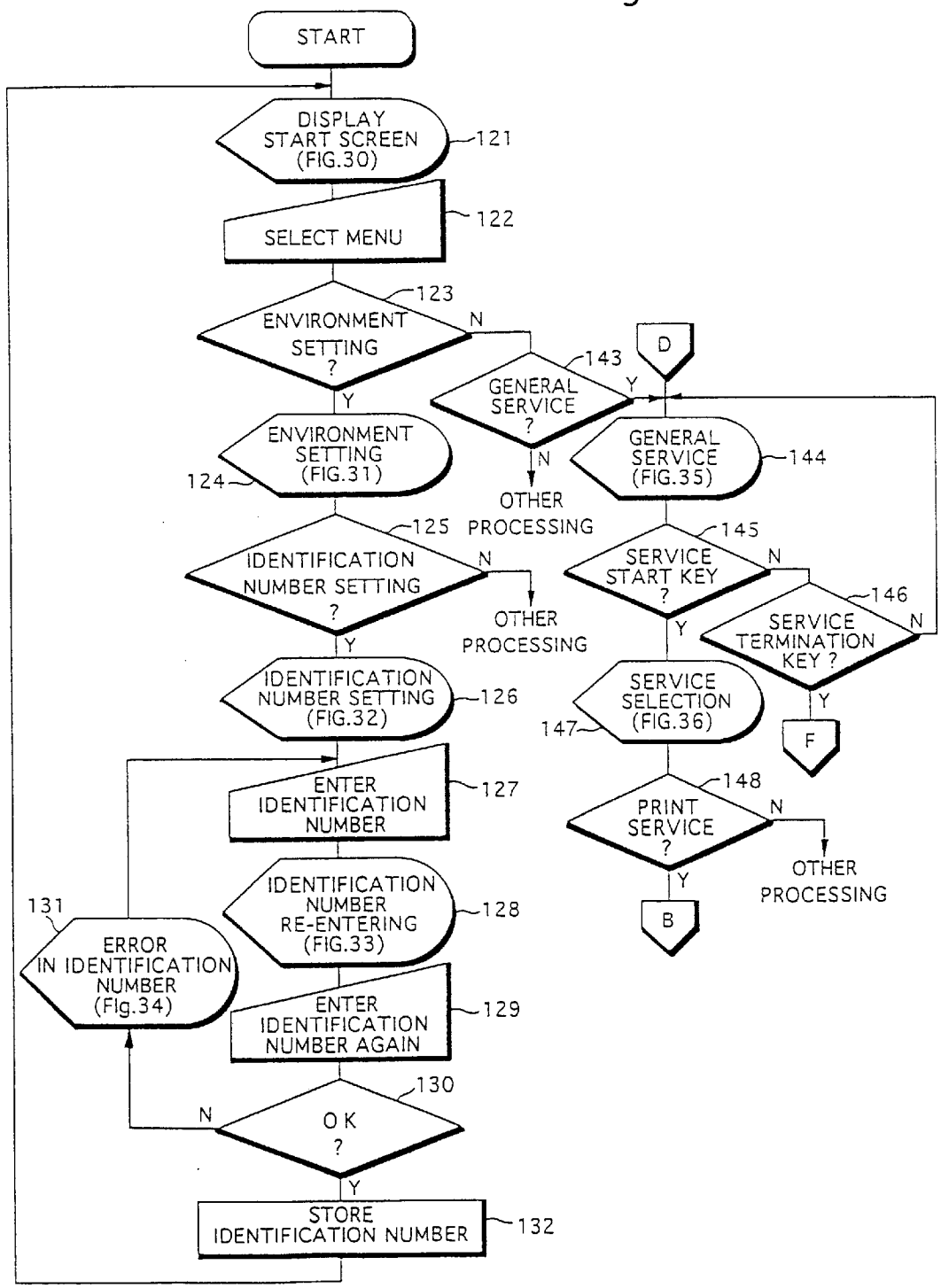
FIGS. 23 to 29 are flow charts showing the procedure for processing in the image synthesizer.
Figure 24:
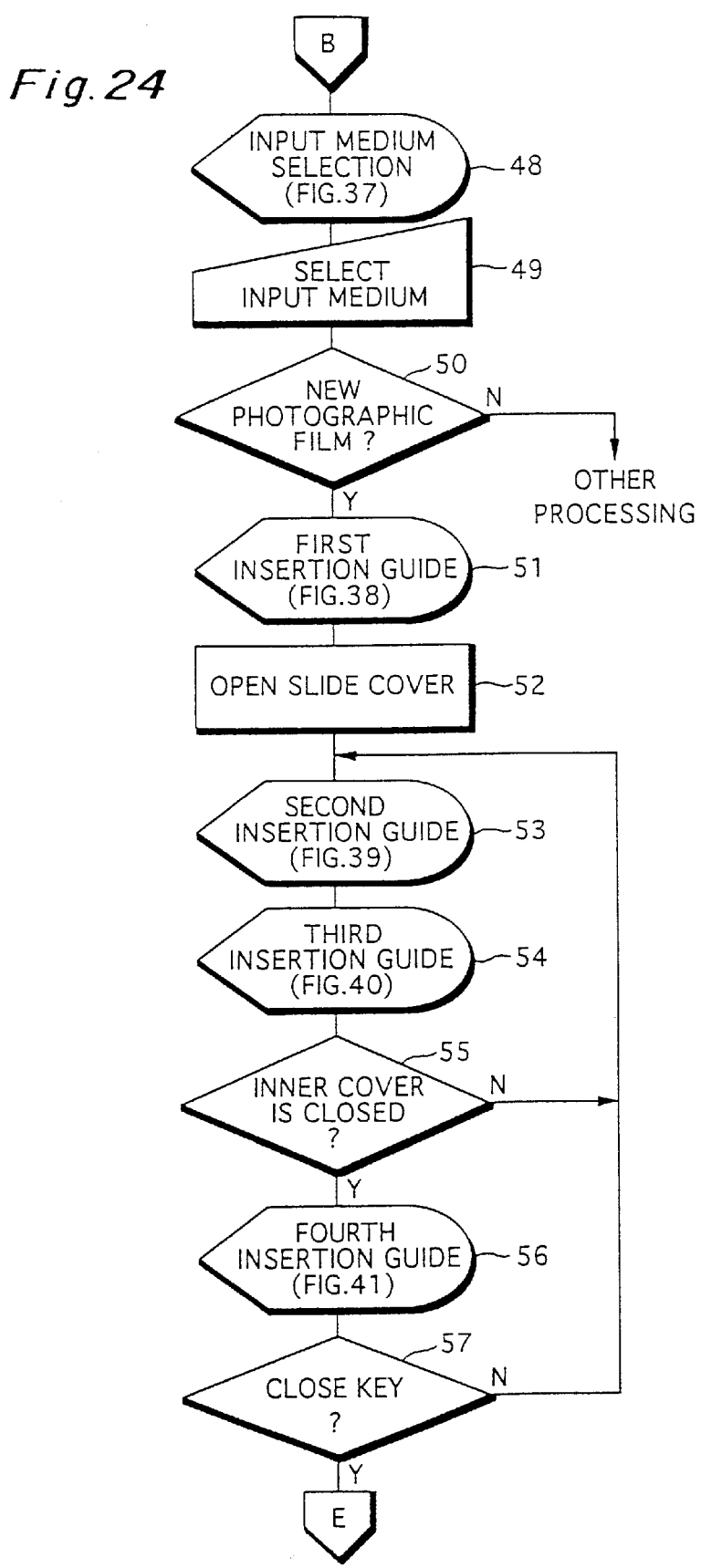
Figure 25:
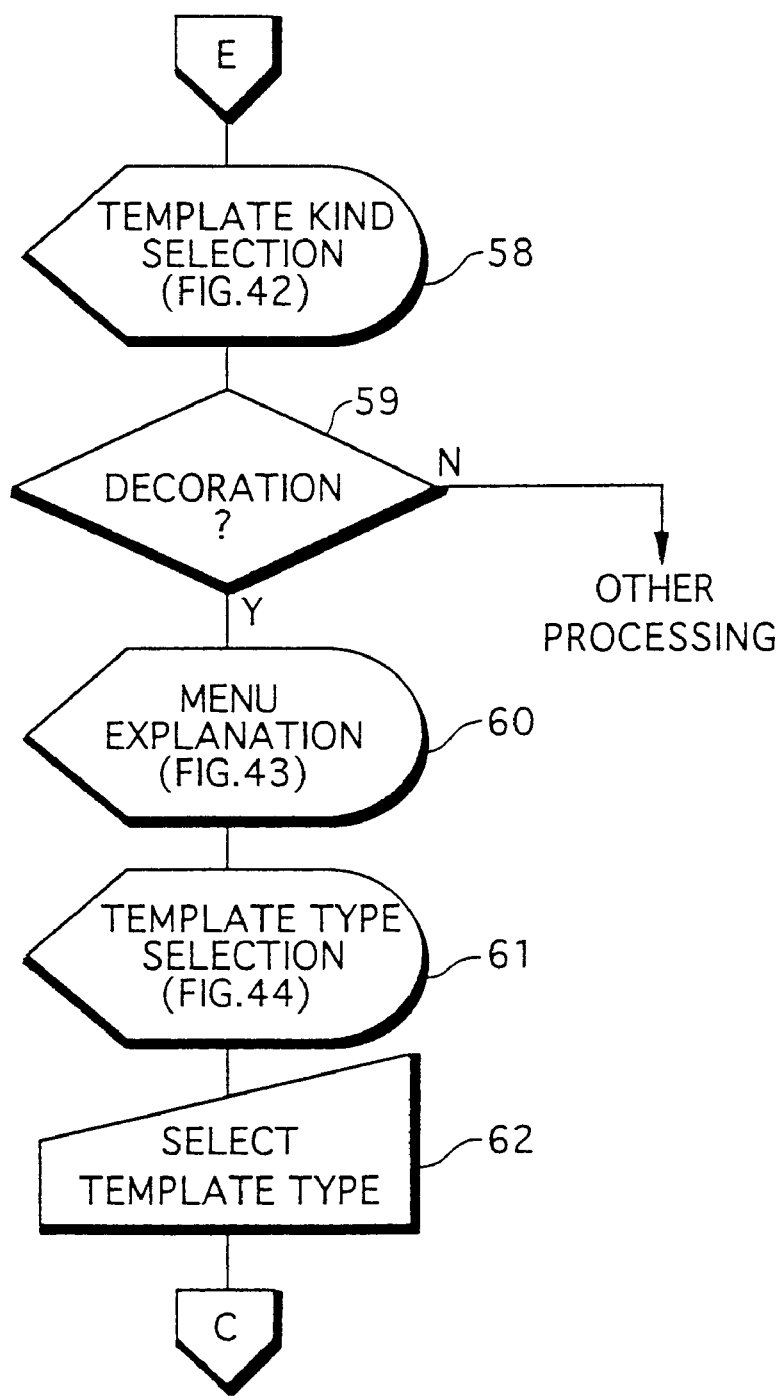
Figure 26:
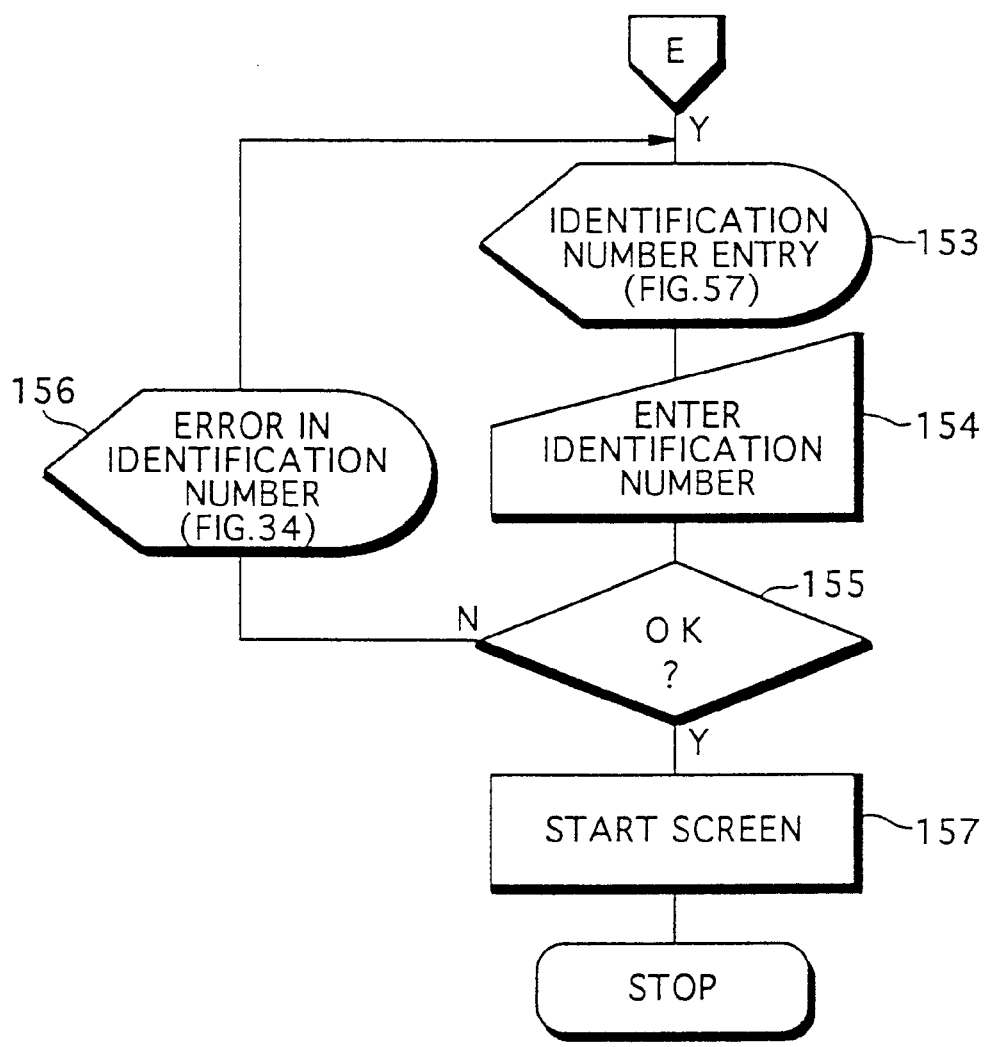

FIG. 22 typically illustrates the relationship among a template image, a mask image, a subject image to be synthesized, and a composite image in order to explain image synthesis processing.

In the image synthesis, the template image is selected by the user, and template image data representing the selected template image is read out from the hard disk. Further, mask image data corresponding to the selected template image data is read out from the hard disk. Subject image data representing the subject image to be synthesized is read out from the visible image medium or the digital medium which is brought by the user.

When the subject image to be synthesized and the mask image are overlapped with each other, the subject image in a portion corresponding to a synthesis area portion $A_W$ (other than a mask portion $A_M$ indicated by hatching) is synthesized (overlaid) on the template image, to produce the composite image. The subject image in a portion corresponding to the mask portion AM is not synthesized on the template image. On the other hand, the positional relationship between the synthesis area portion $A_W$ of the mask image and the subject image to be synthesized is adjusted by the user operating the image synthesizer. Detailed operations with respect to the image synthesis will be apparent from the following description.

(6) Various processing in image synthesizer

FIGS. 23 to 29 are flow charts showing the procedure for various processing including a photo-joy print service and the like in the image synthesizer. FIGS. 30 to 57 illustrate examples of displays appearing on the screen of the display device 33. Data causing the displays on the screen of the display device 33 are stored in the application software recording area so long as it is not emphatically mentioned.

① Setting of identification number

An identification (secret) number of a maintenance man has previously been stored in a memory of the image synthesizer. When an identification number entered by the maintenance man coincides with the identification number stored in the memory, a predetermined start screen for stopping or changing various processing in the image synthesizing system can be displayed on the display device 33. The identification number is set by the maintenance man. The setting of the identification number will be described.

Figure 30:
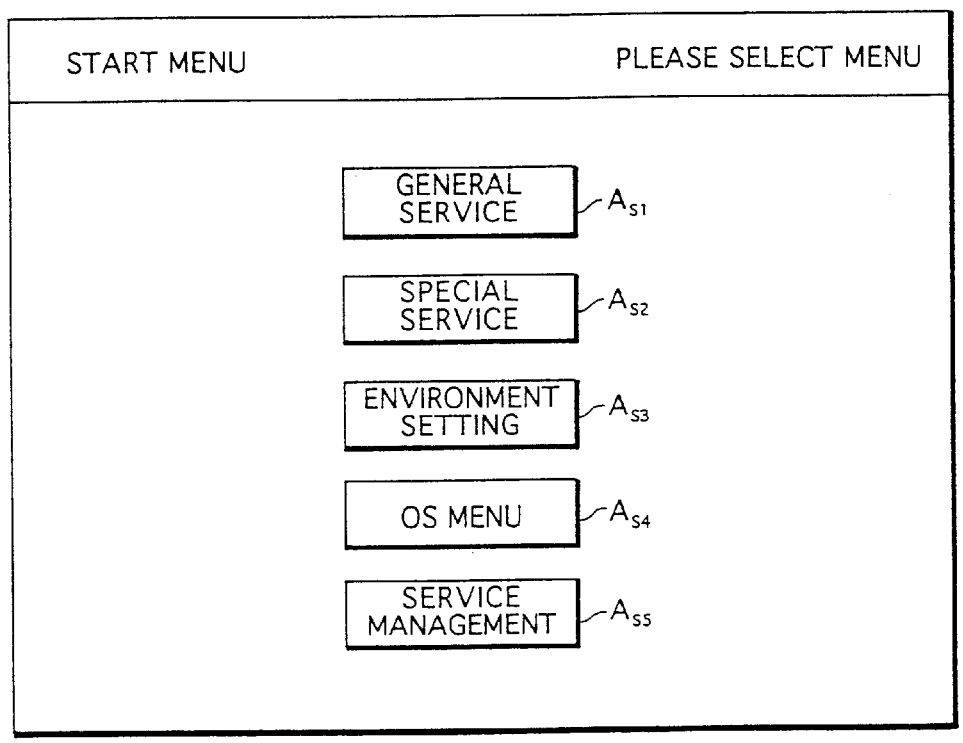

In the initial state, a start screen as shown in FIG. 30 is displayed on the display device 33 (step 121). The start screen includes sections $A_{S1}$ to $A_{S5}$. When the finger of the maintenance man touches the section $A_{S1}$, the program proceeds to various service processing (a photo-joy printing service, a digital output service, etc.) as described later. When the finger of the maintenance man touches the section $A_{S2}$, the program proceeds to various maintenance processing such as adjustment of the color of an image displayed on the display device 33. When the finger of the maintenance man touches the section $A_{S3}$, the program proceeds to identification number setting processing. When the finger of the maintenance man touches the section $A_{S4}$, the program proceeds to OS menu display. When the finger of the maintenance man touches the section $A_{S5}$, the program proceeds to service management processing such as collection of fees for the use of the image synthesizing system.

Figure 31:
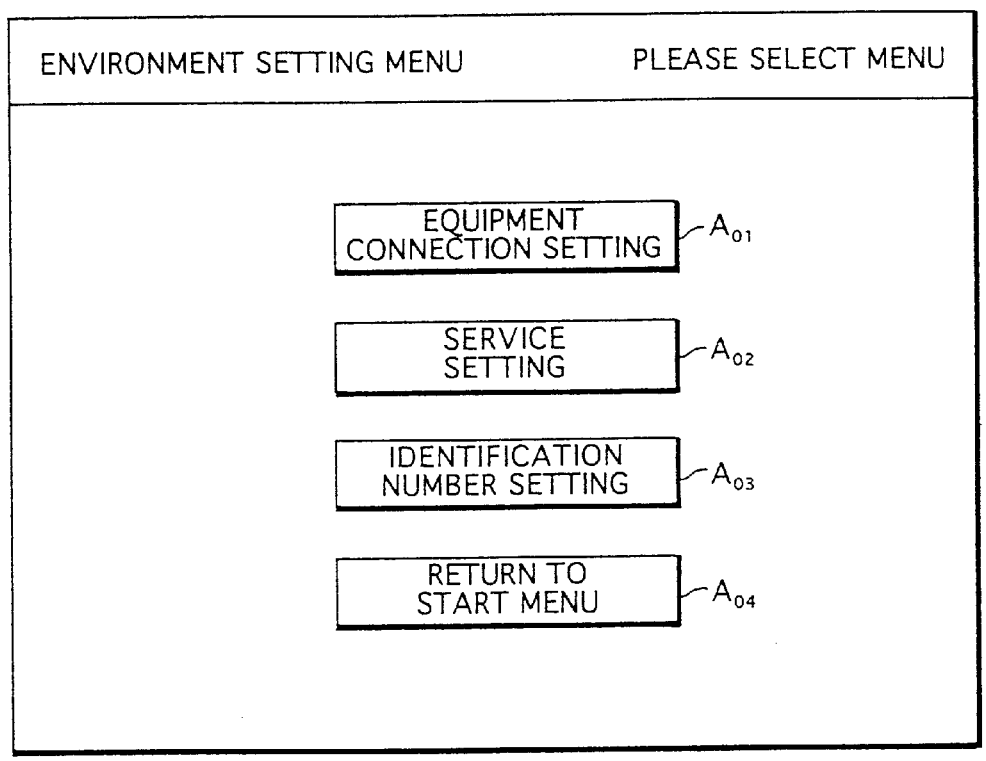

The finger of the maintenance man touches the section $A_{S3}$ in order to set the identification number (step 122, YES in step 123). Consequently, an environment setting screen shown in FIG. 31 is displayed on the display device 33 (step 124).

The environment setting screen includes sections $A_{O1}$ to $A_{O4}$. Peripheral equipments of the same kinds but manufactured by different manufacturers can be connected to the image synthesizing system. For example, a film scanner manufactured by A Company can be connected thereto, and a film scanner manufactured by B Company can be also connected thereto. When the peripheral equipments manufactured by different manufacturers are connected thereto, the output speed of image data, for example, must be set depending on the manufacturer of the peripheral equipment. It is the section $A_{O1}$ which is touched by the finger of the maintenance man in order to execute the setting concerning the peripheral equipment. When the finger of the maintenance man touches the section $A_{O2}$, the program proceeds to processing for setting various processing in the image synthesizer. When the finger of the maintenance man touches the section $A_{O3}$, the program proceeds to identification number setting processing. When the finger of the maintenance man touches the section $A_{O4}$, the display screen of the display device 33 is returned to the start screen shown in FIG. 30.

Figure 32:
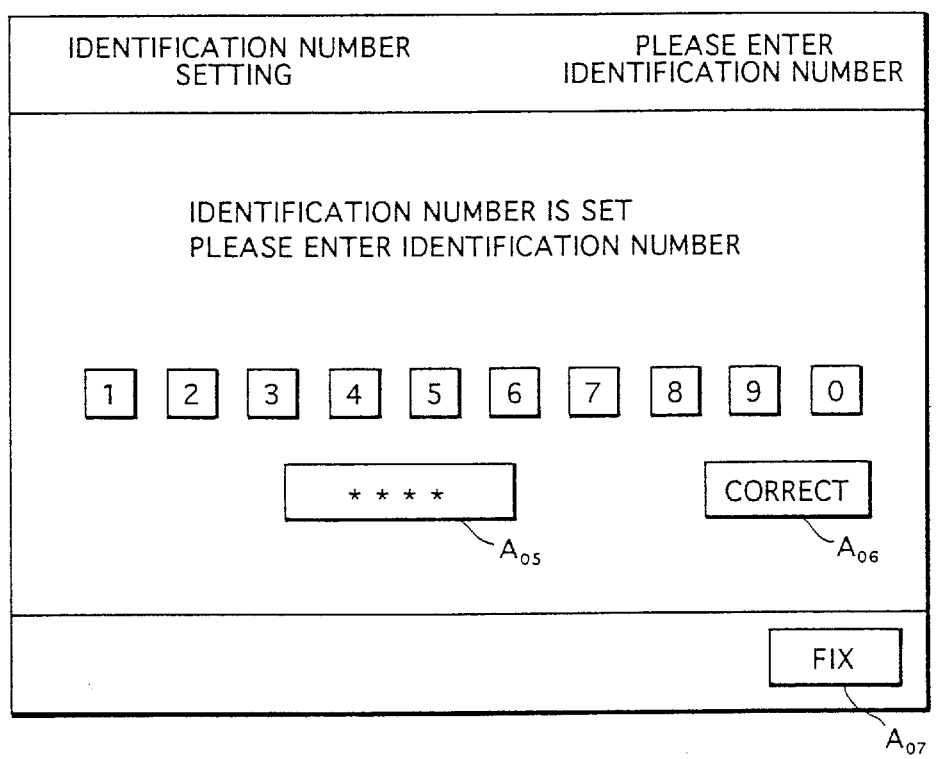

The section $A_{O3}$ is touched by the finger of the maintenance man in order to set the identification number (YES in step 125). Consequently, an identification number setting screen shown in FIG. 32 is displayed on the display device 33 (step 126).

Numeric keys 0 to 1, and a message for guiding entry of an identification number are displayed in addition to sections $A_{O5}$, $A_{O6}$ and $A_{O7}$ on the identification number setting screen. An identification number is entered by the maintenance man using the numeric keys (step 127). Asterisks have been displayed in the section $A_{O5}$ in correspondence to the entry of the identification number. Since not the entered number but the asterisks are displayed in the section $A_{O5}$, the identification number can be prevented from being known by others seeing the section $A_{O5}$. When the finger of the maintenance man touches the section $A_{O6}$, the entered identification number can be corrected. When the finger of the maintenance man touches the section $A_{O7}$, the identification number entered by the maintenance man is fixed.

Figure 33:
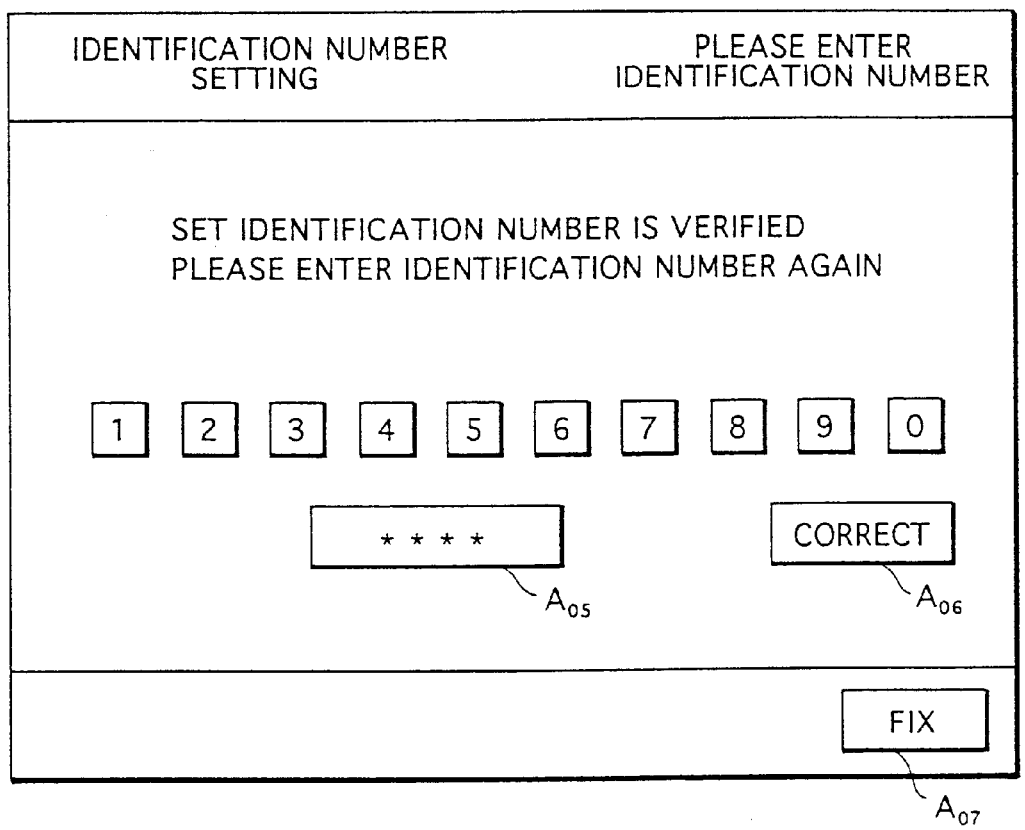
Figure 34:
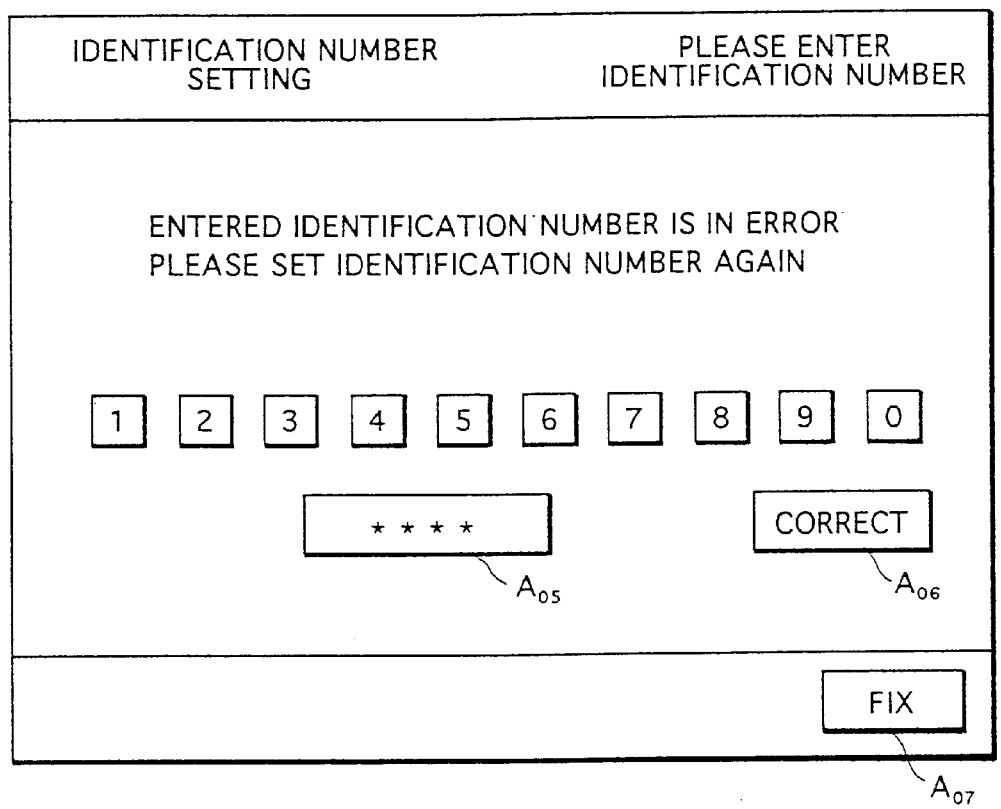

When the identification number is once fixed upon entry of the identification number using the numeric keys by the maintenance man and touching of the section $A_{O7}$ by the finger of the maintenance man, an identification number re-entering screen is displayed as shown in FIG. 33 (step 128). The identification number is entered again using the numeric keys by the maintenance man (step 129). It is judged whether or not the identification number entered again is the same as the identification number already entered (step 130). If it is judged that the identification number already entered and the identification number entered again are the same (YES in step 130), the identification number is stored as a correct identification number in the RAM 45 (step 132). Consequently, the identification number setting processing is terminated. The display of the display device 33 is returned to the start screen shown in FIG. 30. If the identification number already entered and the identification number entered again differ from each other (NO in step 130), the display screen of the display device 33 is changed to a screen for urging the identification number to be set again as shown in FIG. 34 (step 131). The identification number is set again by the maintenance man in accordance with the message (steps 127 to 130).

② Image synthesis processing

Figure 35:
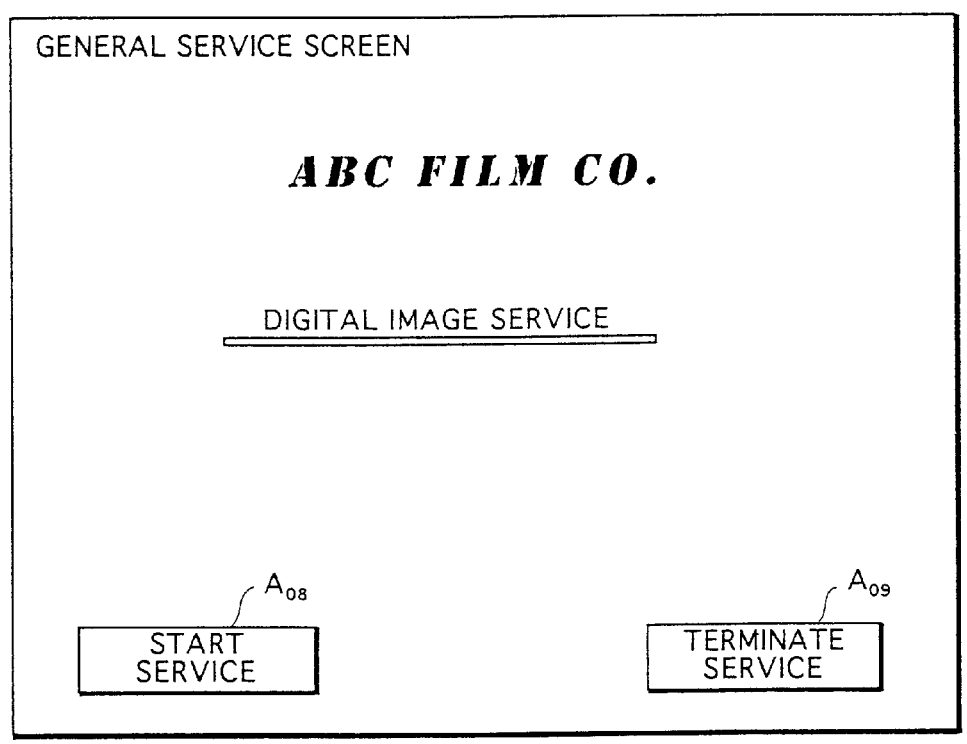

When the section $A_{S1}$ is touched by the finger of the maintenance man (or an operator in a store where an image synthesizer is placed) (NO in step 123, YES in step 143) in a case where the start screen as shown in FIG. 30 is displayed (step 121), a general service screen shown in FIG. 35 is displayed on the display device 33 (step 144).

The general service screen includes a section $A_{08}$ touched by the finger of the maintenance man (or the operator) when the processing is started and a section $A_{09}$ touched by the finger of the maintenance man (or the operator) when the processing in the image synthesizing system is terminated. When the section $A_{08}$ is touched by the finger of the maintenance man (or the operator), a service selection screen as shown in FIG. 36 is displayed (YES in step 145, step 147).

Three sections $A_{10}$, $A_{11}$ and $A_{12}$ enclosed by frames are displayed on the service selection screen. When the section $A_{11}$ out of the sections $A_{10}$, $A_{11}$ and $A_{12}$ is touched by the user, the photo-joy print service is started, whereby the screen of the display device 33 is switched to an input medium selection screen as shown in FIG. 37 (step 148, step 48 in FIG. 24).

Figure 36:
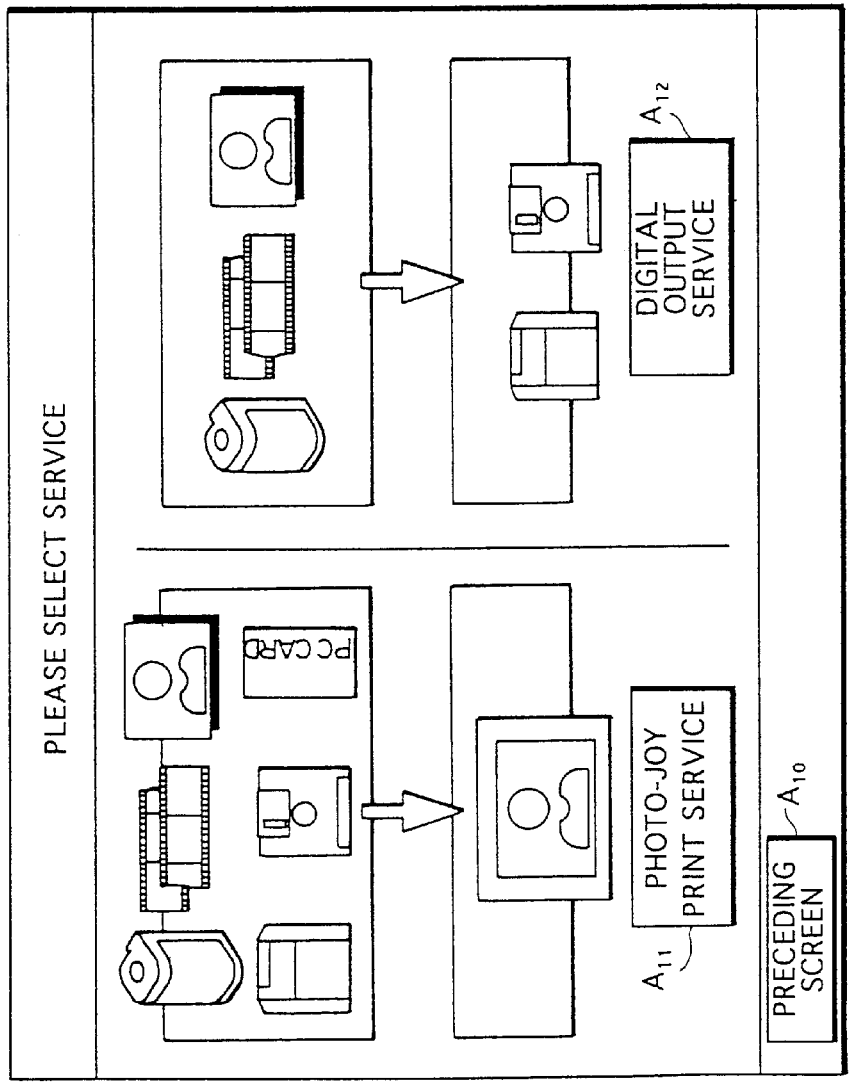

In FIG. 36, when the digital output service is desired to be performed in the image synthesizer 300, the section $A_{12}$ is touched by the user. The section $A_{10}$ is touched by the user when the display is returned to the preceding screen. Although the display screen of the display device 33 is switched to a screen suitable for the digital output service by touching the section $A_{12}$, this is not related to the image synthesis processing and hence, further description is avoided.

Figure 37:
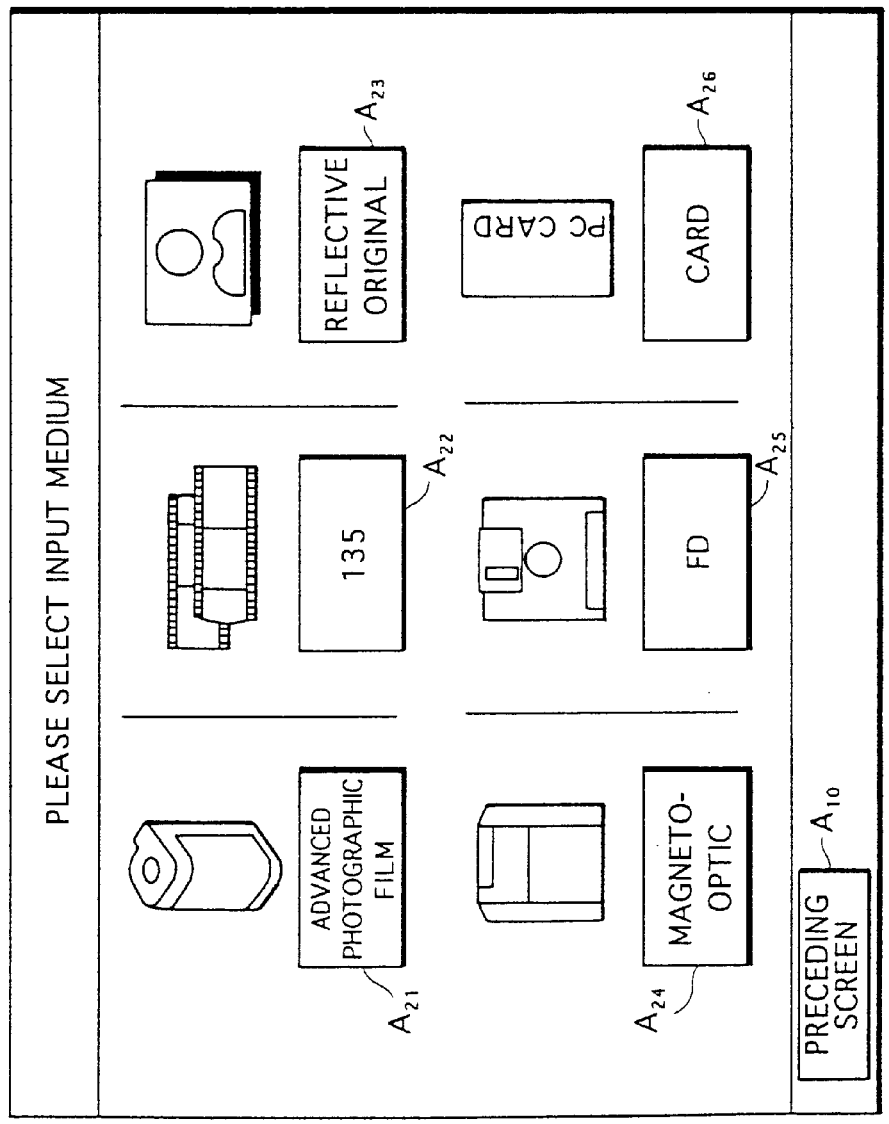

Referring to FIG. 37, sections $A_{21}$, $A_{22}$, $A_{23}$, $A_{24}$, $A_{25}$ and $A_{26}$ enclosed by frames are displayed on an input medium selection screen. The section $A_{21}$ is a section touched by the user when the input medium is a photographic film with an information recording portion, the section $A_{22}$ is a section touched by the user when the input medium is a photographic film of a conventional type, the section $A_{23}$ is a section touched by the user when the input medium is a reflective original, the section $A_{24}$ is a section touched by the user when the input medium is a magneto-optic disk, the section $A_{25}$ is a section touched by the user when the input medium is a magnetic disk, and the section $A_{26}$ is a section touched by the user when the input medium is a memory card.

The section conforming to the input medium out of the sections $A_{21}$ to $A_{26}$ is touched by the user (step 49). One, which is suitable for the input medium, of the scanner 42, the floppy disk driver 39, the magneto-optic disk driver 46 and the memory card reader 47 is selected by the user, and the input medium is mounted therein.

Figure 38:
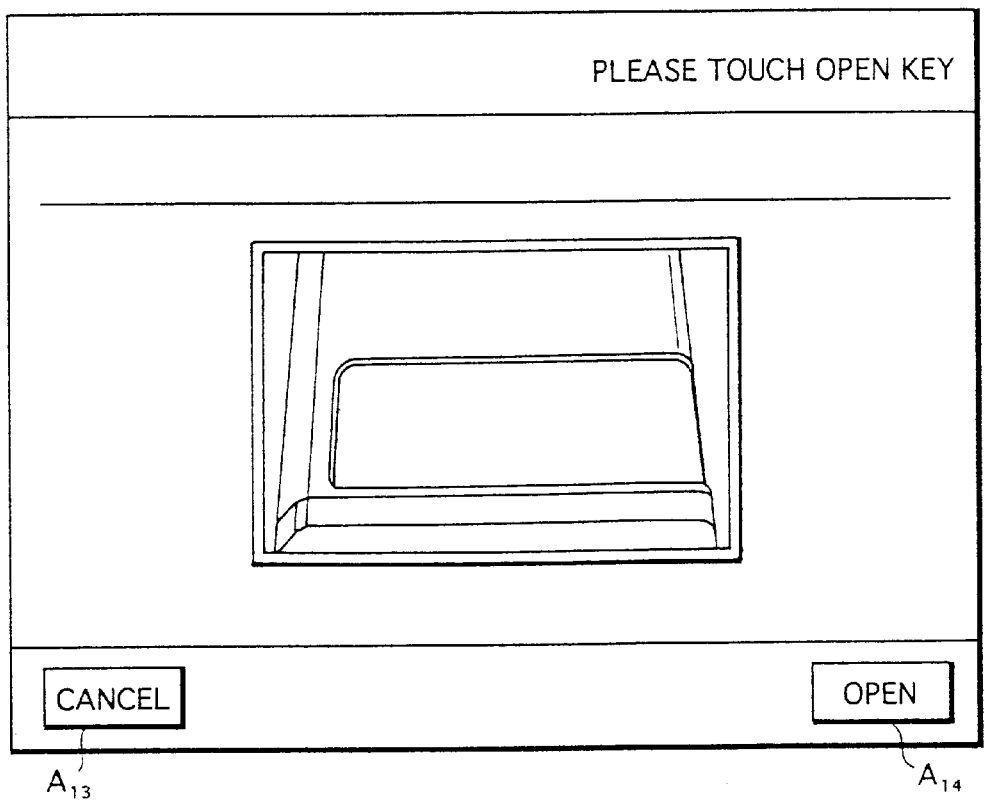

It is assumed herein that the new (advanced) photographic film with an information recording portion 1 is selected as the input medium upon touching of the section $A_{21}$ by the user (YES in step 50). When the new photographic film is selected as the input medium, a guide for inserting the new photographic film into the image synthesizer (a first insertion guide) is displayed on the display device 33 as shown in FIG. 38 (step 51). The first insertion guide screen includes sections $A_{13}$ and $A_{14}$ enclosed by frames. The section $A_{14}$ is a section touched by the user when the slide cover 305 is opened. The section $A_{13}$ is a section touched by the user when the reading of an image appearing on the photographic film is canceled. When the section $A_{14}$ is touched by the user, a command to open the slide cover 305 is transmitted to the CPU 20 through the MPU 30. The driving motor 381 included in the film scanner 42 is driven by the CPU 20. Consequently, the slide cover 305 is opened (step 52). A message for urging the section $A_{14}$ to be touched is also displayed on the first insertion guide screen.

Figure 39:
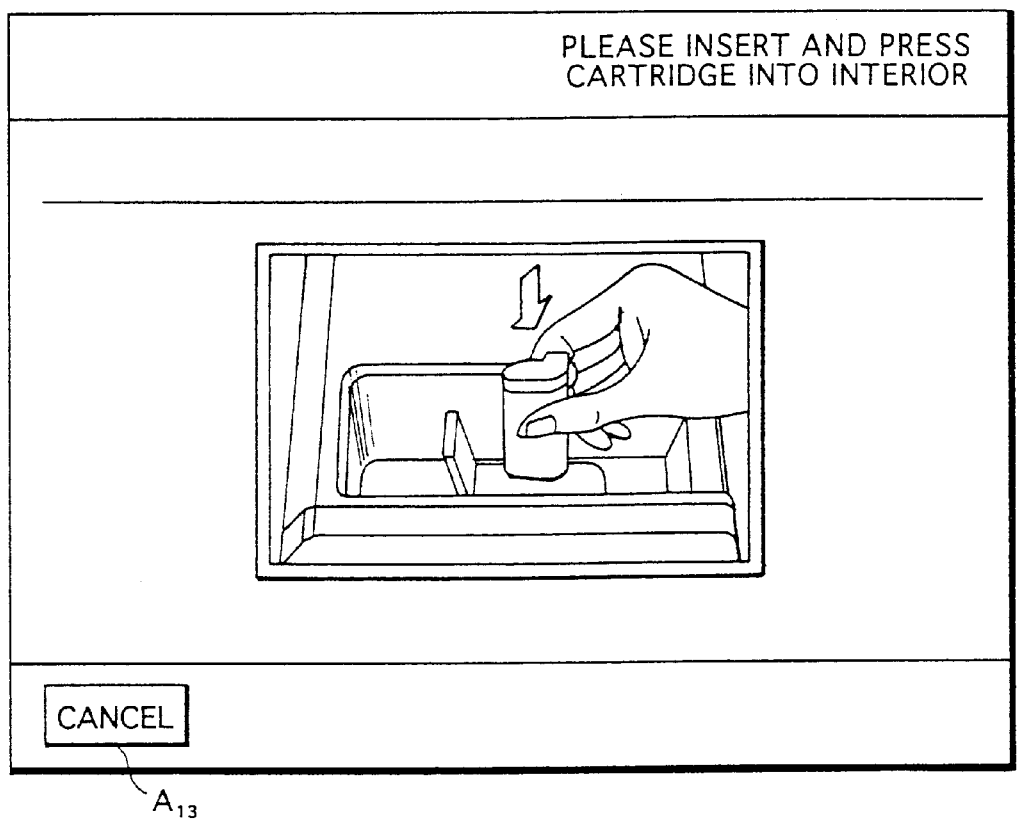

When the slide cover 305 is opened, a second insertion guide screen is displayed on the display device 33 as shown in FIG. 39 (step 53). A message and an image for guiding a photographic film to be contained in the cartridge container 355 by opening the inner cover 355A of the film scanner 42 are displayed on the second insertion guide screen. The user presses the cartridge 5 into the cartridge container 355 while seeing the second insertion guide screen.

Figure 40:
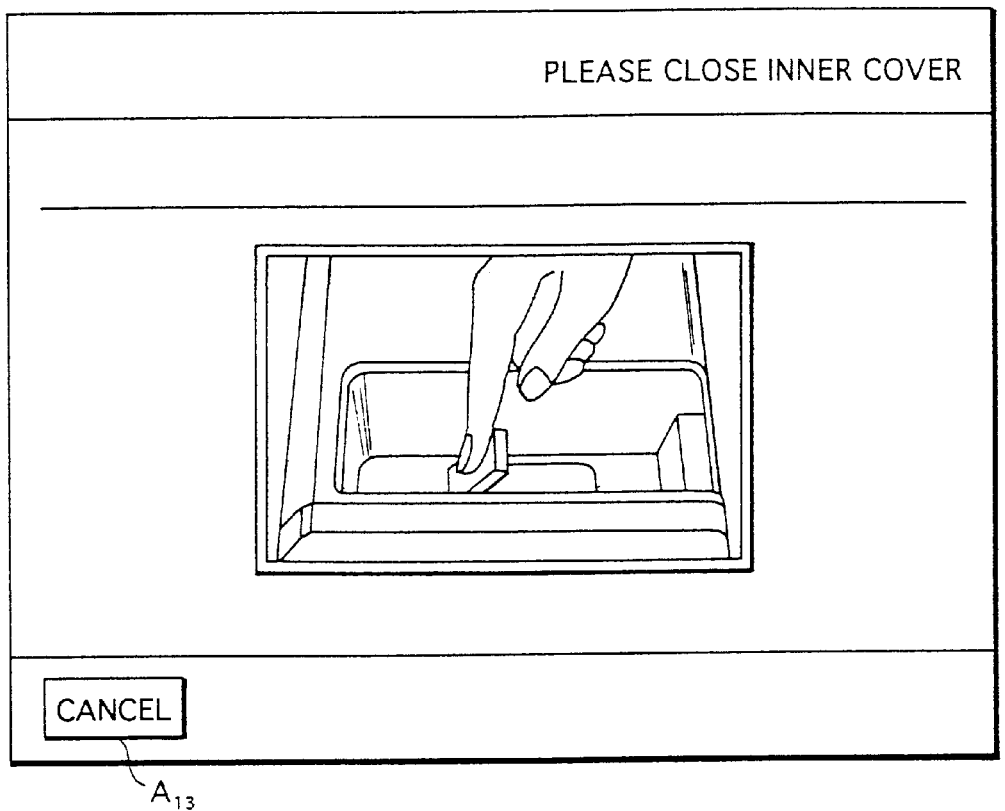

The display screen of the display device 33 is switched to a third insertion guide screen as shown in FIG. 40 (step 54). A message and an image for guiding the inner cover 355A of the film scanner 42 to be closed are displayed on the third insertion guide screen. The user closes the inner cover 355A of the film scanner 42 while seeing the third insertion guide screen.

Figure 41:
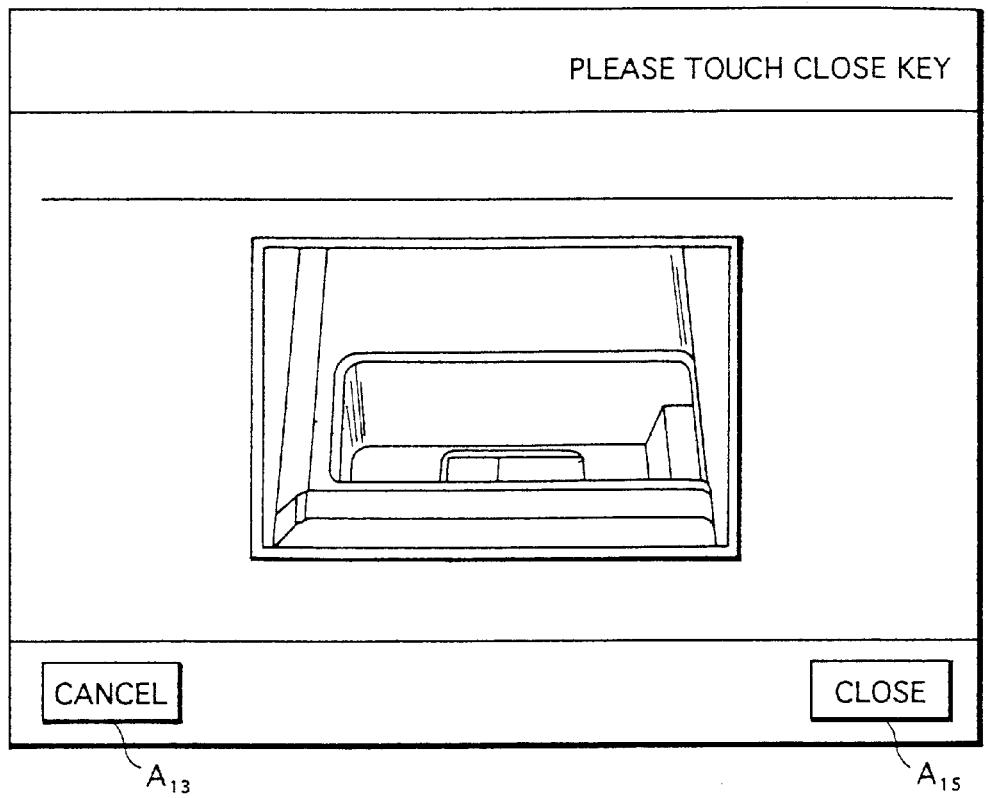

When the inner cover 355A of the film scanner 42 is closed (YES in step 55), the fact is sensed by the closed inner cover sensor 28, and its sensing signal is inputted to the CPU 20. Consequently, it is sensed that the inner cover 355A is closed. A fourth insertion guide screen is displayed on the display device 33 as shown in FIG. 41 (step 56). The fourth insertion guide screen also includes a section $A_{15}$. The section $A_{15}$ is a section touched by the user when a command to close the slide cover 305 is entered. A message for urging the section $A_{15}$ to be touched is also displayed on the fourth insertion guide screen.

When the section $A_{15}$ is touched by the user (YES in step 57), the slide cover 305 is closed upon driving of the driving motor 381 by the CPU 20. Consequently, the display screen of the display device 33 is changed to a template kind selection screen shown in FIG. 42 (step 58). When it is sensed by the closed inner cover sensor 28 that the inner cover 355A of the film scanner 42 is opened (NO in step 55), or the section $A_{15}$ included in the fourth insertion guide screen shown in FIG. 41 is not touched for a predetermined time (NO in step 57), the display of the second insertion guide screen shown in FIG. 39 and the third insertion guide screen shown in FIG. 40 is repeated (steps 53 and 54).

All images recorded on the new photographic film mounted in the film scanner 42 are read. Image data representing the read image is thinned out in the enlarging and reducing circuit 44, to obtain image data representing a reduced image. The image data representing the reduced image is stored in the hard disk.

Figure 42:
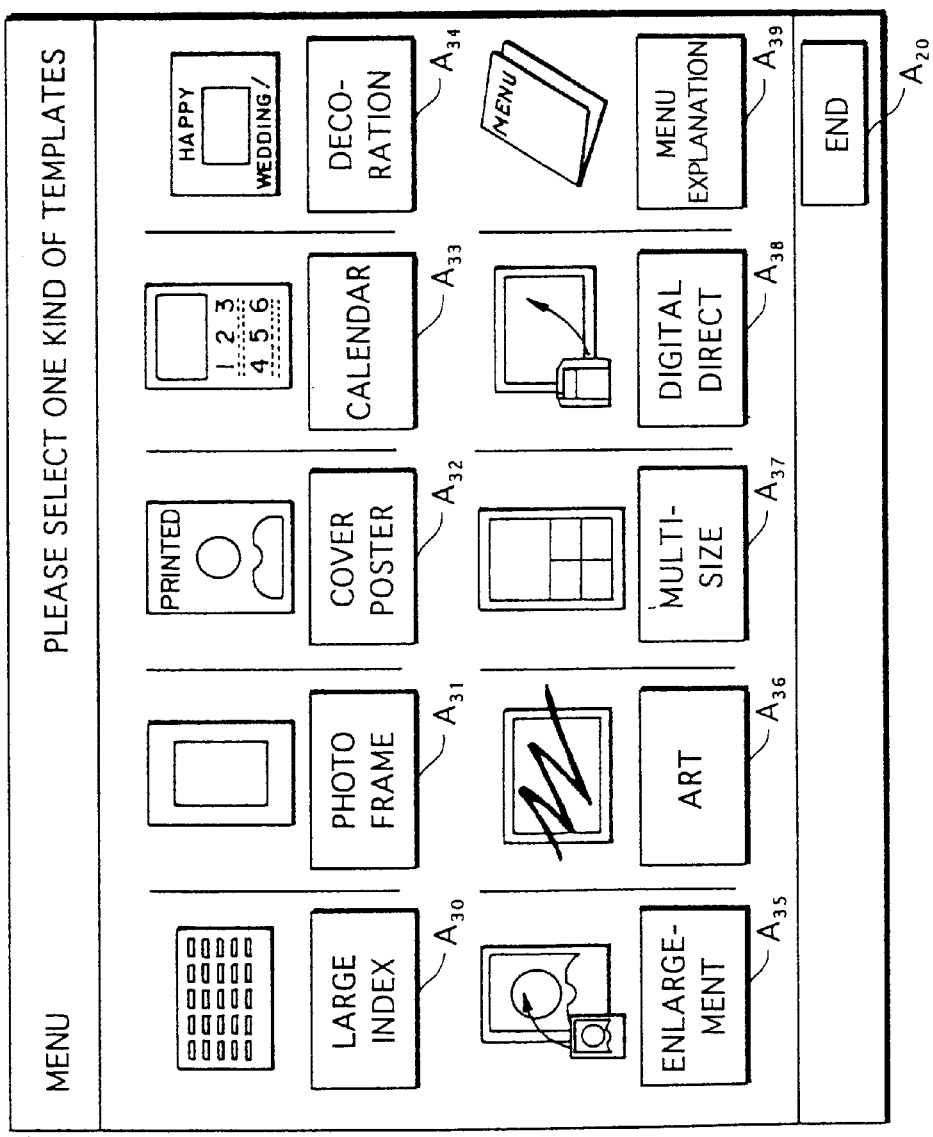

On the template kind selection screen shown in FIG. 42, sections $A_{30}$, $A_{31}$, $A_{32}$, $A_{33}$, $A_{34}$, $A_{35}$, $A_{36}$, $A_{37}$, $A_{38}$ and $A_{39}$ are displayed. The section $A_{30}$ is a section touched by the user when printing is done by a large index (the large index is for making a list of a plurality of images recorded on the input medium). The section $A_{31}$ is a section touched by the user when printing is done by a photo frame (the photo frame is for printing an image recorded on the input medium like a picture fit in a photo frame). The section $A_{32}$ is a section touched by the user when printing is done by a cover poster (the cover poster is for printing an image recorded on the input medium like a magazine or a poster). The section $A_{33}$ is a section touched by the user when printing is done by a calendar (the calendar is for printing an image recorded on the input medium on a part of a calendar). The section $A_{34}$ is a section touched by the user when printing is done by a decoration (the decoration is for printing an image obtained by decorating a part or the whole of an image recorded on the input medium and extracted therefrom).

The section $A_{35}$ is a section touched by the user when printing is done by enlargement (the enlargement is for enlarging an image recorded on the input medium). The section $A_{36}$ is a section touched by the user when printing is done by art (the art is for decorating an image recorded on the input medium). The section $A_{37}$ is a section touched by the user when printing is done by multi-size (the multi-size is for printing a plurality of identical subject images which differ in size). The section $A_{38}$ is a section touched by the user when printing is done by digital direct (the digital direct is for printing, when the input medium is a digital medium, an image represented by image data directly read out from the digital medium). The section $A_{39}$ is a section touched by the user when the kind of template must be explained.

It is assumed that the decoration is selected upon touching of the section $A_{34}$ by the user (YES in step 59). When a section other than the section $A_{34}$ is touched by the user, the display of the display device 33 is switched in correspondence to the touched section.

Figure 43:
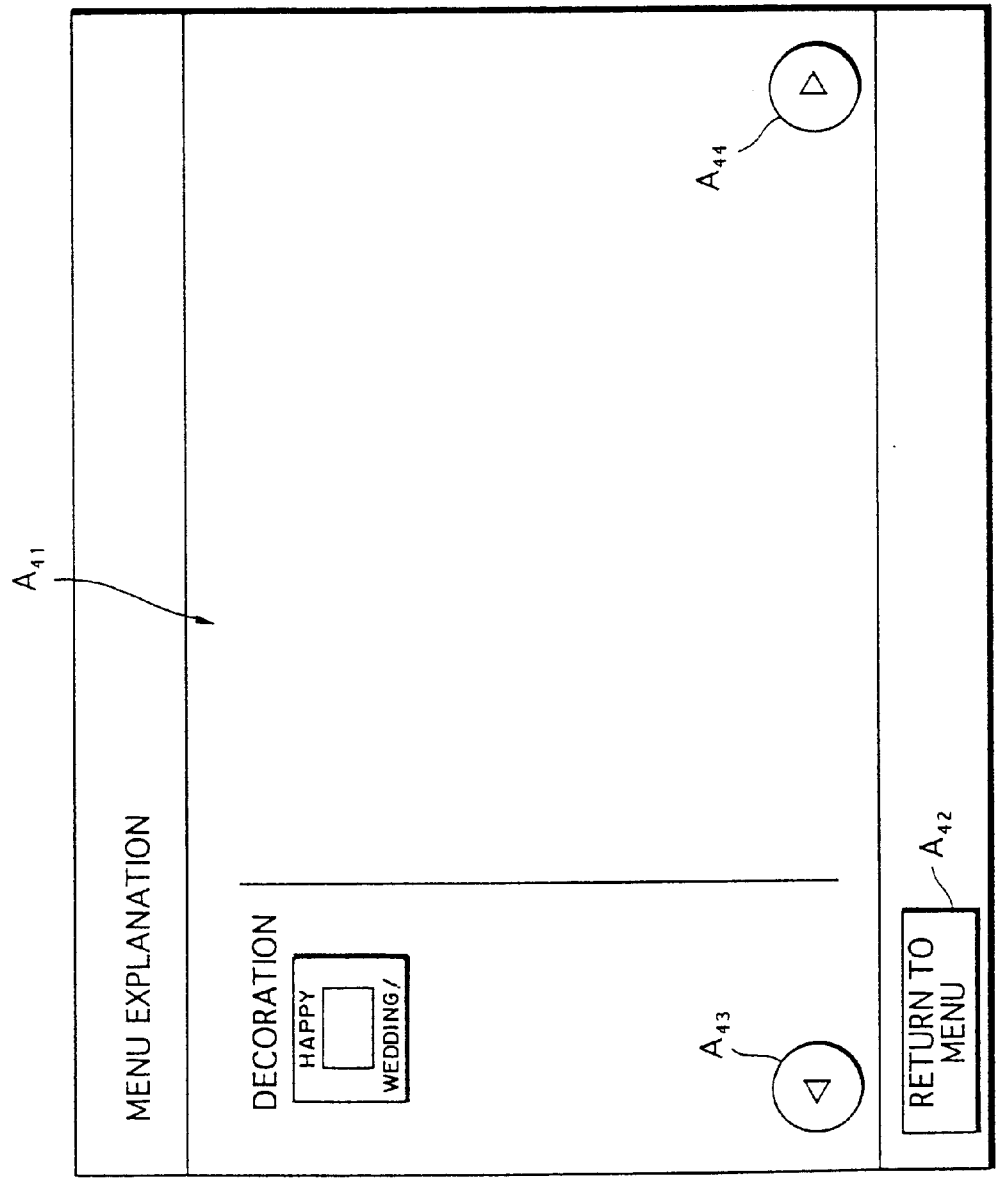

When the section $A_{34}$ is touched by the user, the display screen of the display device 33 is switched to a menu explanation screen shown in FIG. 43 (step 60). An area $A_{41}$, and sections $A_{42}$, $A_{43}$ and $A_{44}$ are displayed on the menu explanation screen. A sentence for explaining what is a template selected by the user and what subject image is suitably synthesized on the template is displayed in the area $A_{41}$ (the sentence for explanation is not illustrated in FIG. 43). When the number of sentences for explanation is large, all the sentences for explanation for the selected template cannot be displayed in the area $A_{41}$. Therefore, it is the section $A_{43}$ or $A_{44}$ that is touched in order to scroll the screen and read the sentences for explanation. When the section $A_{42}$ is touched by the user, the display screen of the display device 33 is returned to the template kind selection screen shown in FIG. 42. When the screen is scrolled to sentences for explanation on the final page, a new section (not shown) is displayed. When the section is touched by the user, the display screen of the display device 33 is switched to a template type selection screen shown in FIG. 44 (step 61).

Figure 44:
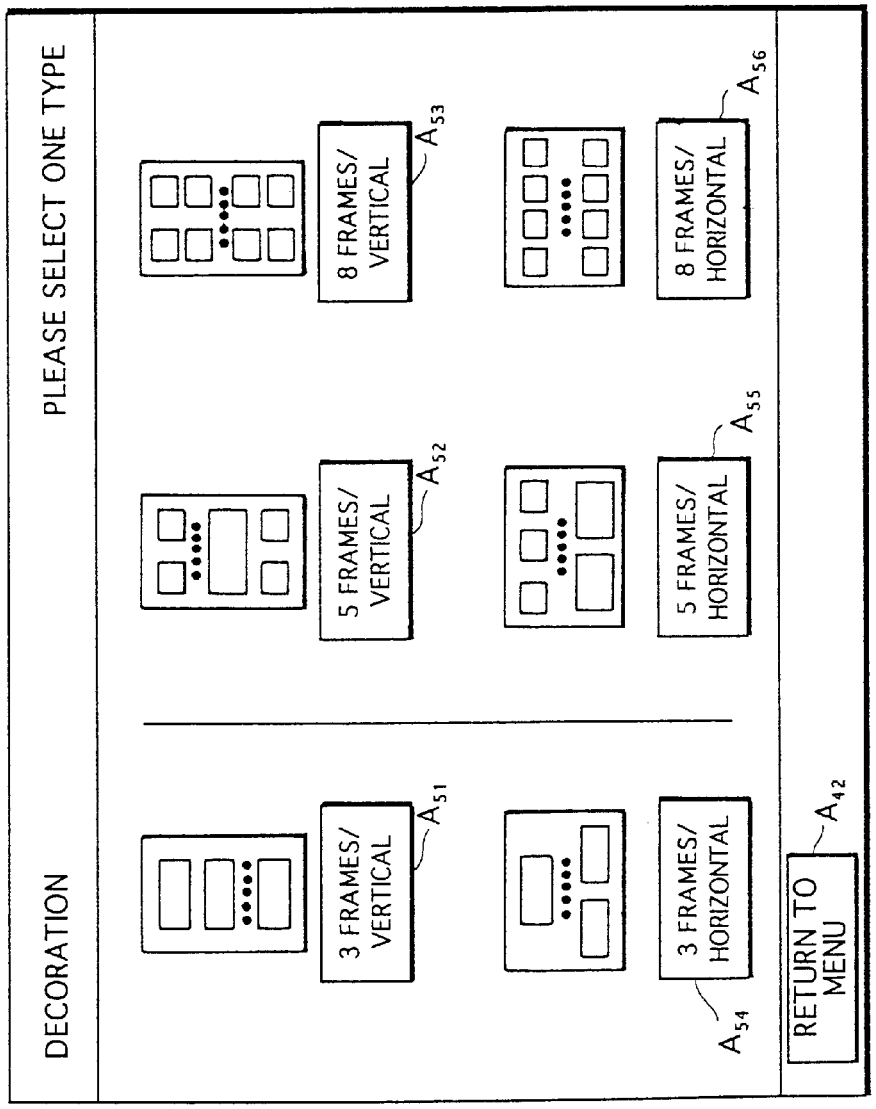

Templates are of many kinds: a decoration, a calendar, and a cover poster. One kind of template further includes many types of templates. The template type selection screen shown in FIG. 44 is displayed on the display device 33 when the type of template is selected.

Sections $A_{51}$, $A_{52}$, $A_{53}$, $A_{54}$, $A_{55}$, $A_{56}$ and $A_{42}$ are displayed on the template type selection screen. The section $A_{51}$ is a section touched by the user when images for three frames are vertically arranged on the template to synthesize the images. The section $A_{52}$ is a section touched by the user when images for five frames are vertically arranged on the template to synthesize the images. The section $A_{53}$ is a section touched by the user when images for eight frames are vertically arranged on the template to synthesize the images. The section $A_{54}$ is a section touched by the user when images for three frames are horizontally arranged on the template to synthesize the images. The section $A_{55}$ is a section touched by the user when images for five frames are horizontally arranged on the template to synthesize the images. The section $A_{56}$ is a section touched by the user when images for eight frames are horizontally arranged on the template to synthesize the images. When any one of the sections $A_{51}$ to $A_{56}$ is touched by the user (step 62), the display screen of the display device 33 is switched to a template decoration type selection screen shown in FIG. 45 (step 63).

There are many types of templates (the number of frames corresponding to images synthesized on the template and the direction of the arrangement). One type of template further includes template decoration types. The decoration selection screen shown in FIG. 45 is displayed on the display device 33 when the decoration type is selected (step 63).

An area $A_{60}$ and sections $A_{10}$ and $A_{13}$ are displayed on the decoration type selection screen. The area $A_{60}$ include a plurality of sections for selecting decorations of the template. The user touches a section representing a desired decoration out of the sections in the area $A_{60}$ (step 64).

A template used for image synthesis is specified by thus selecting all the kind, the type and the decoration type of the template.

When the template is specified, data enlargement of template image data, selection of a subject image to be synthesized on the template, inlaying of the subject image on a template image, production of composite image data for printing are carried out (step 65, FIGS. 46 to 51). Each processing will be described in detail later.

Figure 52:
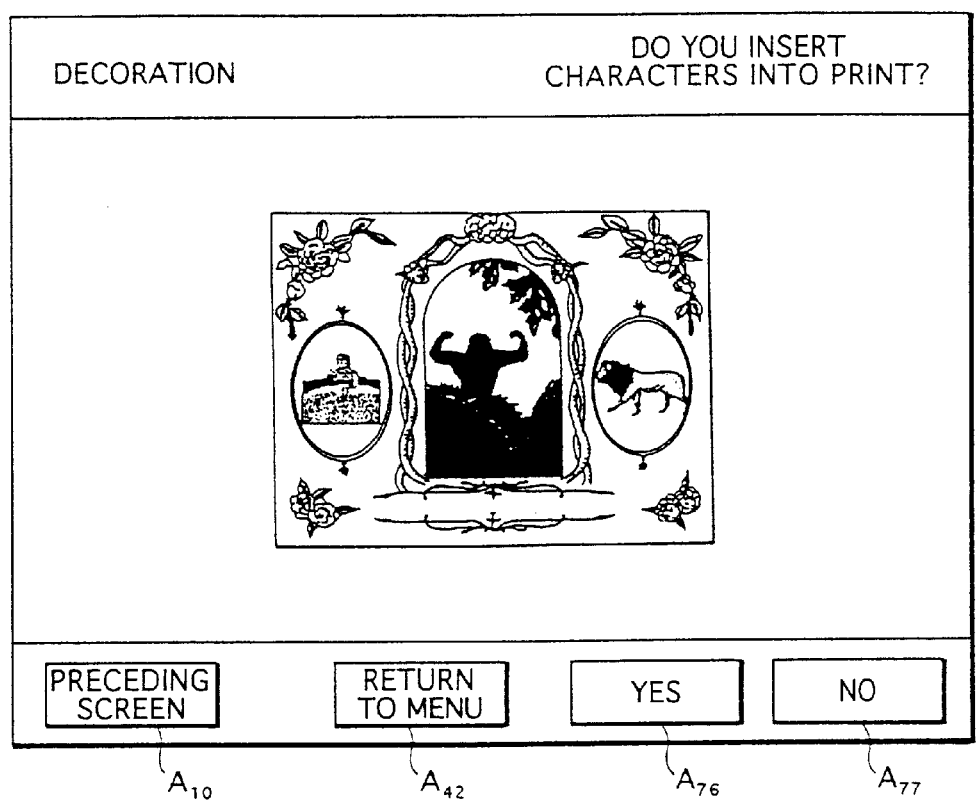

When the image synthesis is terminated on the display screen of the display device 33 (when the processing in the step 65 is terminated), a screen for confirming whether or not characters should be inserted into a composite image is displayed on the display device 33 as shown in FIG. 52 (step 66). Sections $A_{10}$, $A_{42}$, $A_{76}$ and $A_{77}$ are displayed in addition to the composite image on the confirmation screen. The section $A_{77}$ is touched by the user when characters are added, while the section $A_{76}$ is touched by the user when no characters are added. When the section $A_{77}$ is touched (YES in step 67), keys of hiragana and katakana (Japanese), alphabets, signs, etc. are displayed on the display screen of the display device 33 (step 68). The user can add characters to the composite image by touching the keys displayed on the display screen of the display device 33.

Figure 53:
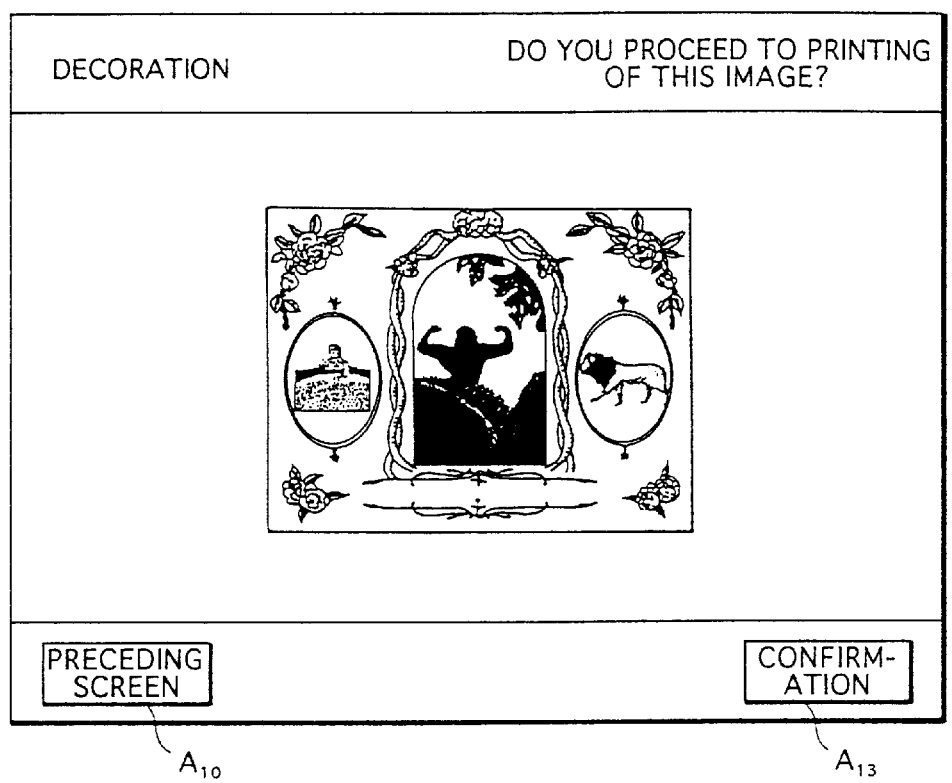
Figure 54:
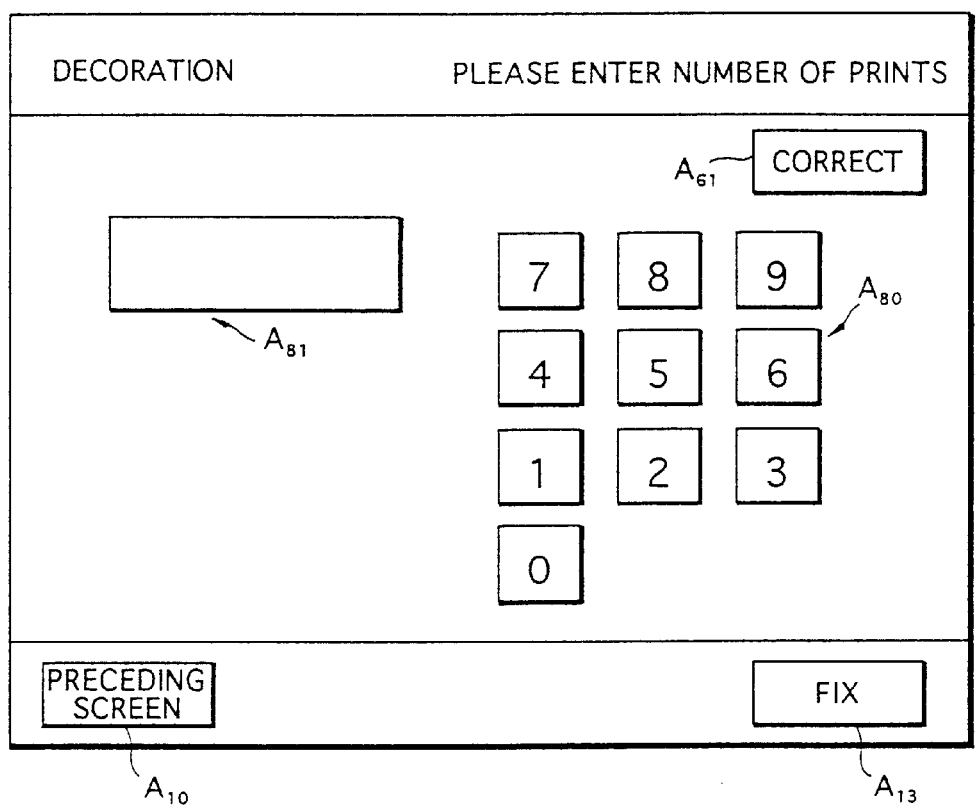
Figure 55:
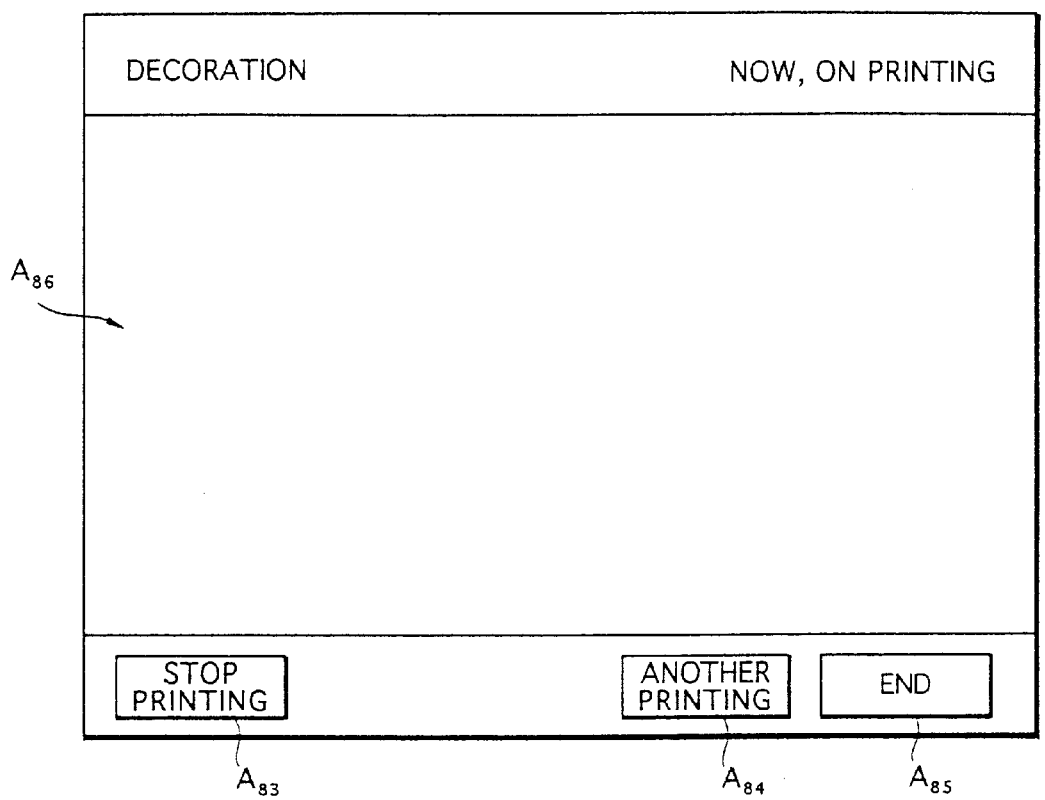
Figure 56:
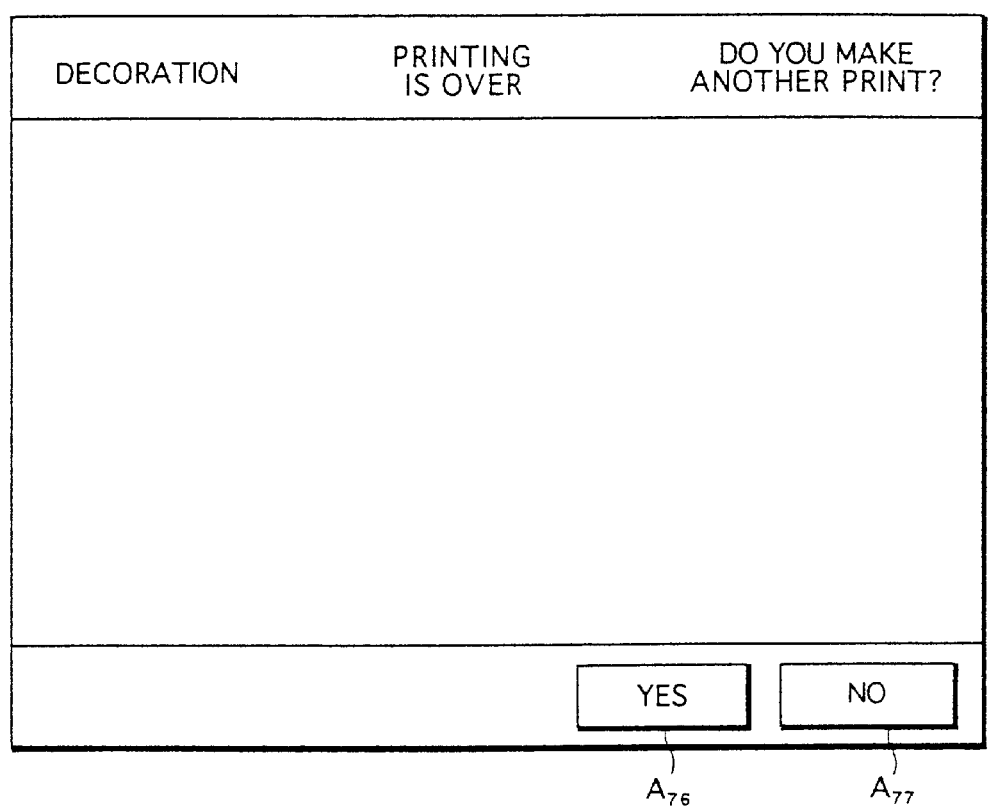

When entry of characters into the composite image is terminated or no entry of characters is required, a printing confirmation screen shown in FIG. 53, is displayed on the display device 33 (step 69). The section $A_{13}$ is touched upon confirmation by the user. When an image displayed on the display screen of the display device 33 is not printed, the section $A_{10}$ is touched by the user, whereby the display screen of the display device 33 is returned to the preceding screen. When the section $A_{13}$ is touched by the user, the display screen of the display device 33 is switched to a number-of-prints confirmation screen shown in FIG. 54 (step 70).

Sections $A_{10}$, $A_{13}$, $A_{61}$ and $A_{81}$ and an area $A_{80}$ are displayed on the number-of-prints confirmation screen. Numeric keys 0 to 9 are displayed in the area $A_{80}$. When the numeric keys are touched by the user, the number of prints is entered. The entered number of prints is displayed in the section $A_{81}$. When the user erroneously enters the number of prints, the number of prints is entered again upon touching the section $A_{61}$. When the number of prints is determined, the section $A_{13}$ is touched by the user. When the section $A_{13}$ is touched, the display screen of the display device 33 is switched to an in-printing display screen shown in FIG. 55 (step 71).

An area $A_{86}$ and sections $A_{83}$, $A_{84}$ and $A_{85}$ are displayed on the in-printing display screen. A simple animation (not illustrated) is displayed in the area $A_{86}$ during printing. In order to stop printing, the section $A_{83}$ is touched by the user. When a template is changed to do another printing, the section $A_{84}$ is touched by the user. When the printing is ended, the section $A_{85}$ is touched by the user. When the section $A_{85}$ is touched by the user, the display screen of the display device 33 is changed to a print ending screen shown in FIG. 56 (step 73).

Sections $A_{76}$ and $A_{77}$ are displayed on the print ending screen. The section $A_{76}$ is a section touched by the user when printing is to be ended, and the section $A_{77}$ is a section touched by the user when the printing is continued. When the section $A_{76}$ is touched (NO in step 74), the display screen of the display device 33 is switched to a guide screen indicating that a new photographic film inserted in the image synthesizer is to be taken out (step 75). When the new photographic film is taken out from the image synthesizer, the display screen of the display device 33 is returned to the general service screen shown in FIG. 35 (step 144 in FIG. 23). When the section $A_{77}$ is touched (YES in step 74), the display screen of the display device 33 is switched to the template kind selection screen shown in FIG. 42 (step 58 in FIG. 25). Consequently, the user can select a template again and do printing.

Although in the present embodiment, the composite image synthesized on the template is only printed, image data representing the composite image may be recorded on the digital medium. In this case, when the user brings the digital medium as the input medium, the image data may be recorded on the brought digital medium, or may be recorded on a different digital medium.

③ Termination of service using identification number

A service is terminated (closed) by the maintenance man using an identification number in order to prevent the user from closing the service freely.

When the section $A_{09}$ is touched by the finger of the maintenance man in a case where the general service screen shown in FIG. 35 is displayed on the display device 33, the program proceeds to processing for terminating a service with use of an identification number. When the section $A_{09}$ is touched by the finger of the maintenance man (YES in step 146 shown in FIG. 23), an identification number entry screen shown in FIG. 57 is displayed on the display device 33 (step 153 in FIG. 26).

Figure 57:
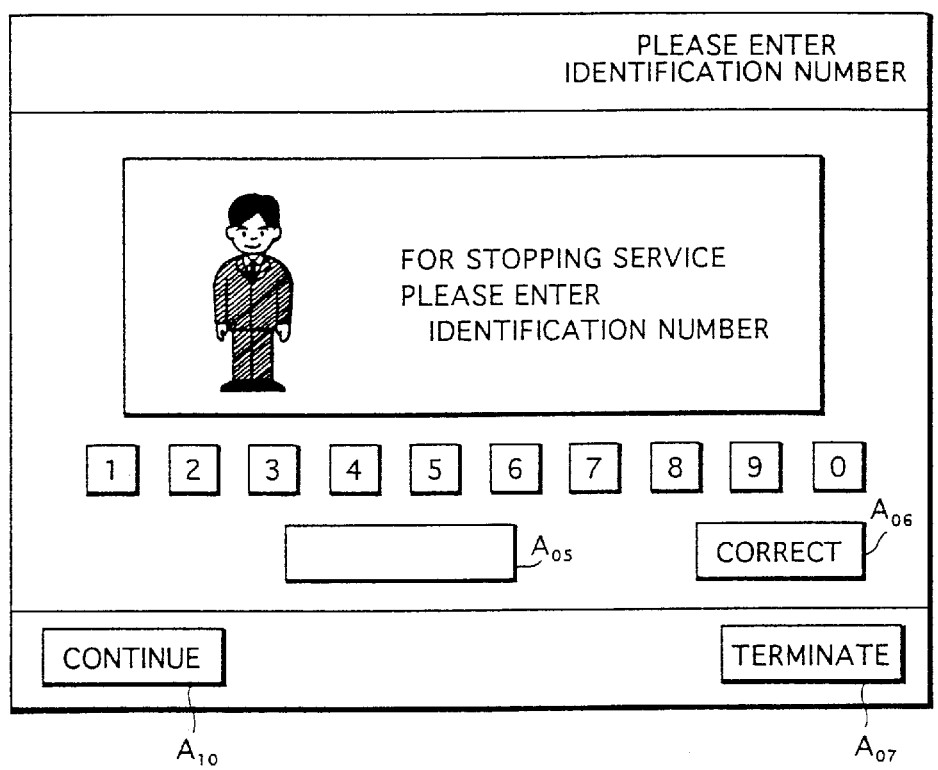

Referring to FIG. 57, sections $A_{05}$, $A_{06}$, $A_{07}$ and $A_{10}$, numeric keys 0 to 1, a message for guiding an identification number to be entered are displayed on the identification number entry screen. Asterisks is displayed in the section $A_{05}$ in correspondence to the entry of the identification number (step 154). When the section $A_{06}$ is touched by the finger of the maintenance man, the entered identification number can be corrected. When the section $A_{07}$ is touched by the finger of the maintenance man, the entered identification number is fixed. When the section $A_{10}$ is touched by the finger of the maintenance man, the service termination processing is stopped to return to the general service screen of FIG. 35.

When the identification number entered by the maintenance man coincides with the identification number stored in the RAM 45 (YES in step 155), the service is terminated, whereby the start screen (FIG. 30) is displayed on the display device 33 (step 157). If the identification number entered by the maintenance man does not coincide with the identification number stored in the RAM 45 (NO in step 155), a message that the identification number is in error is displayed as shown in FIG. 34 on the display screen of the display device 33 (step 156). When the identification number entered by the maintenance man is in error continuously a plurality of times, the identification number is inhibited from being entered.

④ Details of image synthesis processing

Figure 27:
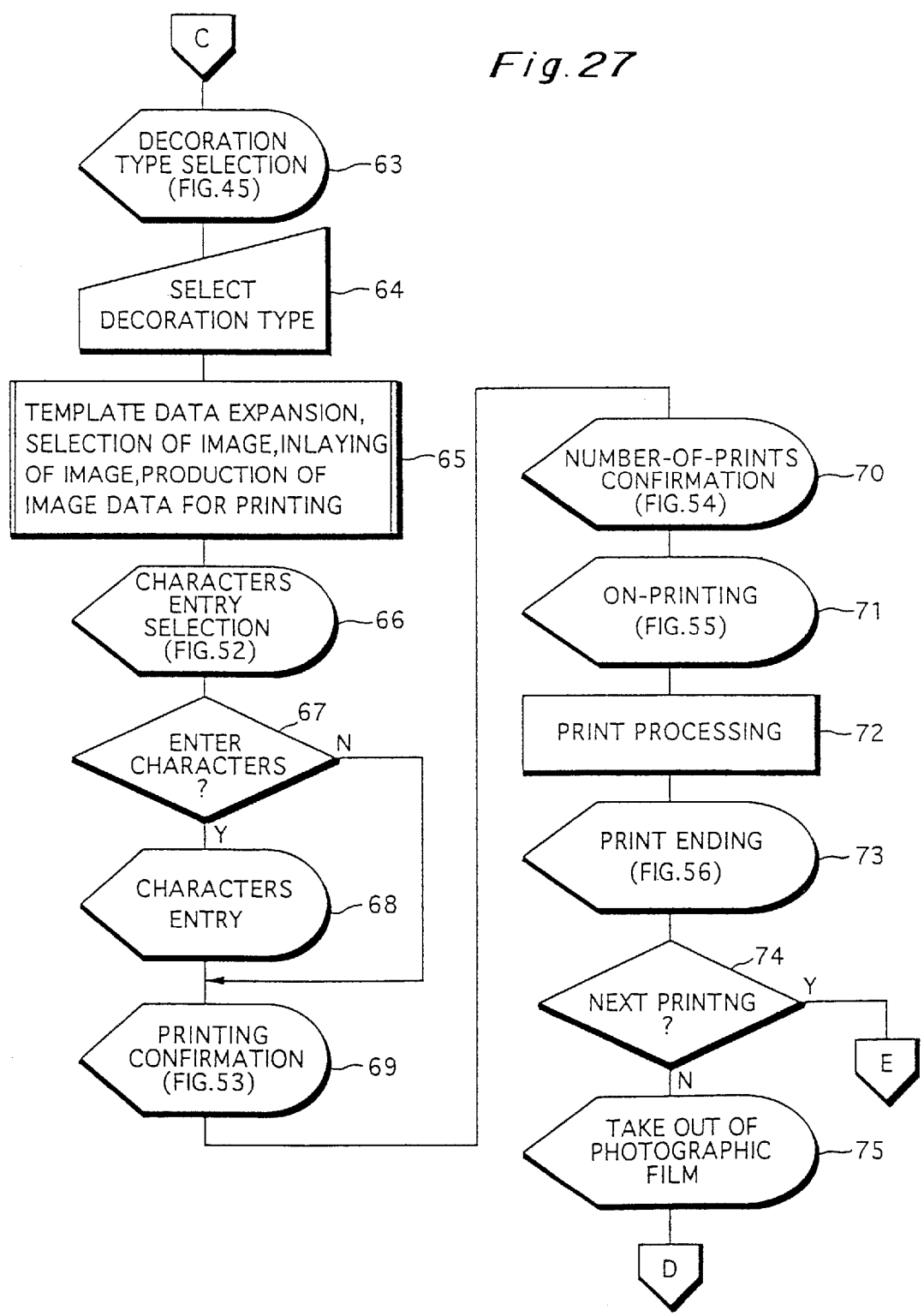
Figure 28:
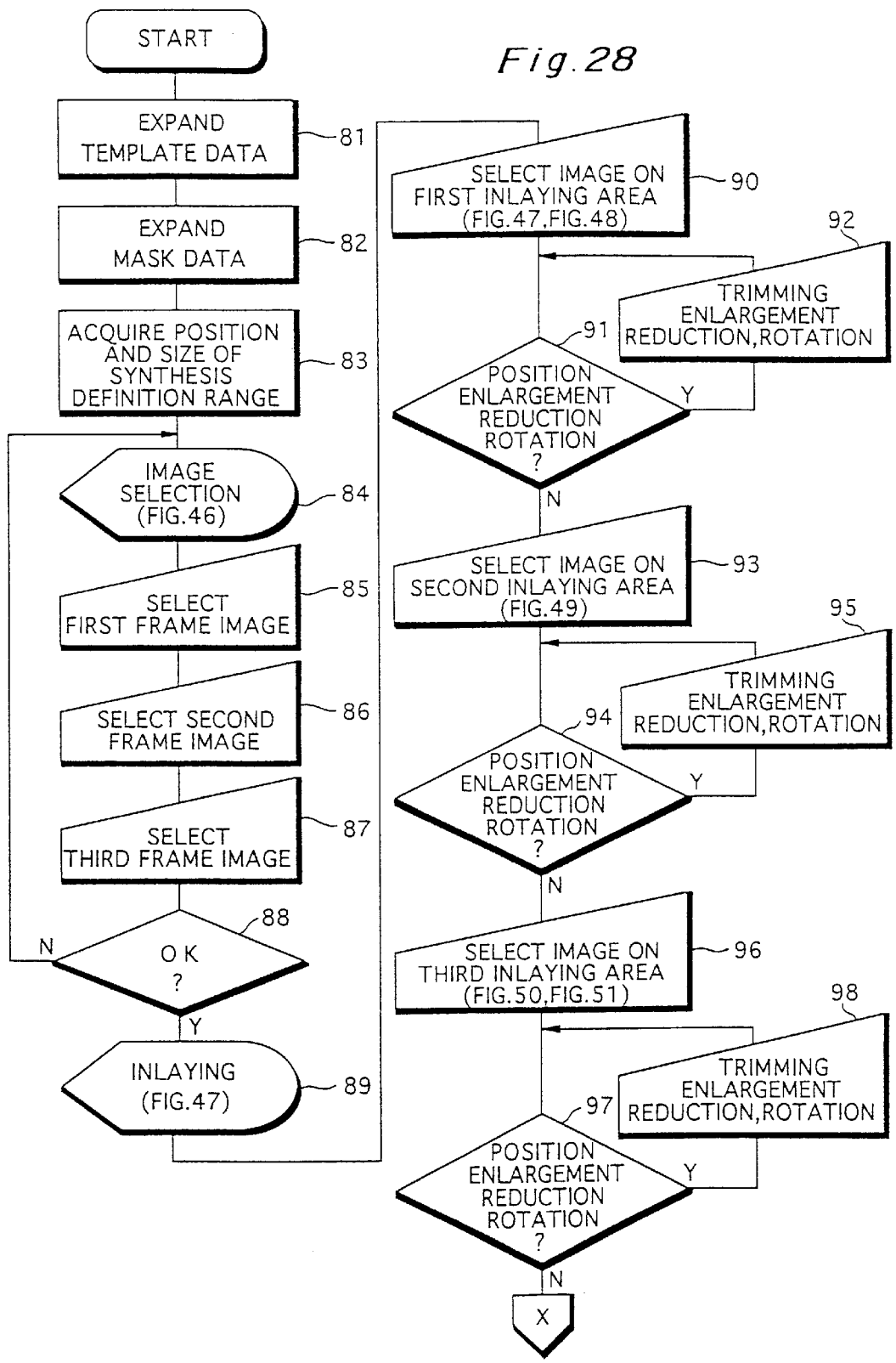
Figure 29:
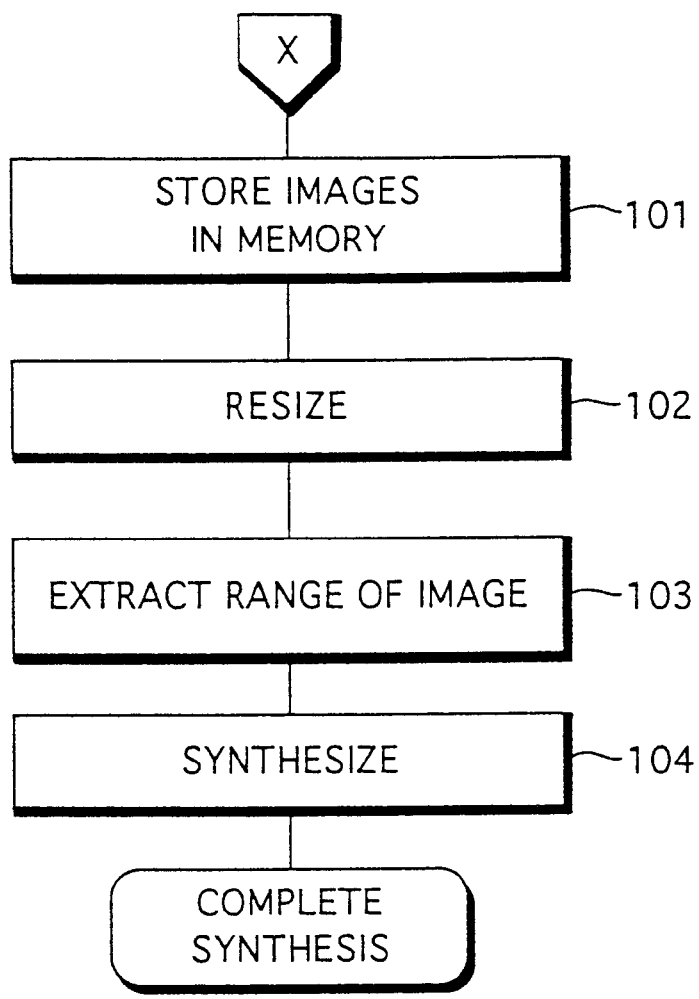

FIGS. 28 and 29 are flow charts showing the detailed procedure for the image synthesis processing, which corresponds to the processing in the step 65 shown in FIG. 27.

When a template image is specified by the user in the above-mentioned manner (step 58 in FIG. 25 to step 64 in FIG. 27), template image data for image display representing the specified template image and template image data for printing corresponding to the template image data for image display are respectively read out from the hard disk. The template image data for image display and the template image data for printing which are read out are fed to the image memory 35, and are stored therein once. The template image data for printing is read out from the image memory 35, and is fed to the enlarging and reducing circuit 44. Since the template image data for printing stored in the hard disk is compressed, the data is expanded (decompressed) in the enlarging and reducing circuit 44 (step 81). The expanded template image data for printing is fed to the image memory 35 again and is stored therein.

Mask image data for image display and mask image data for printing which respectively correspond to the template image data for image display and the template image data for printing which are read out from the hard disk are read out from the hard disk. Since the mask image data for printing is also compressed, the data is expanded in the enlarging and reducing circuit 44 (step 82). The enlarged mask image data for printing is also fed to the image memory 35 and is stored therein once.

Furthermore, synthesis information corresponding to the template image specified by the user is also read out from the hard disk, and is stored once in the RAM 45 (step 83).

Figure 46:
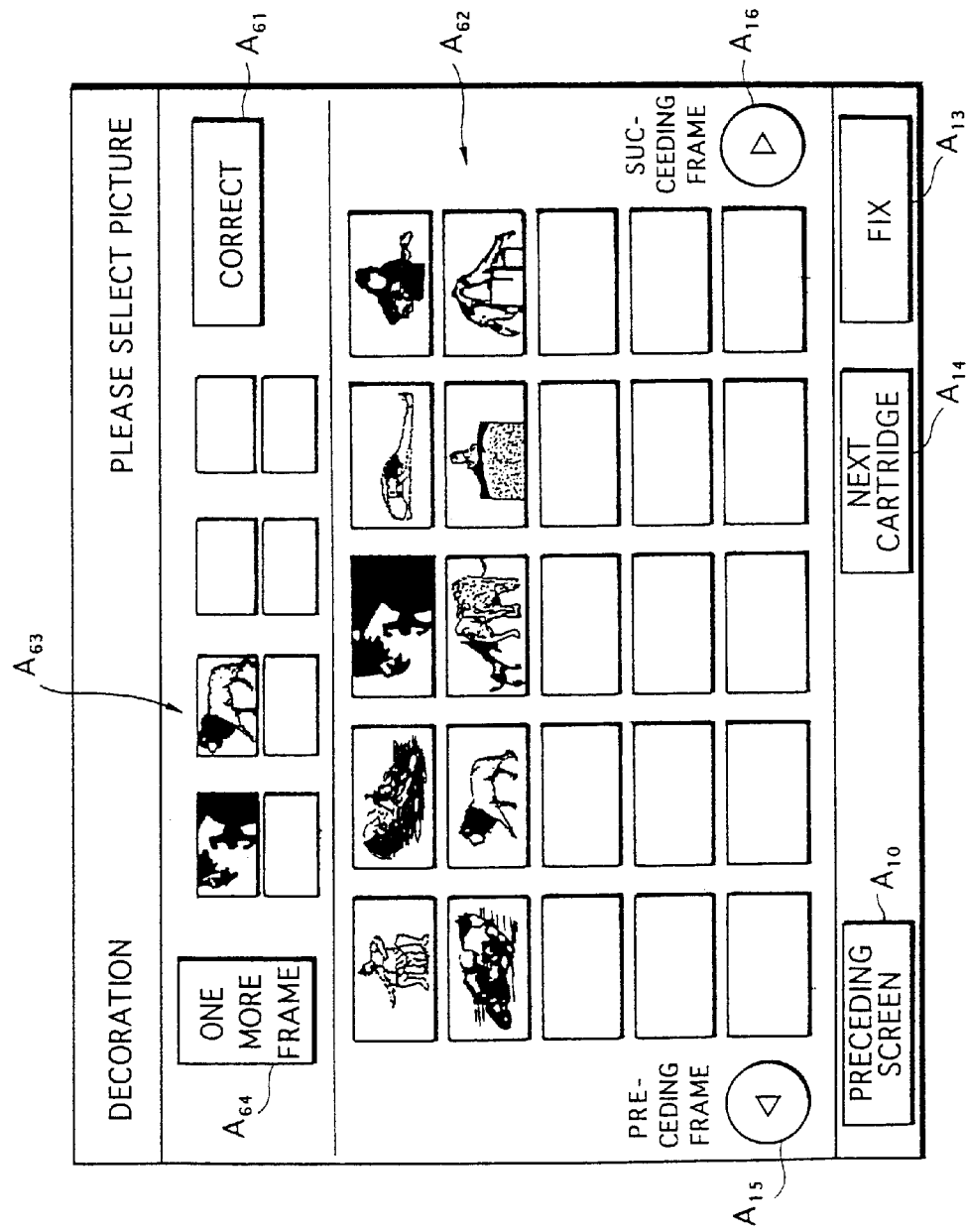

An image selection screen shown in FIG. 46 is then displayed on the display device 33 (step 84). Areas $A_{62}$ and $A_{63}$ and sections $A_{10}$, $A_{13}$, $A_{14}$, $A_{15}$, $A_{16}$, $A_{61}$ and $A_{64}$ are displayed on the image selection screen.

Reduced images represented by reduced image data which are read out from the new photographic film brought by the user (which have been already stored in the hard disk as described above) are displayed as a list in the area $A_{62}$. Specifically, all the images recorded on the new photographic film are read out, and image data representing the images read out are fed to the enlarging and reducing circuit 44, so that the image data are subjected to reduction processing, to obtain reduced images. Image data representing the reduced images are previously stored in the hard disk. Since the reduced image data representing the reduced images are previously stored in the hard disk, the reduced image data are read out from the hard disk, fed to the display device 33, and displayed in the area $A_{62}$. When the user touches the desired reduced images out of the reduced images displayed in the area $A_{62}$, images to be synthesized on the template image are selected. The images selected by the user are displayed in the area $A_{63}$.

Since the number of subject images which can be synthesized on the template image is predetermined in accordance with the type of template (see FIG. 44), the user can select the subject images, the number of which corresponds to the type. The number of frames which can be selected by the user is displayed in the section A64.

The sections $A_{15}$ and $A_{16}$ are sections touched by the user when all the images recorded on the new photographic film cannot be displayed in the area $A_{62}$ because the number of the images is large. When the section $A_{15}$ or $A_{16}$ is touched, the reduced images displayed in the area $A_{62}$ are changed.

When the images to be displayed on the template image (images for three frames in the present embodiment) are selected by the user, the section $A_{13}$ is touched by the user. Consequently, the subject images to be synthesized on the template image are determined. When the desired images are contained in a cartridge of a new photographic film other than the new photographic film mounted in the cartridge container 355 of the scanner 42, the section $A_{14}$ is touched by the user.

Figure 47:
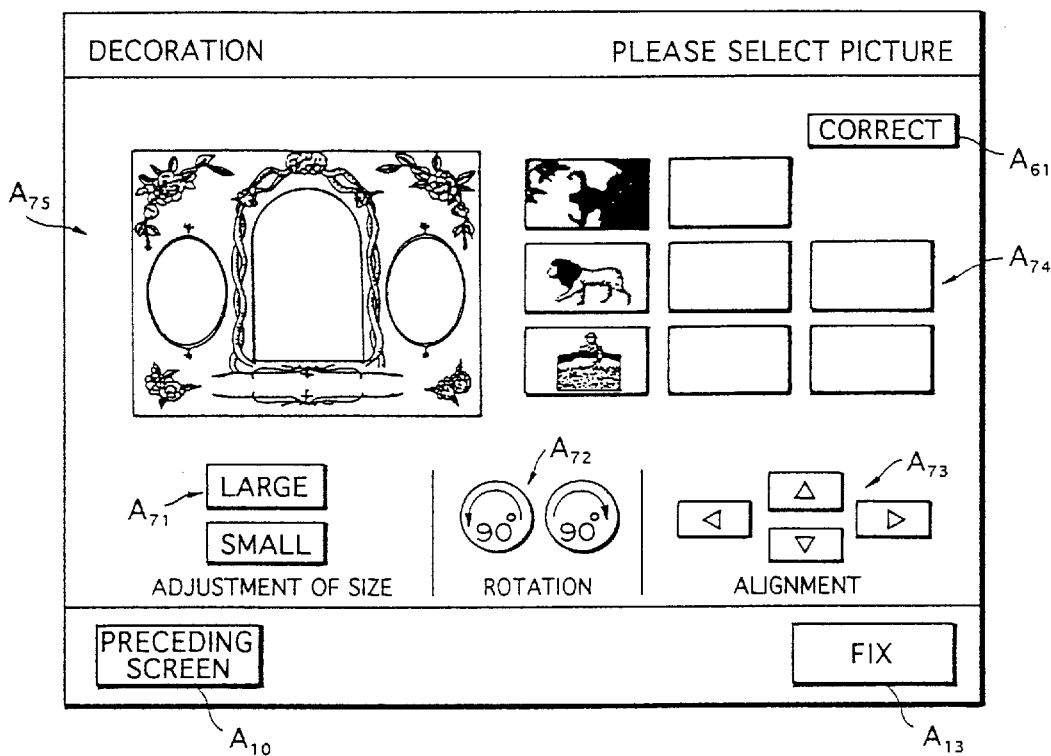

When the section $A_{13}$ is touched by the user, the display screen of the display device 33 is switched to an inlaying screen as shown in FIG. 47 (step 89). Areas $A_{71}$, $A_{72}$, $A_{73}$, $A_{74}$ and $A_{75}$ and sections $A_{10}$, $A_{13}$ and $A_{61}$ are displayed on the inlaying screen.

Sections for adjusting the size of a subject image to be synthesized on a template image are displayed in the area $A_{71}$. When the user touches one of the sections in the area $A_{71}$, the size of the subject image is increased or decreased. Sections for defining the angular relationship between the subject image to be synthesized on the template image and the template image are displayed in the area $A_{72}$. When the user touches one of the sections in the area $A_{72}$, the subject image is rotated at a desired angle. Sections for adjusting the positional relationship between the subject image to be synthesized on the template image and a synthesis area on the template image are displayed in the area $A_{73}$. When the user touches one of the sections in the area $A_{73}$, the subject image is moved upward, downward, leftward or rightward. The reduced images selected in FIG. 46 (steps 85 to 87) are displayed in the area $A_{74}$. The template image selected by the user is displayed in the area $A_{75}$. The template image data for image display stored in the image memory 35 is used for displaying the template image in the area $A_{75}$. Since the template image data for image display and the mask image data for image display have resolution previously defined for image display, no reduction or enlargement processing of images is required to display the image on the display device. Therefore, quick display is made possible. It goes without saying that the enlargement or reduction processing may be performed.

Figure 48:
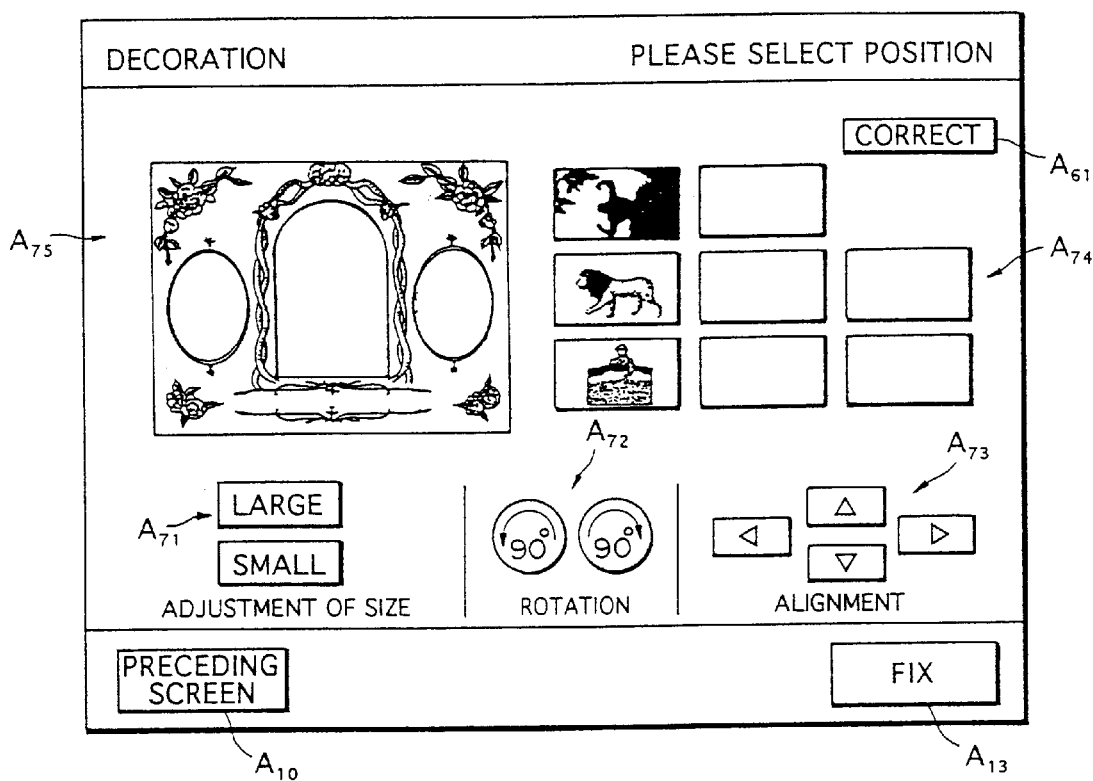
Figure 49:
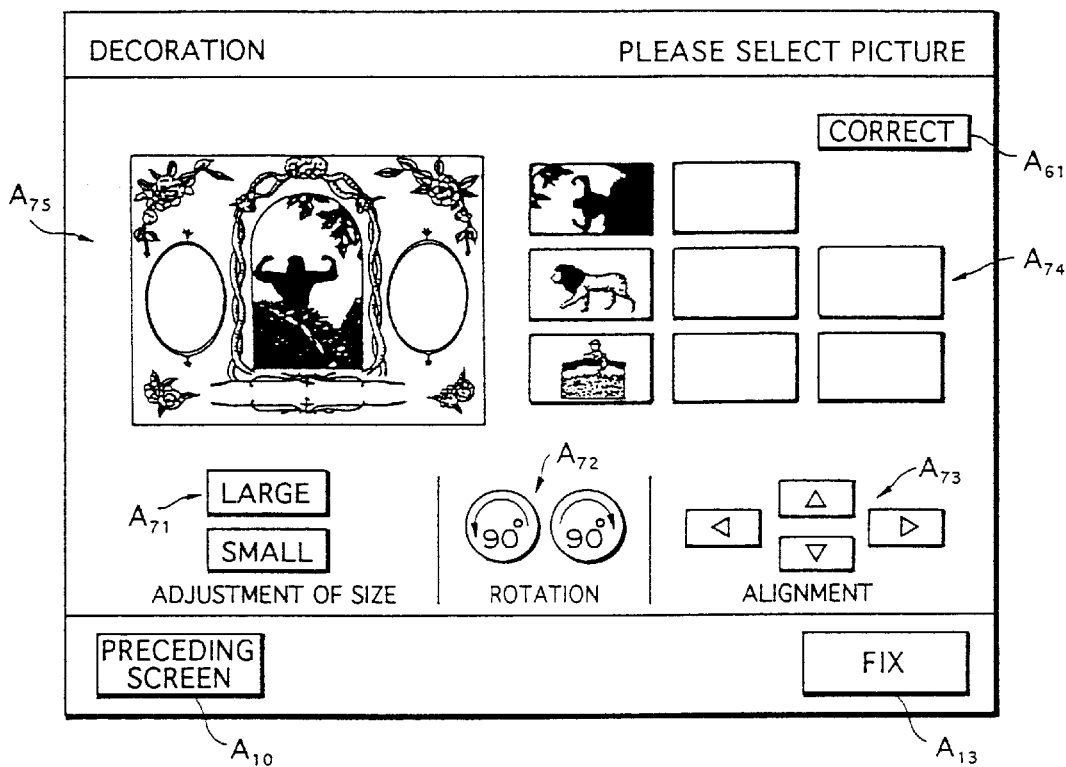

A subject image for the first frame which is synthesized on the template image out of the subject images displayed in the area $A_{74}$ is selected by the user. This selection is made by the user touching the image displayed in the area $A_{74}$ (step 90). When the selection of the image for the first frame is made, the message displayed on the screen is changed as shown in FIG. 48, whereby the position of an area where the selected subject image is to be synthesized is designated. The designation of the position is achieved by the user touching the desired synthesis area on the displayed template image. When the position is designated, the adjustment of the size, the adjustment of the angle (the angle of rotation), and the alignment of the subject image to be synthesized on the template image are carried out utilizing the sections in the areas $A_{71}$, $A_{72}$ and $SA_{73}$ if required (steps 91 and 92). Upon completion of these processings, the display screen of the display device 33 is changed to as shown in FIG. 49. The subject image selected by the user is displayed in the desired synthesis area on the template image. Further, information relating to the designation of the position, the adjustment of the size, the adjustment of the angle (the angle of rotation) and the alignment which are carried out at this time are stored in the RAM 45 in correspondence to the selected image.

Figure 50:
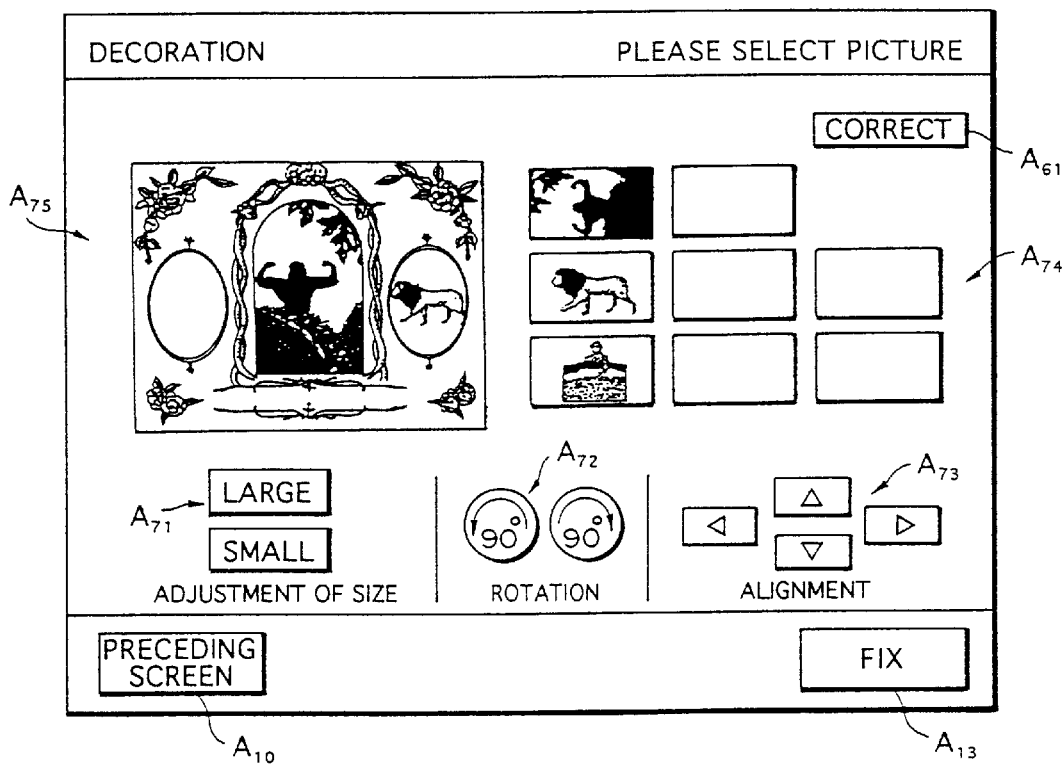

Images for the second and third frames are selected, and are synthesized on the template image, similarly to the image for the first frame selected and synthesized on the template image (steps 93 to 97, FIGS. 49 and 50). Information relating to the designation of the position, the adjustment of the size, the adjustment of the angle (the angle of rotation) and the alignment are also stored in the RAM 45 in correspondence to the selected images with respect to the images for the second and third frames, similarly to the image for the first frame.

Figure 51:
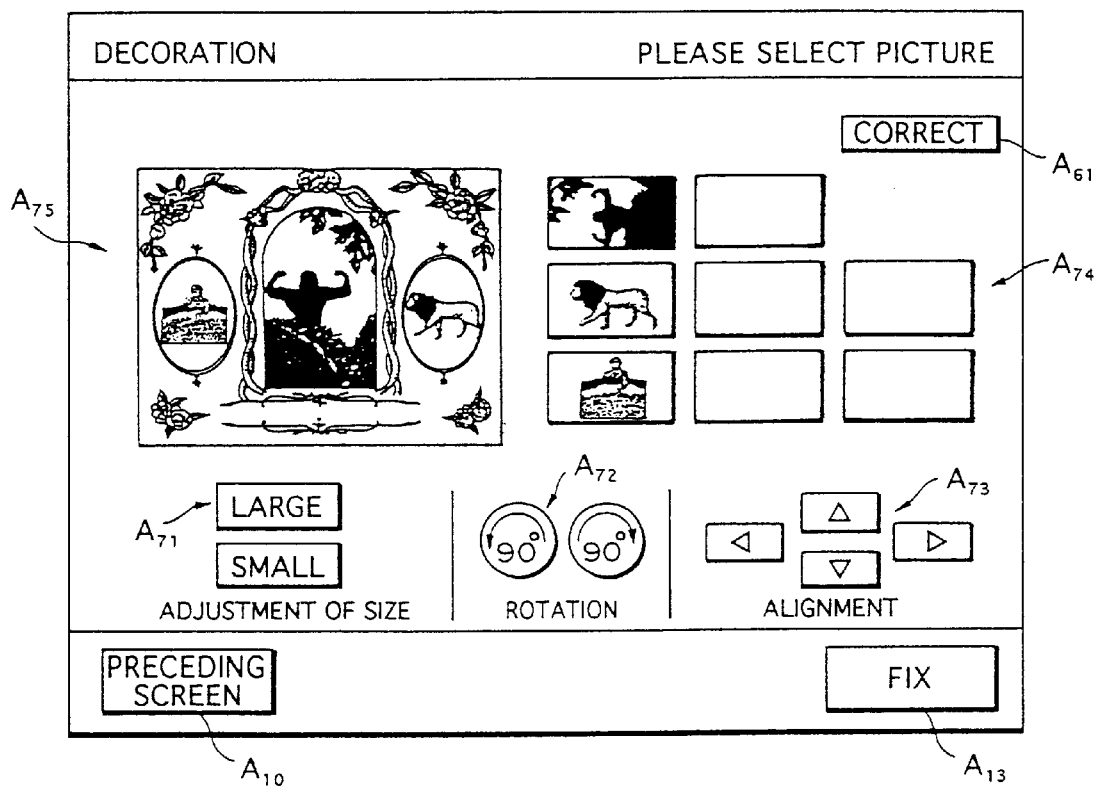

As described in the foregoing, the image synthesis on the display screen of the display device 33 is completed (see FIG. 51).

Image synthesis for printing will be subsequently described.

Figure 58:
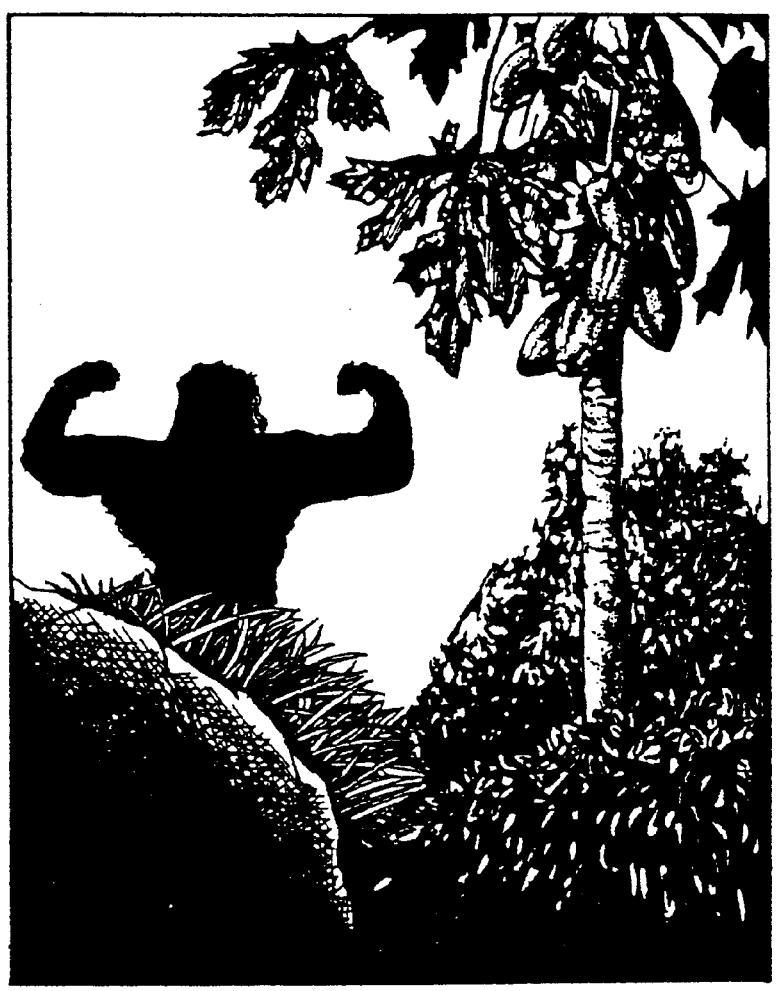
FIG. 58 illustrates an example of an image recorded on a photographic film.
Figure 60:
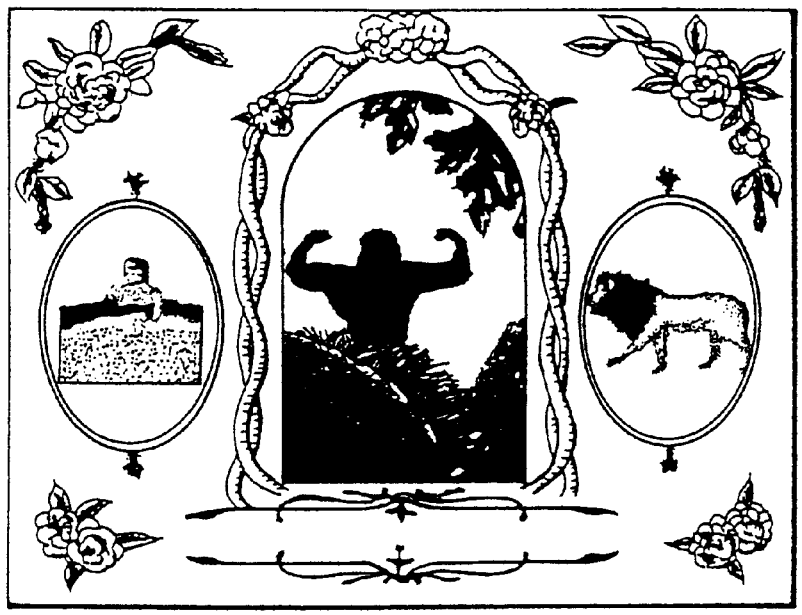
FIG. 60 illustrates an example of a composite image to be printed.

FIG. 58 illustrates one example of an image recorded on the new photographic film brought by the user. FIGS. 59a, 59b and 59c illustrate examples of images used in the image synthesis for printing. FIG. 60 illustrates an example of a composite image printed.

In the image synthesis for printing, subject images selected in the image synthesis on the display screen of the display device 33 (steps 85 to 87 in FIG. 28) out of images recorded on the new photographic film brought by the user are read from the new photographic film by the scanner 42, and image data representing the images are stored in the image memory 35 (step 101). IX information recorded on the new photographic film is used in order to determine which image should be read. Specifically, an image having the IX information for specifying a reduced image selected by the user is read out from the new photographic film. In a case other than the new photographic film, images will be selected and synthesized on a screen, and a composite image will be printed one frame at a time.

The size of the subject image represented by the image data stored in the image memory 35 does not generally coincide with the size of the template image represented by the template image data for printing. Therefore, the subject image is re-sized based on the information relating to the adjustment of the size and the adjustment of the angle (the angle of rotation) obtained in the image synthesis on the display screen of the display device 33 so that the size thereof coincides with the size of the template image for printing (step 102). The subject image after the re-sizing is illustrated in FIG. 59a.

The range of an image to be synthesized on the template image is then determined by referring to the information relating to the adjustment of the size and the adjustment of the angle (the angle of rotation) obtained in the image synthesis on the display screen of the display device 33 or a synthesis definition range $S_y$. The range of the image to be synthesized is indicated by a broken line with respect to the image shown in FIG. 59b. When the size of the range is smaller than the size of the synthesis definition range $S_y$ defined by a mask image, a white edge, a black edge or the like is formed in a composite image. The range of the image is so determined that the size thereof is equal to the size of the synthesis definition range $S_y$ (they coincide with each other in the example of FIGS. 59b and 59c), so that a white edge, a black edge or the like can be prevented from being formed in the composite image.

A portion of the range of the subject image to be synthesized as indicated by the broken line (the synthesis definition range $S_y$) is extracted as shown in FIG. 59c (step 103). Image synthesis processing is performed on the basis of the designation of the position and the information relating to the alignment which are obtained in the image synthesis on the display screen of the display device 33.

The image synthesis processing for printing is performed for the first frame to the third frame, whereby a composite image as shown in FIG. 60 is printed. At the time of the printing, the template image data for printing and the mask image data for printing which have high resolution are used, whereby a high-quality composite image can be printed. Data representing the composite image may be stored in the hard disk, the floppy disk, or the like. Consequently, the data representing the composite image is read out again, whereby the composite image can be obtained again relatively simply. Data representing the composite image to be recorded may be either one of the composite image data for printing and the composite image data for image display, or may be both of them.

Furthermore, a title can be also added to the template image. At this time, the title may be entered, or the title may be a title previously determined. In either case, when the title is added to the template image, the position where the title is displayed, a font, and the like are determined utilizing the information included in the synthesis information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image synthesizer comprising:
    a template image data storage storing template image data representing a plurality of template images which are different background images of a subject image to be synthesized;
    a mask image data storage storing mask image data representing a plurality of mask images corresponding to the plurality of template images, wherein each of said plurality of mask images define a synthesis position and a size of a synthesis area of the subject image to be synthesized on a template image;
    an image synthesis processor directing the subject image to the synthesis position and area, defined by a corresponding one of said plurality of mask images, on the selected template to thereby produce a composite image; and
    an image medium reader for reading a subject image recorded on a visible image medium and outputting an image signal representing the subject image,
    said subject image signal outputted from said image medium reader being fed to said image synthesis processor.

2. The image synthesizer according to claim 1, further comprising
    an image memory for storing an image signal, and
    a DMA controller for DMA-transferring the subject image signal outputted from said image medium reader to said image memory at a transfer speed which is not less than the output speed of the subject image signal outputted from the image medium reader.

3. The image synthesizer according to claim 2, wherein said image medium reader further includes:
    a line sensor for reading the subject image-from said visible image medium and for outputting the subject image signal, and
    a conveying device for relatively conveying said visible image medium and said line sensor,
    the image synthesizer further comprising:
        a line sensor driver for controlling the output of said subject image signal from said line sensor, and
        a controller for controlling said conveying device and said line sensor driver so that the transfer speed of the subject image signal outputted from said line sensor is lower than the write speed of the subject image signal to said image memory.

4. The image synthesizer according to claim 1, wherein said image medium reader is a film scanner for reading a photographic film with an information recording portion, said scanner reading at least one of magnetically recorded information on the film, optically recorded information on the film, and an image appearing on the film.

5. The image synthesizer according to claim 1,
    wherein said visible image medium is a developed film which is accommodated in a cartridge so as to be capable of being drawn out,
    wherein said image medium reader further includes:
        a cartridge container for containing said cartridge, a cover provided on said cartridge container,
        a containment detector for detecting that said cartridge is contained in said cartridge container,
        a cover controller for closing said cover in response to said detection, and
        a film drawing device for drawing said film out of said cartridge in response to the closing of said cover by said cover controller, and
    wherein said image medium reader reads said image for each frame, and reads information from said drawn out film.

6. An image synthesizer comprising:
    a template image data storage storing template image data representing a plurality of template images which are different background images of a subject image to be synthesized;
    a mask image data storage storing mask image data representing a plurality of mask images corresponding to the plurality of template images, wherein each of said plurality of mask images define a synthesis position and a size of a synthesis area of the subject image to be synthesized on a template image;
    an image synthesis processor directing the subject image to the synthesis position and area, defined by a corresponding one of said plurality of mask images, on the selected template to thereby produce a composite image; and
    an image reader for reading a subject image recorded on a visible image medium and outputting an image signal representing the subject image to generate subject image data to be fed to said image synthesis processor,
    wherein the template image data storage, the mask image data storage, the image synthesis processor and the image reader are contained in a single housing.

7. The image synthesizer according to claim 6,
    wherein said image reader is contained in a case and is formed as a unit, and includes a first connector,
    wherein said housing comprises a recess for containing said case, with a second connector being provided in the recess, and
    wherein said case is contained in said recess of said housing so as to be attachable and detachable, with said first connector and said second connector being connected to each other so as to be attachable and detachable.

8. The image synthesizer according to claim 7, wherein a cover for closing said recess is attached to said housing so as to be attachable and detachable.

9. The image synthesizer according to claim 6, wherein said image medium reader is a film scanner for reading a photographic film with an information recording portion, said scanner reading at least one of magnetically recorded information on the film, optically recorded information on the film, and an image appearing on the film.

10. The image synthesizer according to claim 6, wherein said image reader is a film scanner for reading a photographic film accommodated in a cartridge so as to be capable of drawing out an image appearing on the photographic film and outputting an image signal representing the image, the image synthesizer further comprising a display device for displaying the image represented by the image signal outputted from said film scanner, and said film scanner includes:
  a containing recess for containing the cartridge,
  a first cover for closing an opening of the containing recess, wherein an indication that said first cover should be closed upon containing the cartridge in said containing recess is displayed on said display device.

11. The image synthesizer according to claim 10, further comprising:

a second cover for closing an opening, which is formed at a position corresponding to said containing recess, wherein an indication relating to the opening or closing of the second cover is displayed on said display device.

12. The image synthesizer according to claim 11, further comprising:

a device for opening or closing said second cover, and an input device for entering a command relating to the opening or closing of the second cover, wherein said second cover is actuated in response to the entry of the command from said input device after the indication of opening or closing is displayed on said display device.

13. An image processing apparatus having a housing, said housing including therein, a film scanner for reading a photographic film accommodated in a cartridge so as to be capable of drawing out an image appearing on the photographic film and outputting an image signal representing the image, an image processor for processing the image signal received from said image reader in order to output a processed image signal, and a display device for displaying the image represented by the image signal outputted from said film scanner, said film scanner including:
  a containing recess for containing the cartridge,
  a first cover for closing an opening of the containing recess, wherein an indication that said first cover should be closed upon containing the cartridge in said containing recess is displayed on said display device.

14. The image processing apparatus according to claim 13, further comprising:

a second cover for closing an opening, which is formed at a position corresponding to said containing recess, wherein an indication relating to the opening or closing of the second cover is displayed on said display device.

15. The image processing apparatus according to claim 14, further comprising:

a device for opening or closing said second cover, and an input device for entering a command relating to the opening or closing of the second cover, wherein said second cover is actuated in response to the entry of the command from said input device after the indication of opening or closing is displayed on said display device.

16. An image processing apparatus having a housing, said housing including therein, an image reader for reading an image recorded on a visible image medium to output an image signal representing the read image, and an image processor for processing the image signal received from said image reader in order to output a processed image signal, wherein said visible image medium is a developed film which is accommodated in a cartridge so as to be capable of being drawn out, wherein said image medium reader further includes:
  a cartridge container for containing said cartridge, a cover provided on said cartridge container,
  a containment detector for detecting that said cartridge is contained in said cartridge container,
  a cover controller for closing said cover in response to said detection, and
  a film drawing device for drawing said film out of said cartridge in response to the closing of said cover by said cover controller, and wherein said image medium reader reads said image for each frame, and reads information from said drawn out film.

* * * * *